United States Patent [19]

Hayes et al.

[11] 4,387,278

[45] Jun. 7, 1983

[54] MAINTENANCE FACILITY FOR TELEPHONY SYSTEM WITH REMOTE PORT GROUPS

[75] Inventors: Robert D. Hayes, Winter Springs; Glenn L. Richards, Longwood, both of Fla.

[73] Assignee: Stromberg-Carlson Corporation, Tampa, Fla.

[21] Appl. No.: 310,990

[22] Filed: Oct. 13, 1981

Related U.S. Application Data

[63] Continuation of Ser. No. 204,686, Nov. 5, 1980, abandoned.

[51] Int. Cl.³ .................. G06F 15/16; H04M 3/22; H04Q 11/04
[52] U.S. Cl. ..................... 179/175.2 C; 179/18 EE
[58] Field of Search .............. 179/175.2 R, 175.2 C, 179/175.2 D, 175.3 R, 18 EE

*Primary Examiner*—Thomas A. Robinson
*Attorney, Agent, or Firm*—Cesari and McKenna

[57] ABSTRACT

A telephony network with a digital central office and a one or more remotely located digital satellite units. Each digital satellite unit connects to a number of remote subscriber lines and monitors these lines to establish communications through interconnecting spans and a digital satellite interface at the digital central office. The digital satellite interface includes a programmed controller that communicates with the remote digital satellite units connected to it, with call processing equipment in the digital central office and with maintenance processing equipment in the digital central office. Communications with the maintenance processor are in the form of messages having a header byte and a byte indicating the length of the message. During network initialization and various recovery operations, the programs and/or the data base can be transferred from the maintenance processor to each digital satellite interface through the use of these messages.

1 Claim, 61 Drawing Figures

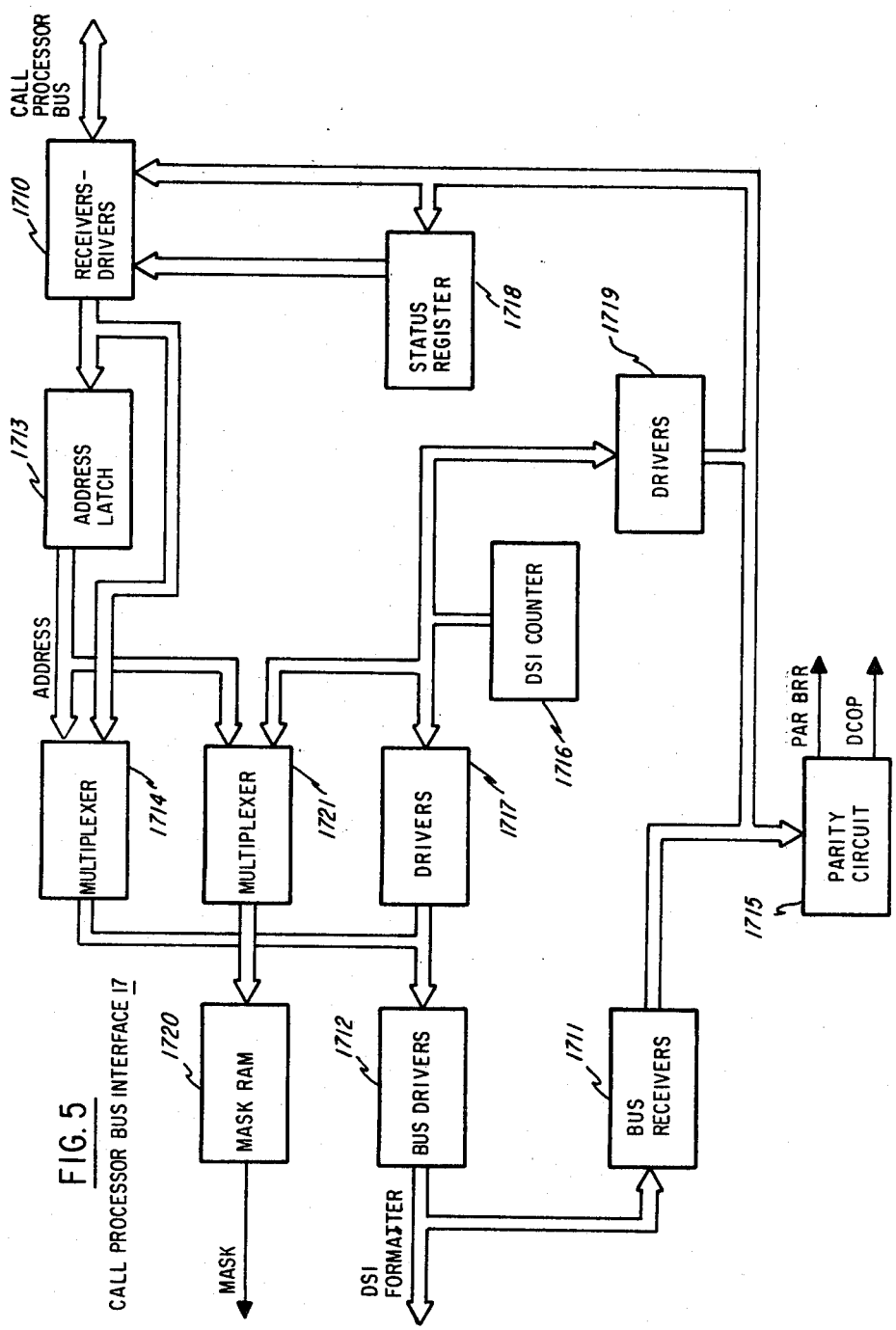

FORMATTER 25 BLOCK DIAGRAM

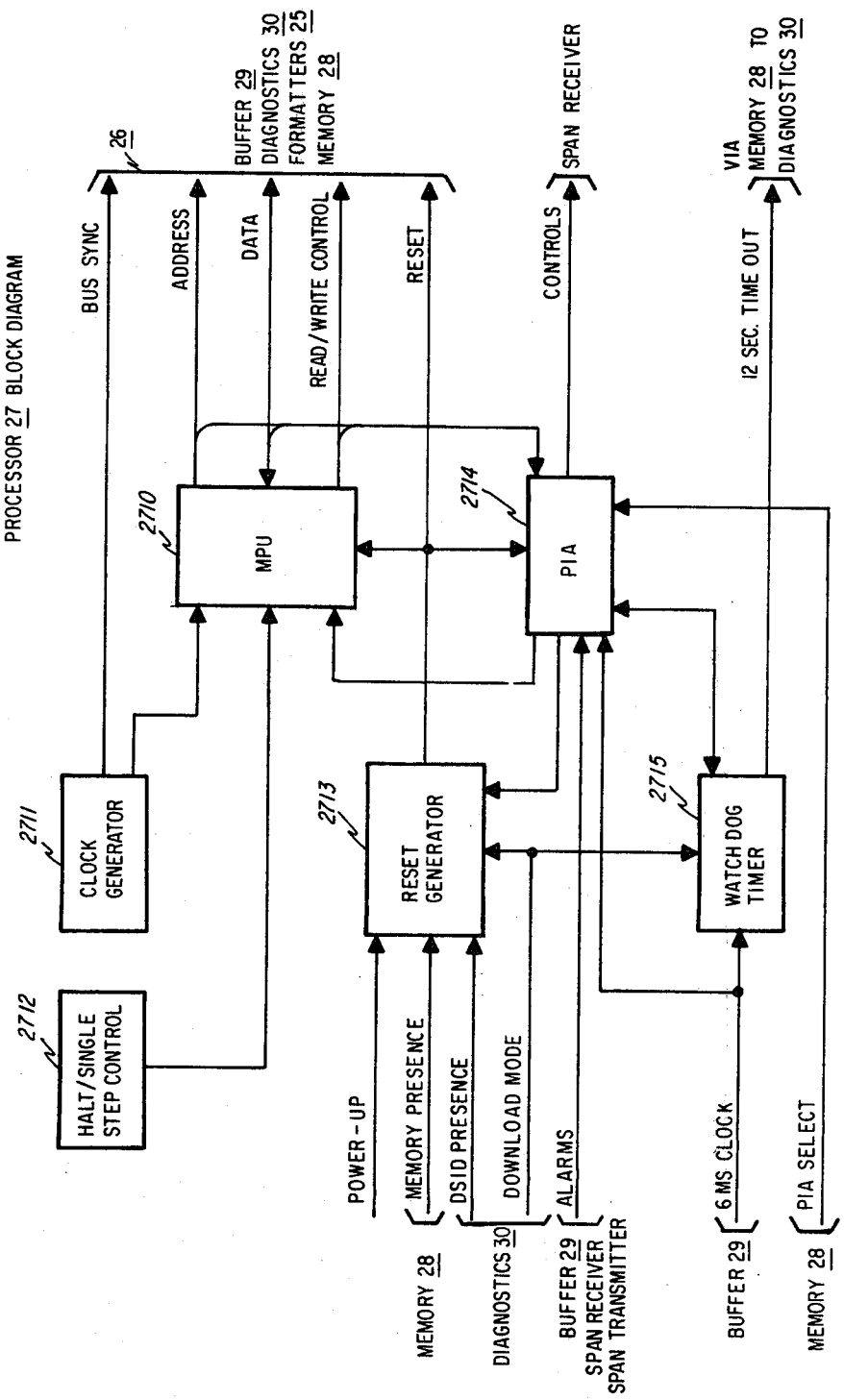

MEMORY 28 BLOCK DIAGRAM

FIG. 9

MESSAGES FROM CALL PROCESSOR 408 TO DIGITAL SATELLITE INTERFACE 14

| MESSAGE | BYTES NO. | | | | | |
|---|---|---|---|---|---|---|
| | 1 | 2 | 3 | 4 | 5 | 6 |
| | CMD | NO BYTES | | | | |
| TERMINATE — 0 | | 'ED SLN | DCO'ING PORT NO. | | CPD (BY, GST) | |
| DISCONNECT — 1 | | SLN | | | | |
| LINE CONTROL — 2 | | SLN | G/S | BR/SIR | TA/SIR | |
| PAY STATION — 3 | | SLN | DCO'S OPERATOR PORT NO. | | COMMAND | |
| RING LINE — 4 | | 'ED SLN | RINGING CONTROL | RINGING TYPE | | |
| LOOP AROUND TEST — 5 | | TEST DATA | | | | |
| TEST RESPONSE — 6 | | TEST SLN | G/S | TEST RESULTS | | |
| DSI CONTROL — 7 | | FUNC | FUNC PTR | | | |
| CHANNEL DISCONNECT — 8 | | 0 CHANNEL | SN CN | | | |

FIG. 10

MESSAGES FROM DIGITAL SATELLITE INTERFACE 14 TO CALL PROCESSOR 408

| BYTE NO. | | | | | |
|---|---|---|---|---|---|
| 1 | 2 | 3 | 4 | 5 | 6 |
| CND | NO.BYTES | | | | |

MESSAGE

| | | | | | | |
|---|---|---|---|---|---|---|
| ORIGINATE | 0 | 5 | 'ING SLN | ASGND. CHAN. NO. | ACB DELAY COUNT | — PRY ID |
| RELEASE | 1 | 2 | SLN | | | |
| CONNECT | 2 | 6 | 'ED SLN | ASGND. CHAN. NO. | DCO'S 'ING PORT NUMBER | CPD / BY / GSC |
| CONNECT FAIL | 3 | 6 | 'ED SLN | FAILURES POINTER | DCO'S 'ING PORT NUMBER | CPD / BY / GSC |
| PAYSTATION RESPONSE | 4 | 5 | 'ING SLN | PAYSTA. RESPONSE | DCO'S OPERATOR PORT NUMBER | |
| LOOP AROUND TEST | 5 | 5 | TEST DATA | | | |
| TEST CALL CONTROL | 6 | 4 | SLN | ASGND. CHAN. NO. | TEST POINTER | |
| MESSAGE COMPLETE | 7 | 1 | | | | |
| CHANNEL DISCONNECT | 8 | 3 | SLN | ASGND. CHAN. NO. | | |
| DSI STATUS | 9 | 2 | FUNC | STATUS PTR | | |
| CHANNEL DISCONNECT FAILURE | A | 3 | SLN OR "FF" | CHAN. NO. OR "FF" | | |
| CBI LINK RESP. | B | 1 | | | | |

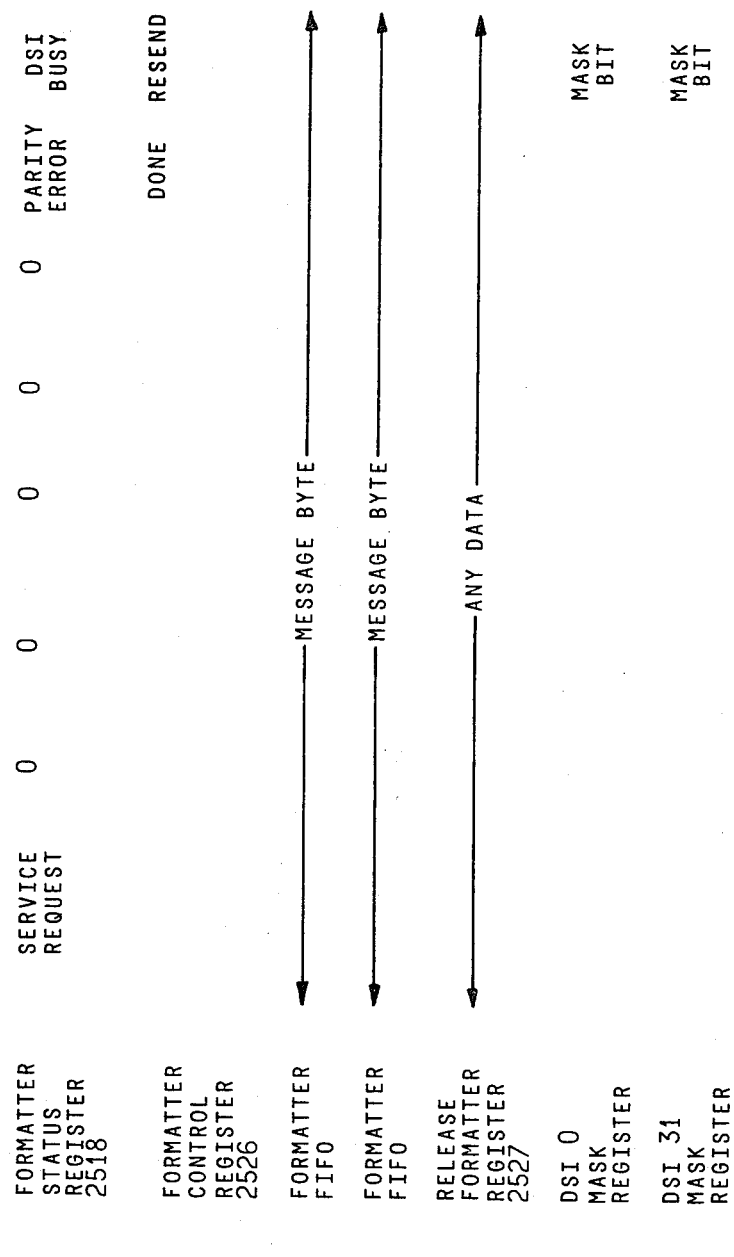

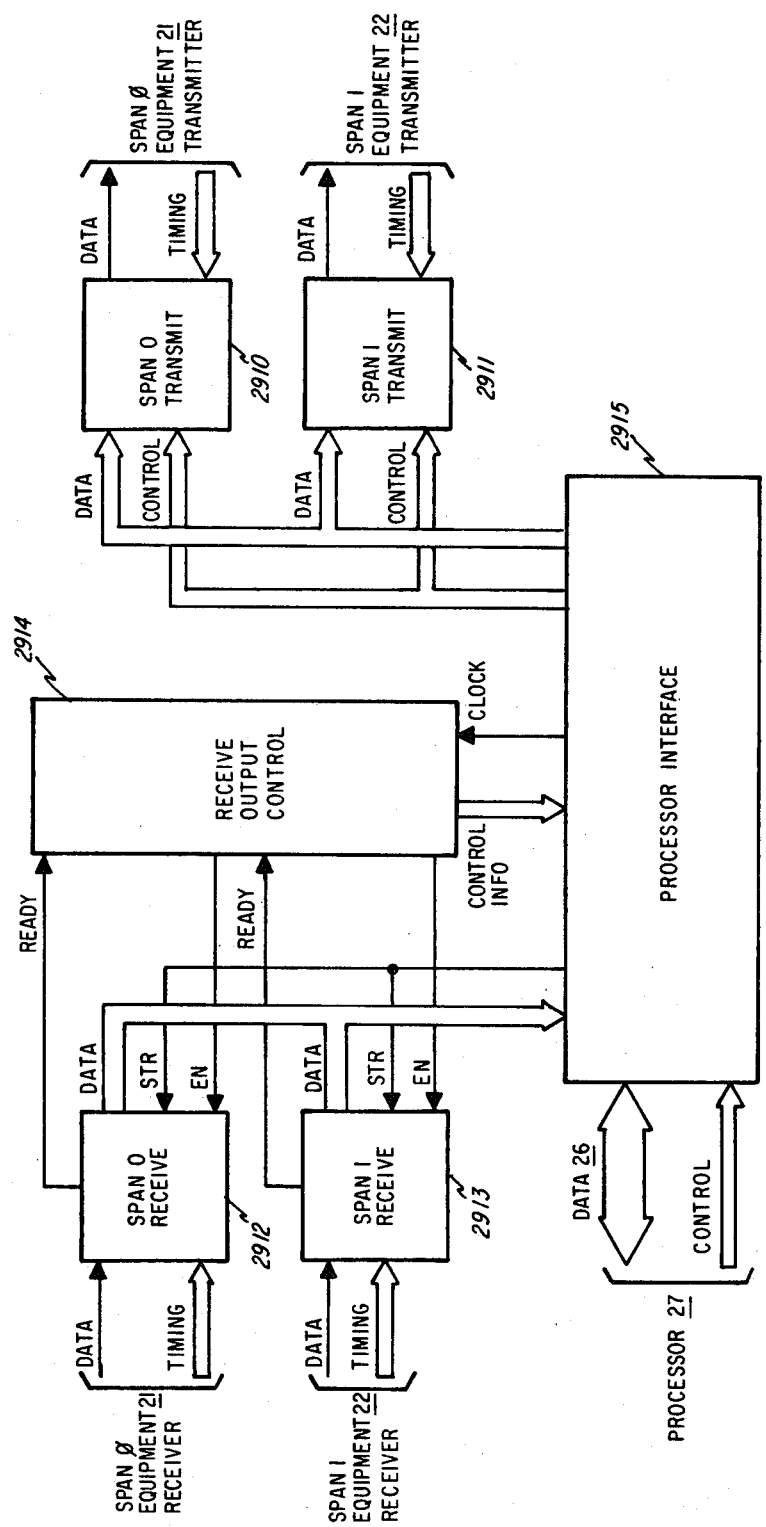

REMOTE DIGITAL SATELLITE UNIT

FIG.16
MESSAGE FROM DIGITAL SATELLITE INTERFACE 14 TO REMOTE DIGITAL SATELLITE UNIT 13

| MESSAGE | CODE | | | | | | |
|---|---|---|---|---|---|---|---|
| POLL | 1 | F | F | C | 0 | 0 | 0 |
| TEST POLL | 5 | F | F | C | 0 | 0 | 0 |
| POLL ASSIGN | 7 | RGN | 0 | 0 | 0 | 0 | 0 |
| ORIGINATE RESPONSE | 8 | 0 | SLN | RT | SPAN NO. | CHANNEL NUMBER | |
| TERMINATE | 8 | RING CODE | SLN | RT | SPAN NO. | CHANNEL NUMBER | |
| LINE CONTROL | 9 | 0 | SLN | S DS PR PC | RB TA RD SP | | |
| MANUAL MAINTENANCE | B | 0 | SLN | CODE | | | |
| SPAN RELAY CONTROL | D | RGN | SR AS MJ MN | CA 0 0 EL | L2 L1 L0 X1 | X0 B2 B1 B0 | 0 |
| OK | E | 0 0 SI S0 | 0 | 0 | 0 | 0 | 0 |
| IDLE | F | F | F | F | F | F | F |

FIG. 17

MESSAGES FROM REMOTE DIGITAL SATELLITE UNIT 13 TO DIGITAL SATELLITE INTERFACE 14

| MESSAGE | CODE | | | | | | | | | | | | | |
|---|---|---|---|---|---|---|---|---|---|---|---|---|---|---|
| POLL RESPONSE | 1 | RESPONSE | | | | | | | | | | | | |
| TEST POLL RESPONSE | 5 | RESPONSE | | | | | | | | | | | | |
| ORIGINATE | 2 | 0 | SLN | DS | SF | PU | PI | 000 | | | | | | |
| RLC MAINTENANCE | 4 | 0 | SLN | 0 | 000 LP | | | | | | | | | |
| MANUAL MAINTENANCE | B | 0 | SLN | CODE | | | | | | | | | | |
| SPAN RELAY CONTROL | D | RGN | SR | AR | MJ | MN | CA | 0 | 0 | EL | L1 | L2 | L0 | X1 | X0 | B2 | B1 | B0 |
| OK | 8 | 0 | 0 | S1 | S0 | 0 | 0 | 0 | 0 |
| IDLE | F | F | F | F | F | F | F | F | F |

MAINTENANCE BUS INTERFACE BUFFER 18

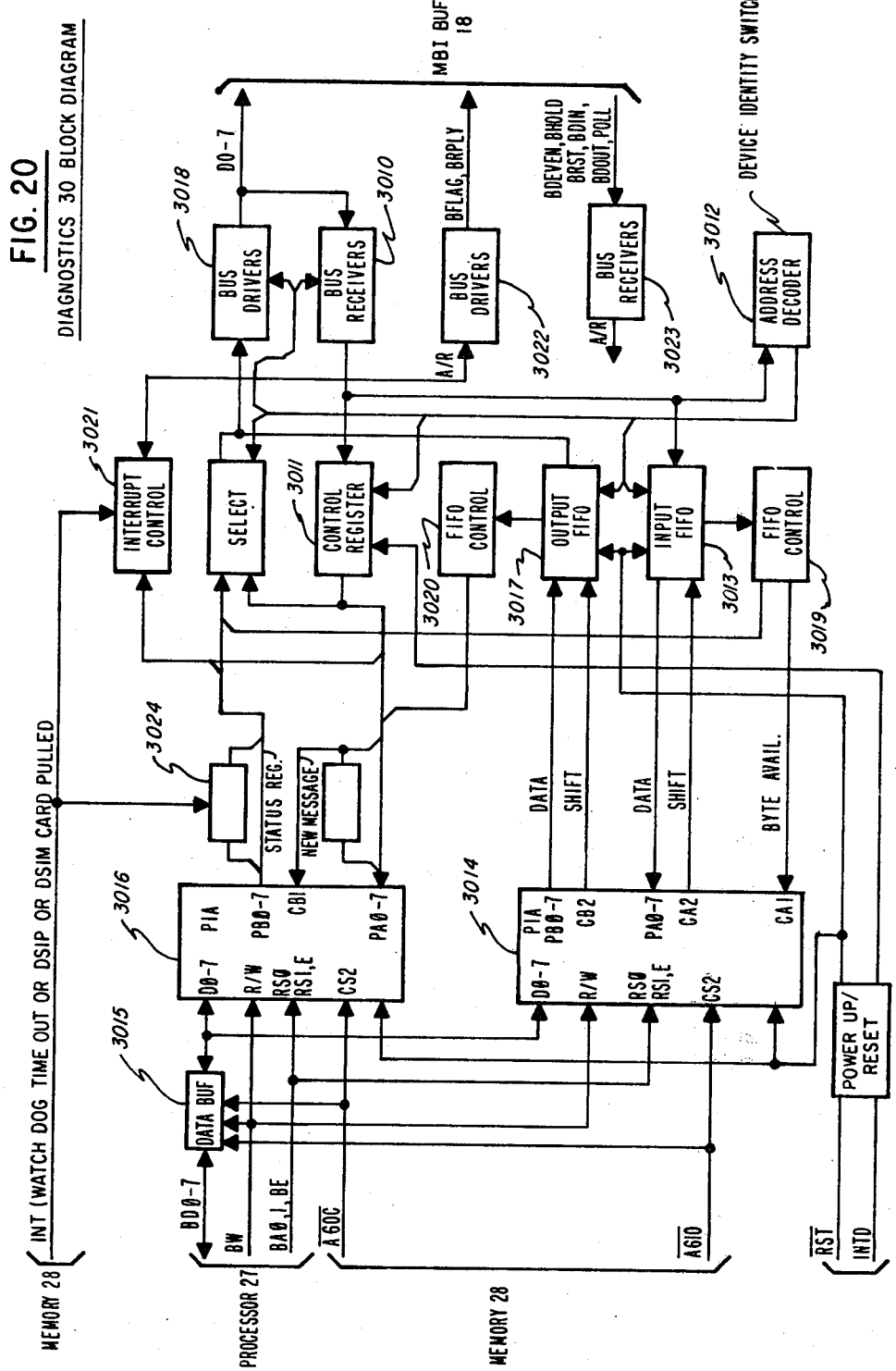
FIG. 20 DIAGNOSTICS 30 BLOCK DIAGRAM

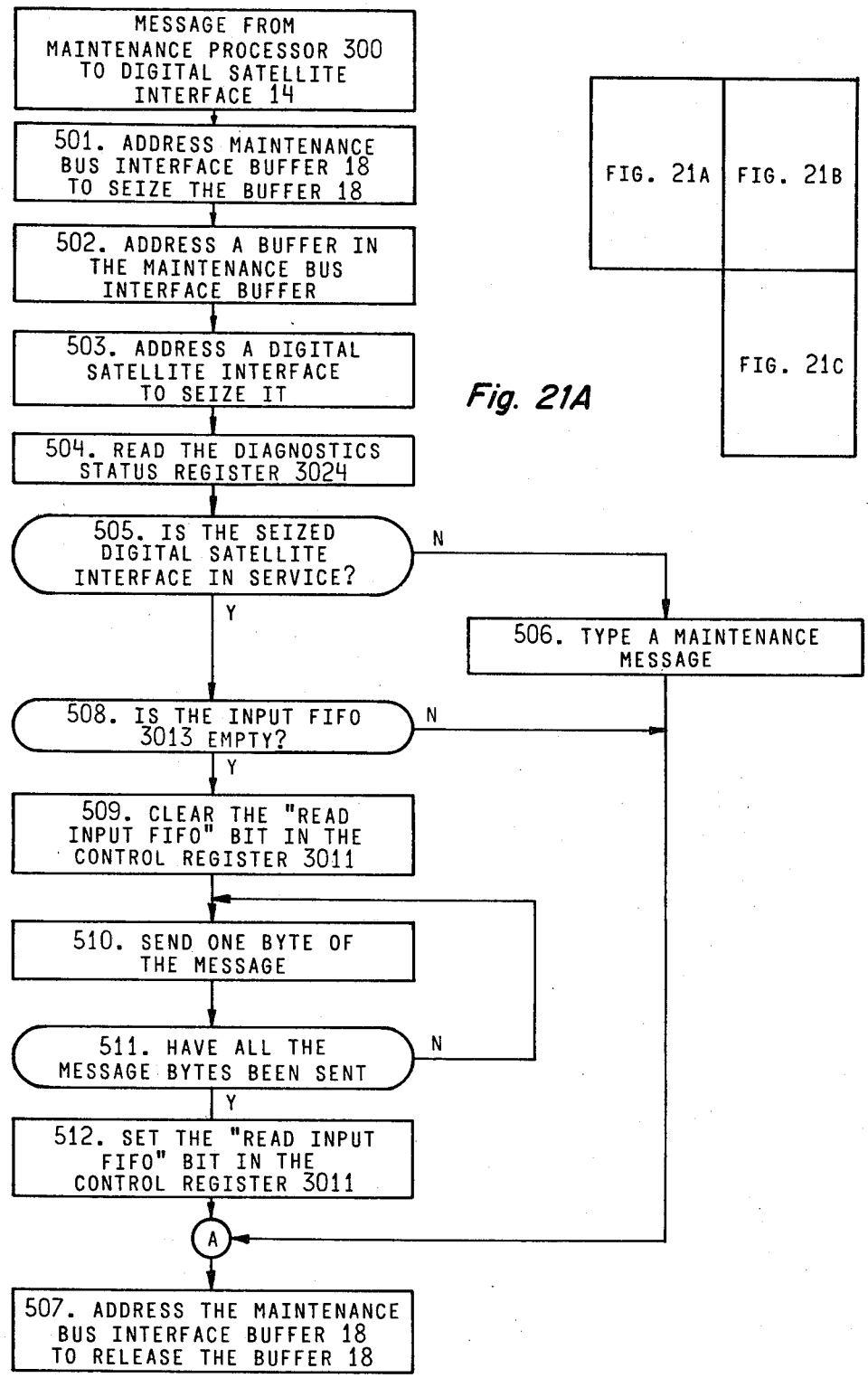

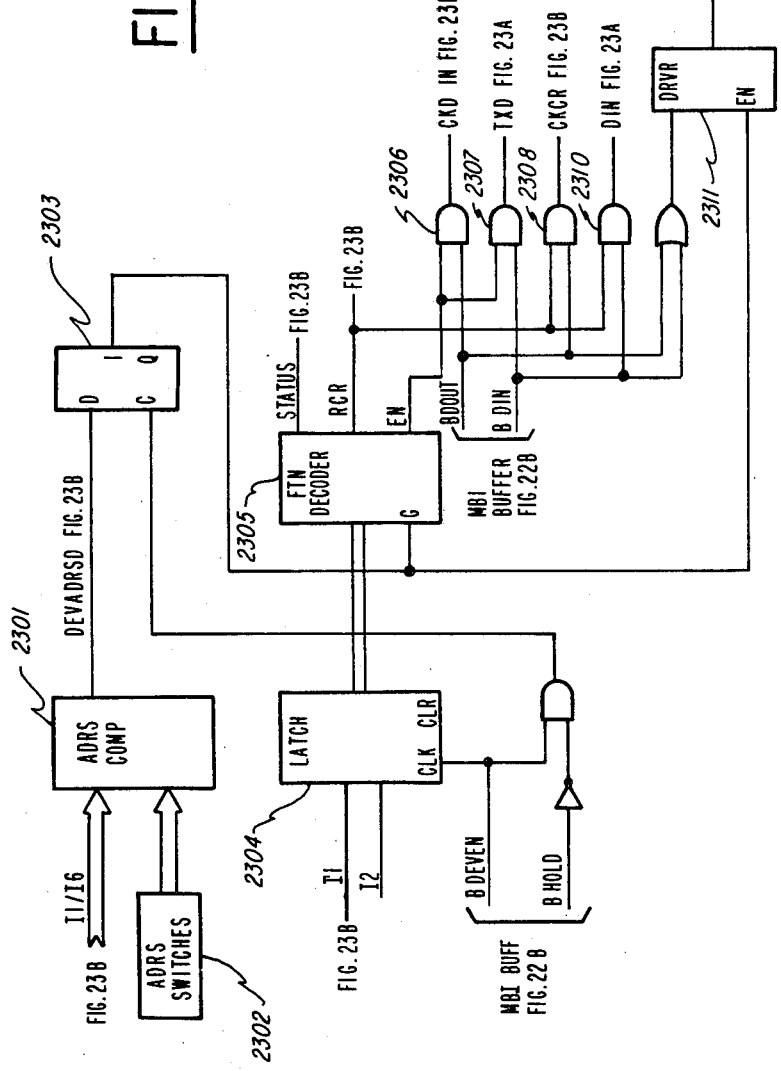

MP TO DSI MESSAGE FORMAT

DSI TO MP MESSAGE FORMAT

MP TO DSI MESSAGES

| MICROCODE PATCH | A | 1 | ADDRESS MS BYTE | ADDRESS LS BYTE | SW BYTE TO WRITE |
|---|---|---|---|---|---|

| MICROCODE RELOAD | A | 2 | (NOT USED) |
|---|---|---|---|

| END MICROCODE PATCH | A | 3 | (NOT USED) |
|---|---|---|---|

DSI TO MP MESSAGES

| DSI READY | 0 | 1 |
|---|---|---|

| CHECKSUM | 0 | 2 | CHECKSUM |
|---|---|---|---|

| TASK COMPLETE | 4 | n | 7 | ECHO OF MP MESSAGE |
|---|---|---|---|---|

| MICROCODE RELOAD REQUEST | 4 | B | 8 | CONDITION CODE REG | ACCUM REG B | ACCUM REG A | INDEX REG MS BYTE | INDEX REG LS BYTE | PROGRAM COUNT MSB | PROGRAM COUNT LSB | STACK POINT MS BYTE | STACK POINT LS BYTE |
|---|---|---|---|---|---|---|---|---|---|---|---|---|

FIG. 24C

DSI-MP MESSAGES DURING MICROCODE LOAD

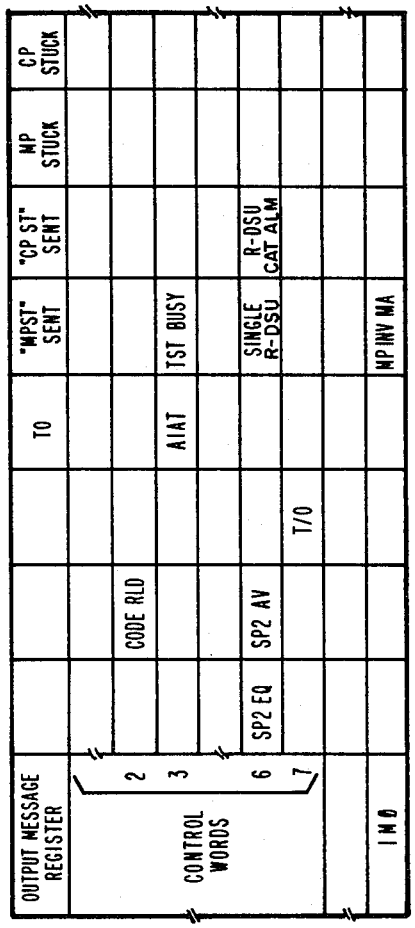
FIG. 25C
MISCELLANEOUS REGISTERS
FIG. 25A
LINE MEMORY BLOCK
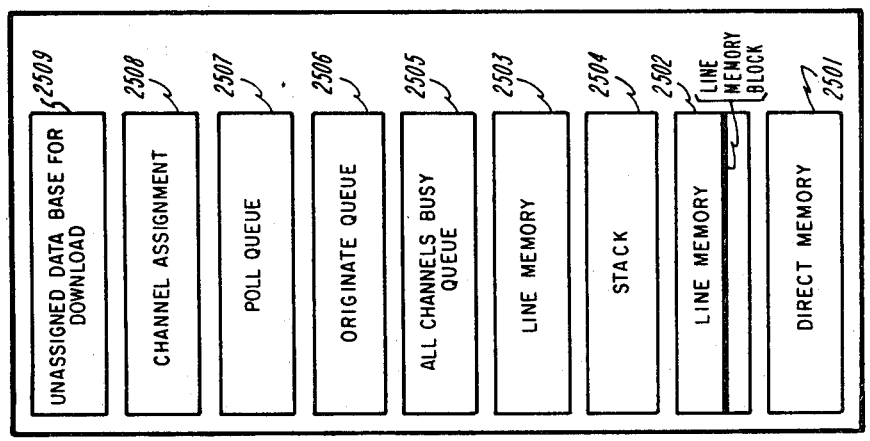
FIG. 25
MEMORY

FIG. 25D — MEMORY MAP-PROGRAMMABLE INTERFACE ADAPTERS

| PROGRAMMABLE INTERFACE ADAPTER | ADDRESS | FUNCTION | BIT 7 | BIT 6 | BIT 5 | BIT 4 | BIT 3 | BIT 2 | BIT 1 | BIT 0 |
|---|---|---|---|---|---|---|---|---|---|---|
| FORMATTER PIA 2513 | FPIAI | INPUT FIFO 2511 | | | | CP → DSI MESSAGE BYTE | | | | |
| | FPIAO | OUTPUT FIFO 2516 | | | | DSI → CP MESSAGE BYTE | | | | |
| | FPIAIC | INPUT PIA CONTROL | BYTE AVAILABLE | 0 | TO CA2 | READ STROBE | RESTORE E | ORA SEL | SENSE CAI | EN IRQ CAI |
| | FPIAOC | OUTPUT PIA CONTROL | RESEND | 0 | TO CB2 | WRITE ST | RESTORE E | ORB SEL | SENSE CBI | EN IRQ CBI |
| BUFFER PIA 2915 | BPIAI | INPUT SPAN DATA | TFI SPAN XFER RELAY | TF0 DATA OK | XMIT SPAN 1 | SI/S0(L) | SR3 | SR2 SPAN RECEIVE DATA | SR1 | SR0 |
| | BPIAO | OUTPUT SPAN DATA | | OUTPUT FIFO LOADED | | XMIT SPAN 0 | SX3 | SX2 SPAN TRANSMIT DATA | SX1 | SX0 |
| | BPIAIC | INPUT PIA CONTROL | SRNR | 0 | TO CA2 | READ ST | 1 | 1 | CAI | 1 |
| | BPIAOC | OUTPUT PIA CONTROL | STSS | 0 | 1 | 0 | 1 | 1 | CBI | 1 |
| DIAGNOSTICS PIA 3014, 3016 | DPIAC | CONTROL REG. | READ INPUT FIFO | OUTPUT FIFO EMPTY | RESET INHIBIT | RELOAD BATCH | LOOPAROUND TEST | FREEZE DSI | DOWNLOAD MODE SOFTWARE | MASK |
| | DPIAS | STATUS REG. | READ OUTPUT FIFO | CATAST ALARM | | RELOAD SOFTWARE REQUEST | MINOR ALARM | MAJOR ALARM | DSI BUSY | INPUT FIFO NOT EMPTY |
| | DPIACC | CR PIA CONTROL | 0 | 0 | CA2 | 0 READ | 1 | 1 | CAI | 1 |
| | DPIASC | SR PIA CONTROL | NEW MP MESSAGE | 0 | CB2 | 0 WRITE | 1 | 1 | CBI | 1 |
| | DPIAI | INPUT FIFO 3031 | | | | MP → DSI MESSAGE BYTE | | | | |
| | DPIAO | OUTPUT FIFO 3017 | | | | DSI → MP MESSAGE BYTE | | | | |
| | DPIAIC | INPUT PIA CONTROL | INPUT FIFO BYTE AVAIL | 0 | CA2 | 0 READ | 1 | 1 | CAI | 1 |
| | DPIAOC | OUTPUT PIA CONTROL | NEW MP MESSAGE | 0 | CA2 | 0 WRITE | 1 | 1 | CBI | 1 |
| PROCESSOR PIA 2714 | PPIAA | ALARM INPUTS | SCPI | SCP0 | BERB 2 | BERB 1 | BERB 0 | CG ALM 2 | CG ALM 1 | CG ALM 0 |
| | PPIAC | ALARM/CONTROL | SCP2 | FBALM | INTD | FOFE | BERB0 | FPE(B) | FPE(A) | ALRST |
| | PPIAAC | AI PIA CONTROL | TIME | 0 | 0 CA7 | CA2 SENSE | 0 RESET EN | 1 | 0 SENSE CAI | 1 |
| | PPIACC | AC PIA CONTROL | WDT | 0 | CB2 | CB2 S/RL | WD | 1 | CBI | 1 |

MAINTENANCE FACILITY FOR TELEPHONY SYSTEM WITH REMOTE PORT GROUPS

This is a continuation of application Ser. No. 204,686, filed Nov. 5, 1980, now abandoned.

CROSS REFERENCES TO RELATED APPLICATIONS AND PATENTS

U.S. patent application Ser. No. 06/295,742, filed on Aug. 24, 1981 by Ronald J. Kandell et al for "Telephony System with Automatic Test Call Generator for Remote Port Groups" and assigned to the same assignee as this invention;

U.S. patent application Ser. No. 06/204,114, filed on even date herewith for "Telephony System with Remote Port Groups" and assigned to the same assignee as the present invention;

U.S. patent application Ser. No. 924,883, filed on July 14, 1978 by Barrie Brightman et al for an "Arrangement of Interactive Telephone Switching Processors for Control of Ports", and assigned to the same assignee as this invention; and U.S. patent application Ser. No. 10,910, filed Feb. 9, 1979 by Otto W. Beebe et al for a "Control System for Telephone Switching System", and assigned to the same assignee as the present invention.

BACKGROUND OF THE INVENTION

This invention generally relates to telephony networks and, more specifically, to a telephony switching system that is characterized by switching calls to remotely located port groups in the network.

U.S. patent application Ser. No. 924,883 discloses a telephony network that includes a digital central office for performing switching operations. In this network, telephone lines from subscriber and trunk circuits from other central offices connect directly to a digital central office through a plurality of line and trunk circuits in port group units. The connection is made through conventional tip and ring, or analagous, conductors that extend from each individual subscriber or office to the location of the digital central office. These conductors carry signals in analog form that represent voice information and supervisory information. Supervisory information received by the central office is called "sense supervisory" information and includes hook status and dial pulse information; supervisory information sent to the port group units and the conductors is called "control supervisory" information and includes ringing and other information.

Each port group unit connects to a plurality of telephone lines through individual port circuits, such as line or trunk circuits. Each port circuit converts the incoming voice signals to pulse-code-modulated signals that are multiplexed and transferred in a serial pulse train onto a port group highway. Sense supervisory information also is multiplexed into this pulse train.

A time slot interchange (TSI) matrix network receives this pulse train and strips the incoming sense supervisory information for storage in an area of a port data store that is assigned to each port circuit. A port event processor samples the information in each port data store area and modifies and uses the information in that area to send messages to a call control processor. The call control processor sends information including commands to the individual areas of the port data store for enabling the port event processor to control the corresponding telephone subscriber's line and to the TSI matrix network for establishing a switching channel through the network thereby to establish a path for the digitized voice signals over the same or another port group highway to a called telephone.

Commands to the port event processor from the call control processor enable the transmission of a dial tone, the termination of a dial tone, or the ringing of both the called and calling telephones. The port event processor generates control supervisory information in response to these commands. The control supervisory information is interspersed with the voice information in digital form for transmission to the port group unit connected to the port group highway. Then the corresponding port group unit performs various functions in response to the commands and converts the digital voice data signals into analog form for transmission through a particular port circuit to the subscriber's telephone lines and telephone.

U.S. patent application Ser. No. 924,883 discloses a single call processing system of this general construction that operates as a digital central office. U.S. patent application Ser. No. 10,910 depicts a digital central office that includes two such call processing systems that operate in parallel and in conjunction with a maintenance processor. The two parallel call processing systems receive incoming signals from the subscribers and trunk lines simultaneously and operate in synchronism. However, signals from only one of the call processing systems pass through the port group units to the subscriber and trunk lines. The maintenance processor system analyzes losses of synchronization between the two call processing systems, parity errors, and other conditions. It determines which of the two parallel call processing systems actually controls the telephony network.

Digital central offices of this type require individual telephone lines from each subscriber location to the location of the digital central office. This approach works well and is economical where the subscribers either are located in a relatively small geographical area around the digital central office or are randomly, but widely, dispersed geographically. However, in many applications, telephony networks subscribers tend to be located in geographically remote clusters. For example, subscribers may live in several small towns in a rural setting or may live in different apartment houses in an urban setting.

Telephony networks in such applications incorporate a great deal of redundant cabling to effect the individual connections. This cabling requires more than electrical conductors. Various gain devices may be required along these conductors; usually at least one gain device is required for each subscriber line. Thus, the cabling costs increase dramatically as the number of subscribers increases. Moreover, in many situations, the traffic volume in such networks, as a percentage of maximum traffic capacity, is very low. Thus, the actual utilization of the telephone lines can become quite expensive and inefficient.

Concentrators enable an efficient utilization of data channels in digital data networks. Basically, a digital data network includes modulator/demodulator ("modem") circuits for enabling digital information to be transferred over a normal telephone network in an analog form. When several subscribers in one area require only low-speed data transfers, each subscriber is connected to a local concentrator at a particular location by means of two low-speed modems; one at the subscriber's location; the other at the concentrator location. The concentrator location will have one such low-speed modem for each incoming telephone line. A digital processing circuit converts the digital signals between the low-speed modems of the concentrator and a time multiplexed, high-speed, serial, digital pulse train that is applied to and received from a high-speed modem that is in a high-speed path to a data processing center. Oftentimes these concentrators are very sophisticated and an apparently large concentration can occur at such a point.

However, in many applications the actual concentration is less than 40:1. Moreover, this approach is not readily adapted for application to conventional, voice telephony. The high speed data networks require specially conditioned telephone lines that are expensive to utilize, and the required modems are expensive. The modems produce or respond to carriers held to a finite frequency band and digital processing circuits are, in effect, independent switches that can become quite complex and expensive. In addition, even if readily adapted to a telephony network, the economic benefit of substituting this type of a concentrator network at a remote location in a telephony system would not be economically justified by the cabling savings that would otherwise be provided.

Another approach that is applicable to a telephony network is to place remote port units at the center of the subscriber clusters and establish a reduced number of communications links, for example one to three links, between each of those clusters and a special unit that connects in place of one or more lines to the analog portion of the digital central office. However, it is difficult with this system to provide many of the maintenance functions that are provided in the conventional digital central office, such as disclosed in U.S. application Ser. No. 10,910.

One such maintenance function is a test call function that is described in U.S. patent application Ser. No. 10,910. In such a system, the maintenance processor and related circuitry are able to effectively disconnect two telephone lines from their respective subscribers and to complete a predetermined call from one such line to another through test access relays. This provides a very useful maintenance tool, especially for performing preventive maintenance and other diagnostic functions. In this system, however, all port group units are at the digital central office so the interconnection between the maintenance processor and related circuitry and the test access relays at the port group units and port circuits is easily achieved. There is also a single test call generator that, through the test access relays and other switching networks, provides all the test calls. However, this type of test call generator is not readily adapted to an application of remote port units. Any such application would require separate connections to the test access relays, with increased cabling costs. Moreover, various tones have to be produced and transmitted and the information necessary for controlling such tones is difficult to obtain.

The test call function was implemented in one system in which the special unit connected in place of one or more lines to the analog portion of the digital central office. Specifically, a test call control unit, including a test call generator, was connected to each special unit and was able to communicate through the special unit to the various connected remote port units to produce test calls of the type described in the aforementioned U.S. patent application Ser. No. 06/295,742. The tests were performed under manual supervision through an input/output device that connected to the test call generator. Thus, if more than one special unit were connected to the digital central office the test call function required plural test call generators and plural input/output devices.

This approach also isolated the test call generator from the remaining maintenance system, such as described in U.S. patent application Ser. No. 10,190. Therefore, it was not possible to perform those automatic diagnostic and testing functions that maintenance processors perform. Moreover, there is described in U.S. patent application Ser. No. 06/201,114 a system in which the special unit is called a digital satellite interface and comprises a digital data processing system for establishing communications with the remote port units through a series of messages between the call processing system and the digital satellite interface and between the digital satellite interface and the remote port units. That system has been designed to operate with low-cost microprocessors that operate as the call processing and maintenance processing systems operate. Moreover, the various functions have been allocated to minimize the load on those processing systems.

It is probable that routing the maintenance functions through the call processing system to the digital satellite interface would put an inordinate burden on the call processing system and, therefore, could cause telephone service to deteriorate. However, the maintenance functions are still highly desirable because they tend to minimize interruptions to telephone service.

SUMMARY OF THE INVENTION

Therefore, it is an object of this invention to provide a method and apparatus for testing remote port units through existing maintenance processing equipment at a digital central office.

Still another object of this invention is to provide a maintenance function for a telephony network that allows a single autotesting function to be performed and recorded on equipment that is currently available in the digital central office.

Still another object of this invention is to provide a maintenance system that facilitates error sensing and correction at remote port units, thereby to reduce service interruptions.

Yet still another object of this invention is to provide a telephony network in which digital satellite interfaces comprise data processing systems that can be initialized in a flexible manner.

Yet still another object of this invention is to provide a telephony network that includes a maintenance system for enabling a flexible recovery from errors at remote port units.

In accordnce with this invention, remote subsriber lines connect through a remote port unit and a communications link to an interface at a digital central switch. The interface for the digital central switch includes a first connection to port group highways through a switching matrix and a second connection to the call processing system that allows messages to be transferred between the interface and the call processing system. In addition, a maintenance bus interface interconnects the digital satellite interface with the maintenance processor in the telephony network, thereby to enable the transfer of messages between the maintenance processor and the digital satellite interface independently of the call processing system.

This connection enables the same maintenance processor that controls other portions of the telephony network to control the remote port units. Moreover, the connection facilitates the initialization of digital satellite interfaces by providing a path for control programs and data bases to the digital satellite interfaces. Finally, it provides a message reporting arrangement that allows various maintenance messages, including those from automatic test calls, to be routed to a common input/output device.

This invention is pointed out with particularity in the appended claims. The above and further objects and advantages of this invention may be better understood by referring to the following detailed description taken in conjunction with accompanying drawings.

BRIEF DESCRIPTION OF THE DRAWINGS

FIG. 9 depicts various messages that can be sent from a call processor to a digital satellite interface;

FIG. 10 depicts various messages that can be sent from a digital satellite interface to a call processor;

FIG. 14 is a detailed block diagram of the data paths for a buffer shown in FIG. 4;

FIG. 16 depicts various messages that can be transmitted from a digital satellite interface to a remote digital satellite unit;

FIG. 17 depicts various messages that can be transmitted from the remote digital satellite unit to the digital satellite interface;

FIG. 20 is a block diagram of a diagnostics circuit shown in FIG. 4;

FIG. 22, comprising

FIG. 23, comprising FIGS. 23A through 23C, is a detailed logic diagram of the diagnostics circuit shown in FIG. 20;

FIG. 24, comprising FIGS. 24A through 24C, depicts various messages that can be transmitted between the maintenance processor and the digital satellite interface;

DESCRIPTION OF AN ILLUSTRATIVE EMBODIMENT

A. Telephony Network

Figure 1:
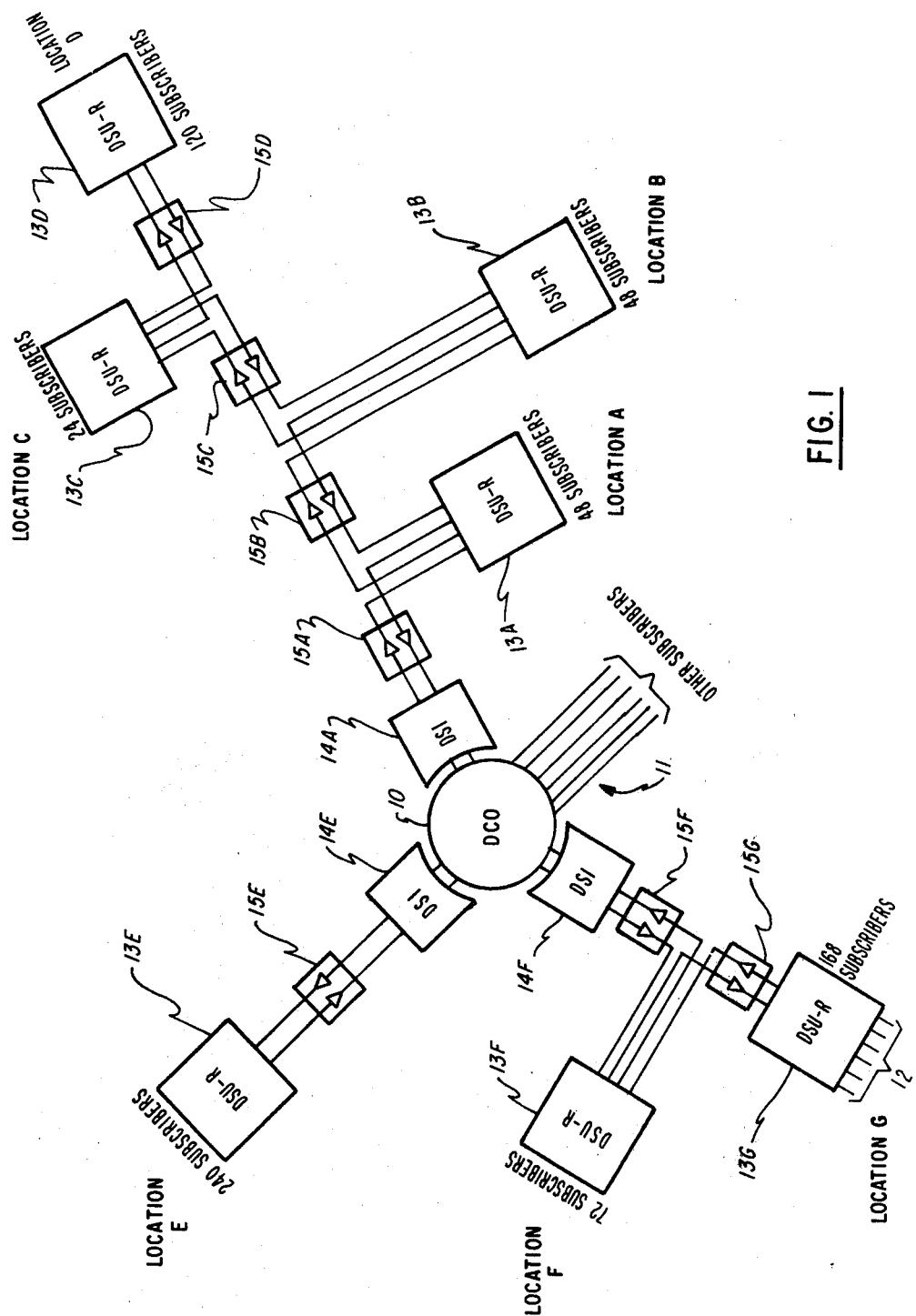
FIG. 1 is a block diagram of a telephony network constructed in accordance with this invention.

FIG. 1 depicts a telephony system that provides various levels of concentration. At the center of the telephony network shown in FIG. 1 is a digital central office (DCO) 10 of the type described in U.S. patent application Ser. No. 10,910 and also in U.S. patent application Ser. No. 924,883. A number of local telephone lines 11 emanate from the digital central office 10 and connect to various local subscribers in accordance with the foregoing applications.

This particular network depicts an embodiment of a system in which "remote" subscribers are clustered around various geographically remote locations A through G. A number of telephone lines 12 interconnect these remote subscribers at locations A through G with remote port units that comprise remote digital satellite units (DSU-R's) 13A through 13G respectively.

Each remote digital satellite unit 13 connects to and operates in response to the digital central office 10 through a digital satellite interface 14 and a multiple path communications link 15. For example, digital satellite interface 14A connects to remote digital satellite unit 13A through a communications link 15A. The other digital satellite units 13B, 13C, and 13D are then interconnected by communications links 15B through 15D, thereby to define a daisy chain connection from the digital satellite interface unit 14A. This type of connection would be particularly appropriate where clusters of remote subscribers were dispersed along a line radiating from the digital central office location. The digital satellite interface 14E, communications link 15E, and remote digital satellite unit 13E indicate a type of connection which might be particularly useful in an apartment building in an urban environment.

In the particularly described embodiment, each remote digital satellite unit can connect to as many as 240 subscriber telephone lines such as shown at location E, and each digital satellite interface can handle traffic from up to 240 subscribers. Some typical numbers of subscribers connected to each such remote digital satellite unit 13 are shown on FIG. 1. Moreover, up to 30 digital satellite interfaces 14 can connect to a single digital central office.

From a general standpoint, it can be seen from FIG. 1 that the cabling associated with such a network can be dramatically reduced. Each of the communications links 15 may contain one, two, or three data paths. Thus, there is a potential for a cable reduction from 80:1 to 240:1. The actual concentration that can be achieved depends upon the traffic density of the various remote subscribers and the capacity of the communications link 15.

As described later, the communications links 15 in this embodiment convey pulse code modulated signals over a time division multiplexed path. Each digital satellite interface 14 interfaces to the digital central office 10 and converts voice and supervisory information between the format of the digital central office 10 and the format of each communications link 15. The digital satellite interface 14 also reformats the supervisory and voice data signals and assigns a particular time slot, or channel on the communications link 15 to a particular remote subscriber when that telephone line is being used for a telephone conversation. The number of available channels on the communications link 15 normally is less than the number of subscriber lines.

Each remote digital satellite unit 13 provides an interface between the communications link 15 and the conventional telephone lines that emanate from that unit 13. It couples voice signals to and from the telephone, or subscriber, lines, produces sense supervisory information in response to activities by the subscriber, and responds to control supervisory information received from the communications link 15. In addition, the remote digital satellite unit 13 reformats the supervisory information and, in response to certain of the control supervisory information it receives, routes the information to the appropriate telephone line and also performs the analog/digital conversions that are necessary to receive and transmit analog voice signals over the telephone lines.

Figure 2:
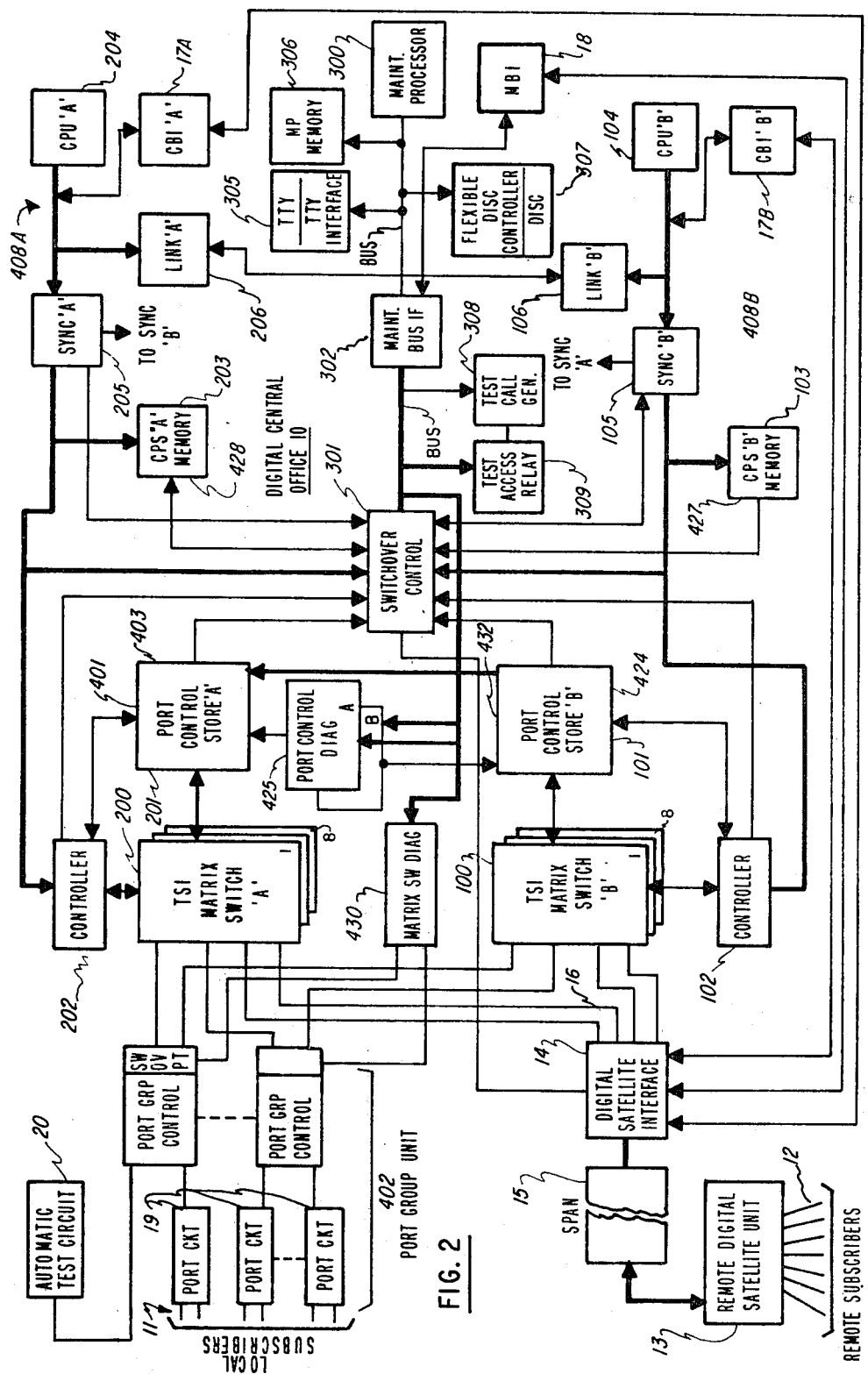
FIG. 2 is a more detailed block diagram of a digital central office in the telephony network shown in FIG. 1.

FIG. 2 depicts modifications to the telephony system disclosed in U.S. Application Ser. No. 10,910 and is taken from FIG. 4 in that disclosure. In addition, FIG. 2 discloses a single digital satellite interface 14, a communications link, called a "span", 15, and a remote digital satellite unit 13 with various telephone lines 12 emanating to a cluster of remote subscribers. Elements that are common to the disclosure in the above-identified applications retain the same reference numerals. Specifically, reference numerals in the range from 100 through 399 are found in U.S. Application Ser. No. 10,910, while reference numerals from 400 through 499 are found in U.S. Application Ser. No. 924,833. As their functions are known, only the interconnections to specific elements are set forth. Specifically, the digital satellite interface 14 connects to this system at four points. First, there are port group highway connections 16 that interconnect the digital satellite interface with port group highways from the TSI matrix switch A 200 and the TSI matrix switch B 100. This enables the digital satellite interface 14 to transmit voice and sense supervisory information to and receive voice and control supervisory information from the port group highway signals in the format of the highway.

A second connection is to the call processing systems by means of a call processor bus interface (CBI). Specifically, a CBI "A" 17A establishes a communications path between the digital satellite interface 14 and CPU "A" 204, while CBI "B" establishes a communications path between the digital satellite interface 14 and the CPU "B" 104. Each CBI 17 can connect to a pluality of other digital satellite interfaces (i.e., up to a total of 20 in one embodiment). Each call processing bus interface 17 modifies data between a format that is compatible with the corresponding call processor 408 and the digital satellite interface 14. Each CBI 17 polls its corresponding digital satellite interfaces 14 for requests for access to its call processing unit 408. Moreover, each CBI 17 detects certain errors and can mask particular digital satellite interfaces 14 thereby to inhibit any operation through those interfaces.

A third connection between the digital satellite unit 14 and the digital central office 10 is by means of a maintenance bus interface (MBI) buffer 18 that establishes a communications path between the digital satellite interface 14 and the maintenance processor 300. The MBI buffer 18 also connects to each digital satellite interface that connects to the call processing bus interfaces 17. The MBI buffer 18 provides a conversion between formats of signals on the bus of the maintenance processor 300 and at the digital satellite interface 14. It modifies timing, expands addressing, and also performs a polling operation to determine when any of the connected digital satellite interfaces 14 wishes to communicate with the maintenance processor 300.

The fourth connection between the digital satellite interface 14 and the digital central office 10 is to the switchover control 301 that establishes which of the two call processing systems actually controls the telephone network.

These first three basic connections provide cooperative communications paths that enable the digital satellite interface 14, span 15, and remote digital satellite unit 13 to operate in response to control of the call processing systems 408A and 408B and the maintenance processor 300 shown in FIG. 2. However, this operation is accomplished with minimal changes to the physical circuits. The primary changes exist in control functions that are utilized by the call processing systems 408 and the maintenance processor 300. Thus, the existing capabilities of the call processing systems 408 shown in FIG. 2 are retained and are utilized in connection with this invention, thereby to further increase call processing efficiency and reduce costs.

As disclosed, a port group unit 402 interconnects the digital central office 10 shown in FIG. 2 to various local subscriber lines 11 through a prt circuit 19. However, in this particular embodiment and in accordance with one aspect of this invention, an automatic test circuit 20 that tests the circuitry at the remote digital satellite unit 13 in cooperation with the maintenance processor 300 connects to trunk interface circuitry that connects to the port group control.

B. Communications Link 15

Figure 3:
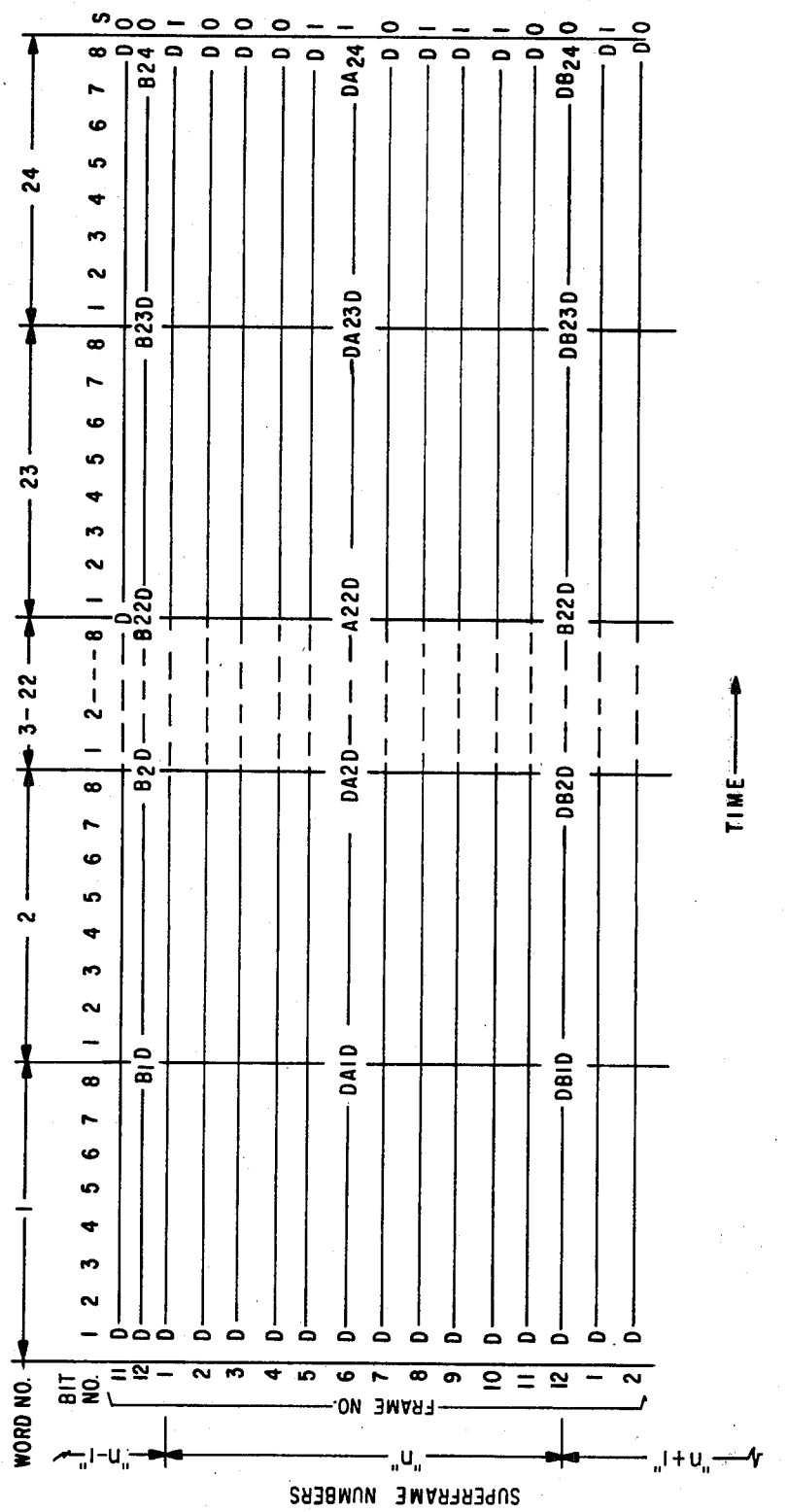
FIG. 3 is a diagram that depicts signal organization over a communications link shown in FIGS. 1 and 2.

The specific structure of various elements shown in FIG. 2 depends, in part, on the nature of the signalling across the span 15. Therefore, it will now be helpful to discuss the span 15 in more detail. A span is a known, differentially driven, electrical connection between two geographically remote points. As described later, the span 15 may include two or three independently operating span circuits or paths. Each span circuit defines a number of time domain channels. The specific organization and meaning of data signals on the channel is set forth in FIG. 3, that depicts the organization of a single "superframe" (i.e., superframe "n") that is passed over one span circuit as a serial bit stream together with portions of prior and following superframes "n−1" and "n+1". Each superframe comprises 12 successive frames (Frame numbers 1 through 12). In turn, each frame comprises 193 bits that form 24 8-bit words and one synchronizing bit. In accordance with this invention, the time interval for each "word" corresponds to a "channel"; thus, word number 1 corresponds to channel 1; and word 24, to channel 24. Moreover, as depicted at the right of FIG. 3, each frame terminates with the synchronizing bit and the pattern of synchronizing bits for a superframe is predetermined thereby to enable losses of synchronization to be readily detected. In this figure, "D" represents a signal that is interpreted as voice data.

Two of the twelve frames convey information corresponding to supervisory information and commands across the span. This is accomplished by a "bit stealing" technique that is implemented during the sixth and twelfth frame times. During the sixth frame, the least significant bit (bit 8) in each of words 1 through 24 is encoded as an "A" signalling bit in response in response to sense supervisory information from the remote digital satellite unit 13 for the subscriber assigned to the corresponding channel. For example, if a subscriber goes off-hook and is assigned channel 7, off-hook information will be transmitted during the A7 bit time (i.e., the least significant bit of word number 7 in the sixth frame). Thus, during the sixth frame, sense supervisory information for 24 subscribers can be transmitted from a remote digital satellite unit 13 to the digital satellite interface 14.

The least significant bits in each of words 1 through 24 during the twelfth frame constitute "B" signalling bits. In this embodiment, the "B" signalling bits are utilized for conveying 24-bit messages between the digital satellite interface 14 and its remote digital satellite units 13.

All the information in the data words, including the least significant bits in each word during the sixth and twelfth frames, are also conveyed to the port group highways 16. Obviously, there may be errors during the sixth and twelfth frames, but the error produces no significant degradation in the quality of the voice that is ultimately heard by the subscriber.

Thus, FIG. 3 depicts a specific embodiment of a time-division multiplexed system that defines a number of channels. As described later, each of these channels is then assigned to a particular subscriber line when that subscriber line is in use. Yet this provides a reasonably rapid transmission technique for the A and B signalling bits as, in one specific embodiment in which each frame requires 125 microseconds, "A" and "B" bit signalling rates approach 2,000 bytes per second.

Figure 4:
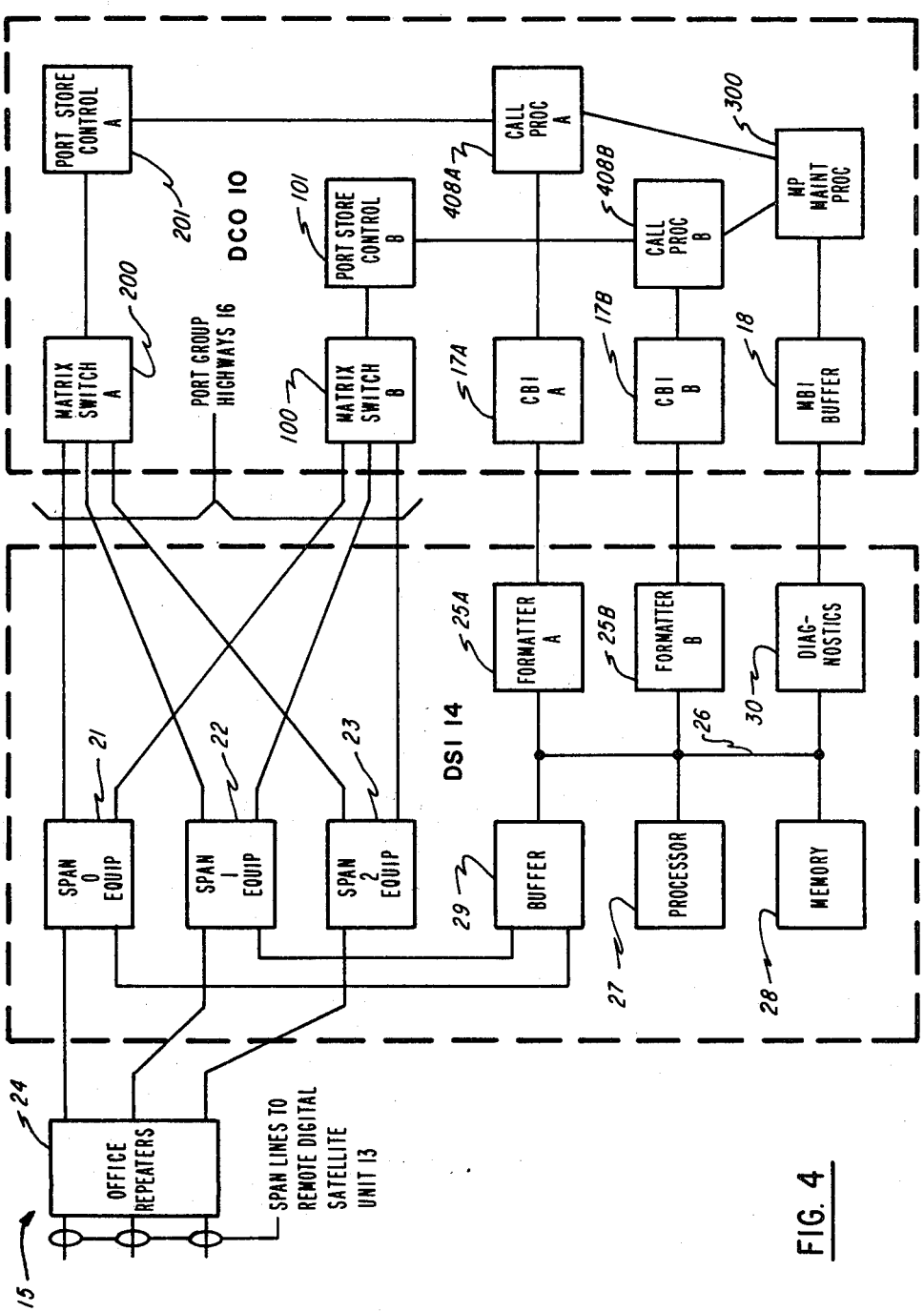
FIG. 4 is a block diagram of a typical digital satellite interface and its connection to the network that is depicted in FIGS. 1 and 2.

Circuitry along this line is denoted as span equipment. FIG. 4 depicts three separate spans 15 that are coupled to span equipment in the DSI 14. Specifically, digital satellite interface 14 contains span 0 equipment 21, span 1 equipment 22, and span 2 equipment 23. Each one of the span equipments 21 through 23 connects to both the TSI matrix switch A 200 and the TSI matrix switch B 100.

Each item of span equipment comprises three functional modules: a span transmitter, a span receiver, and a span interface. The transmitter accepts data from the port group highway connection 16 and formats that data for span compatibility, adds the synchronizing pattern shown in FIG. 3, and routes the information to the span interface for subsequent transfer over office repeaters 24 (i.e., amplifying circuits) that drive the spans 15. The span receiver synchronizes incoming data from the span interface and converts it into a rate and form that are compatible with the port group highway connection 16. The span interface also provides timing for the span equipment and proper signal levels among the digital satellite interface 14, the port group highway connection 16, and the office repeaters 24.

More specifically, a span transmitter synchronizes the equipment to the digital central office 10, formats the signals on the port group highway connection 16 into the span format, inserts the correct synchronizing bit at the end of each frame to achieve the correct synchronizing pattern for each superframe, and then routes the data to the span interface for subsequent transmission over the span 15. The span receiver synchronizes the incoming span data and formats the data for compatibility with the port group highway connection 16. It also routes voice data and supervisory data onto the port group highway connection 16. The span interface interconnects the digital satellite interface 14 to both the port group highway connection 16 and to the office repeaters 24. The circuitry may also contain bit error comparators. Thus, each span equipment provides a path between the TSI matrix switches 100 and 200 and the spans 15.

To facilitate an understanding of this invention, it will now be helpful to describe, in general terms, the construction and operation of the various circuits that establish various communications paths, namely: (1) the call processor-digital satellite interface path; (2) the digital satellite interface-remote digital satellite unit path; and (3) the maintenance processor-digital satellite interface path.

C. Call Processor-Digital Satellite Interface Path

The call processor-digital satellite interface path includes one of the call processor buffer interfaces 17A and 17B and the respective call processing systems 408A and 408B as shown in FIG. 4. Independently operable formatter circuits 25A and 25B in the digital satellite interface 14 connect to the interfaces 17A and 17B respectively and complete the paths to a busing structure 26 associated with a controlling processor 27, a memory 28 that is utilized by the processor 27, and a buffer 29. The buffer 29 is part of the communications path between the digital satellite interface 14 and corresponding remote digital satellite units 13. More specifically, the buffer 29 acts as an input/output interface between the bus 26 and the span equipments 21 through 23. A dignostics circuit 30 also connects to the bus and is described later in connection with the maintenance processor-digital satellite interface path.

Figures 1, 27:
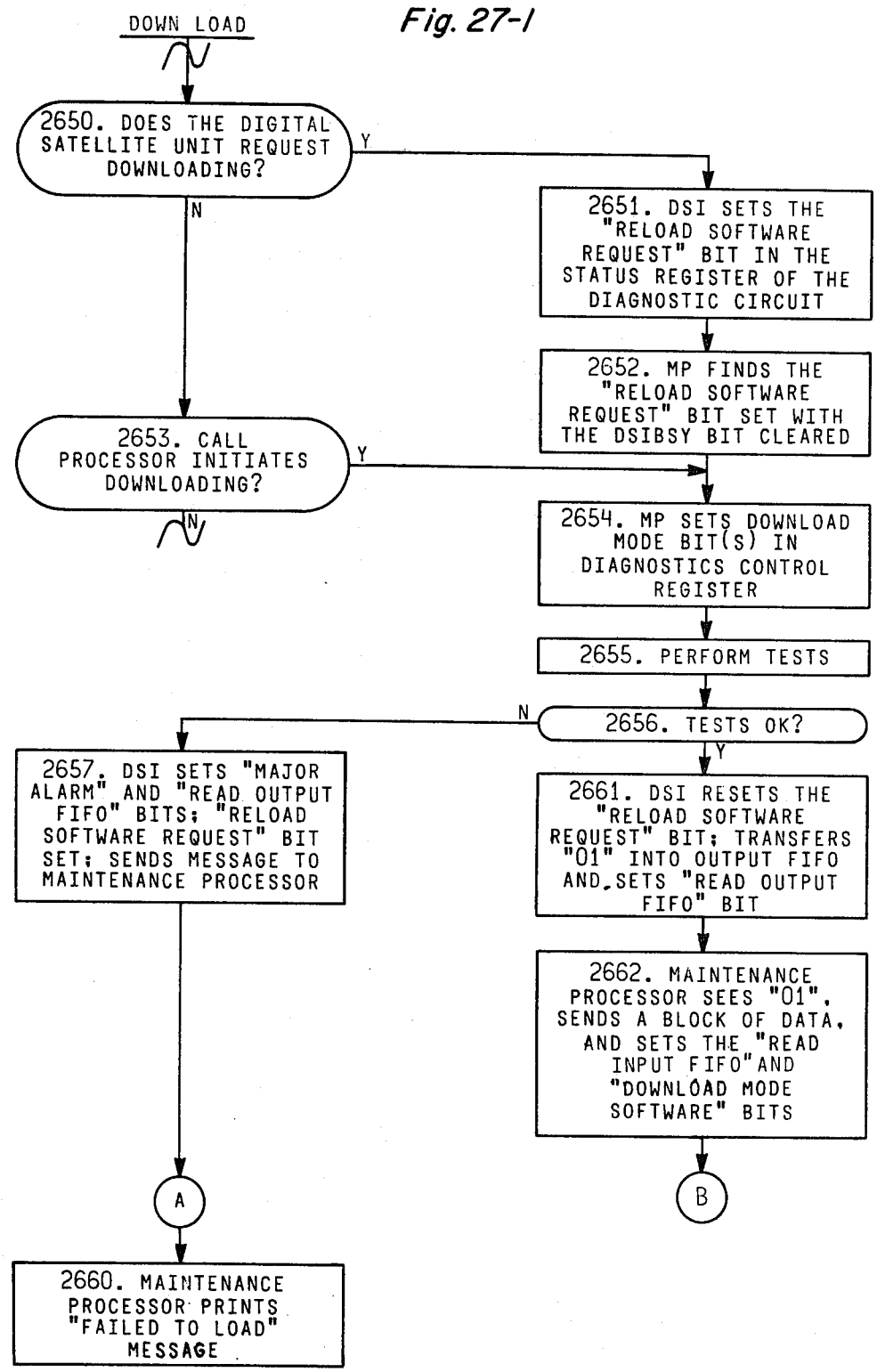
FIG. 27, together with FIGS. 27A through 27C, depict various control programs used in transferring programs and data to the digital satellite interface.
Figures 2, 27:
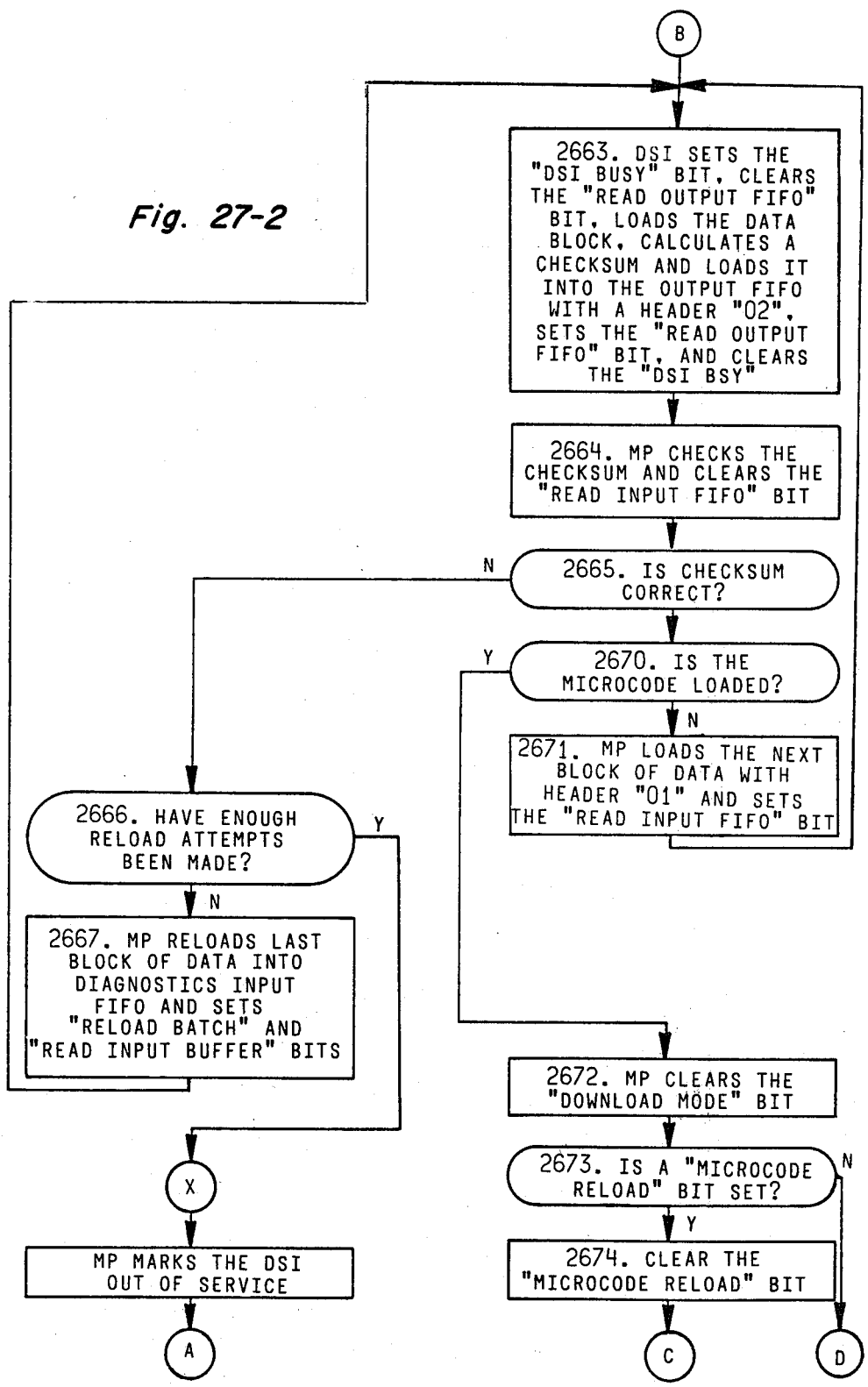
Figures 3, 27:
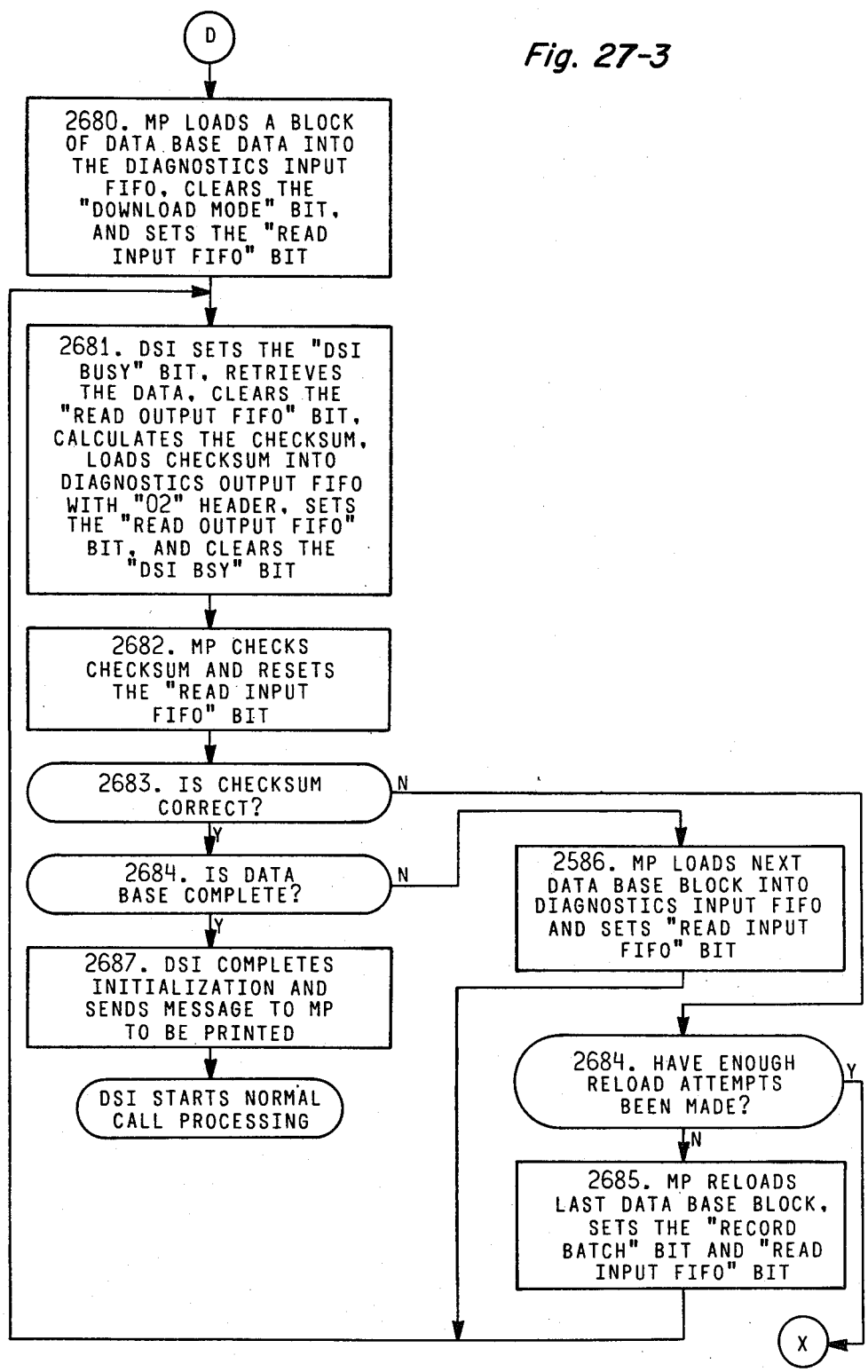
Figures 1, 27A:
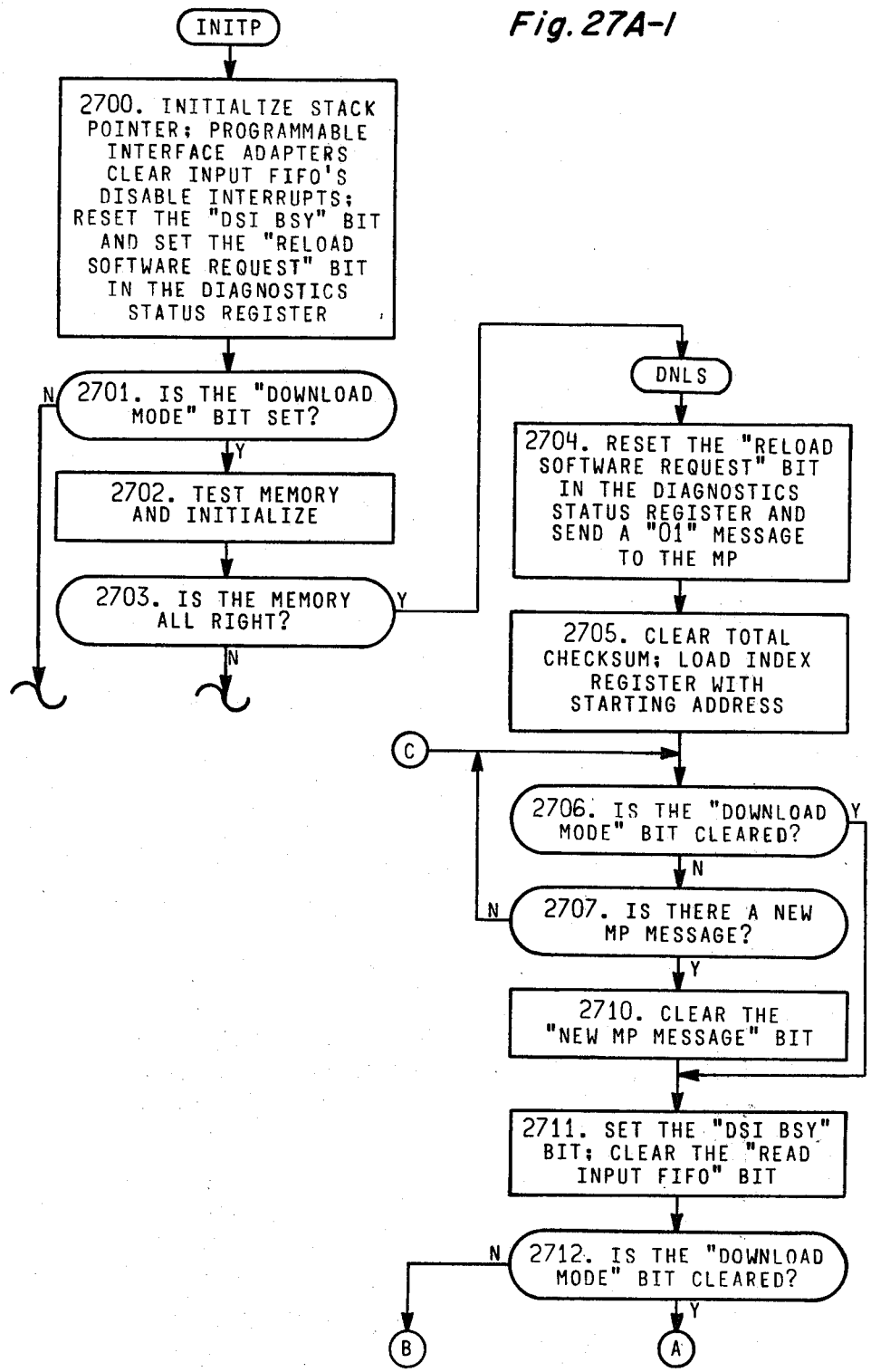
Figures 2, 27A:
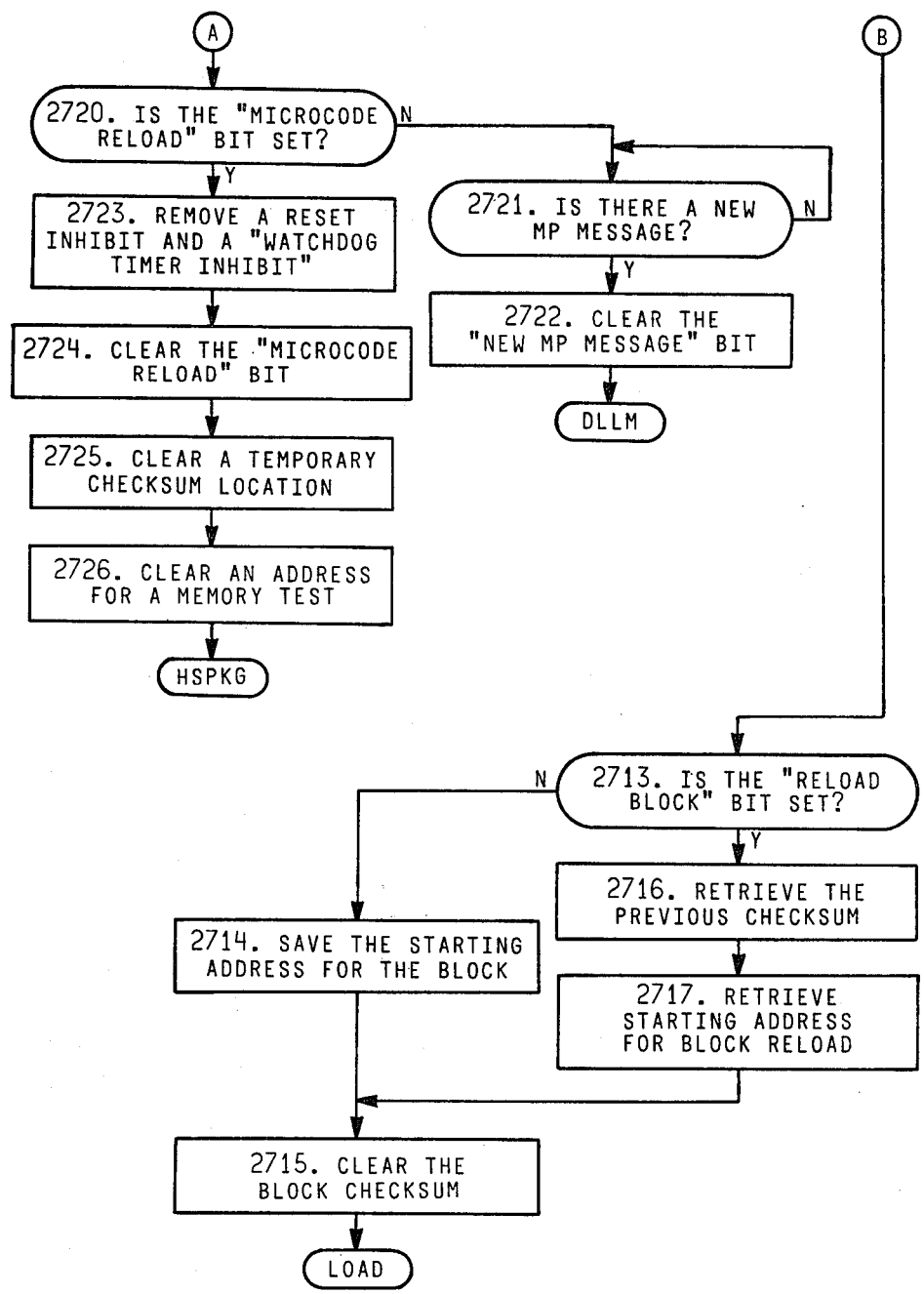
Figures 3, 27A:
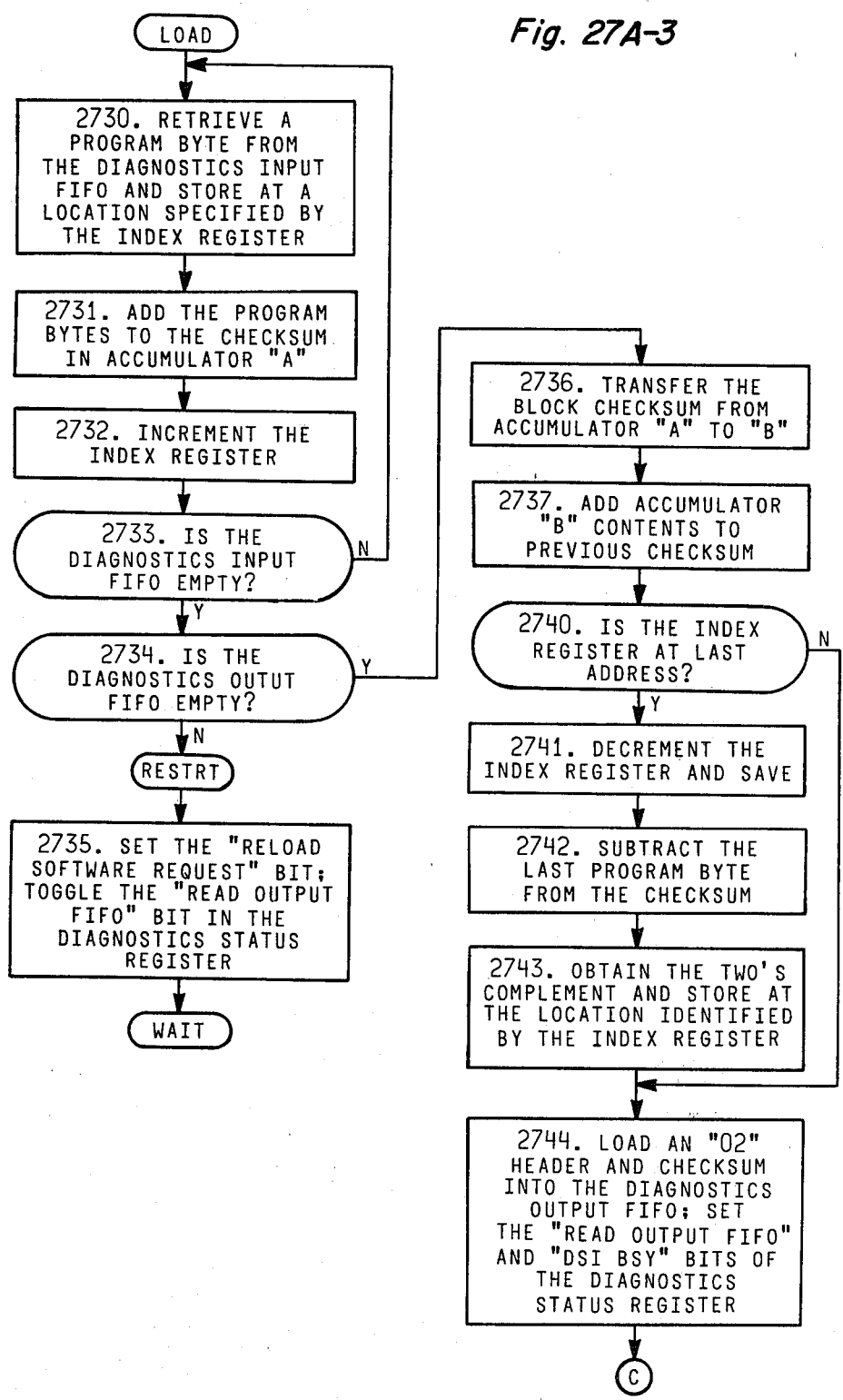
Figures 1, 27B:
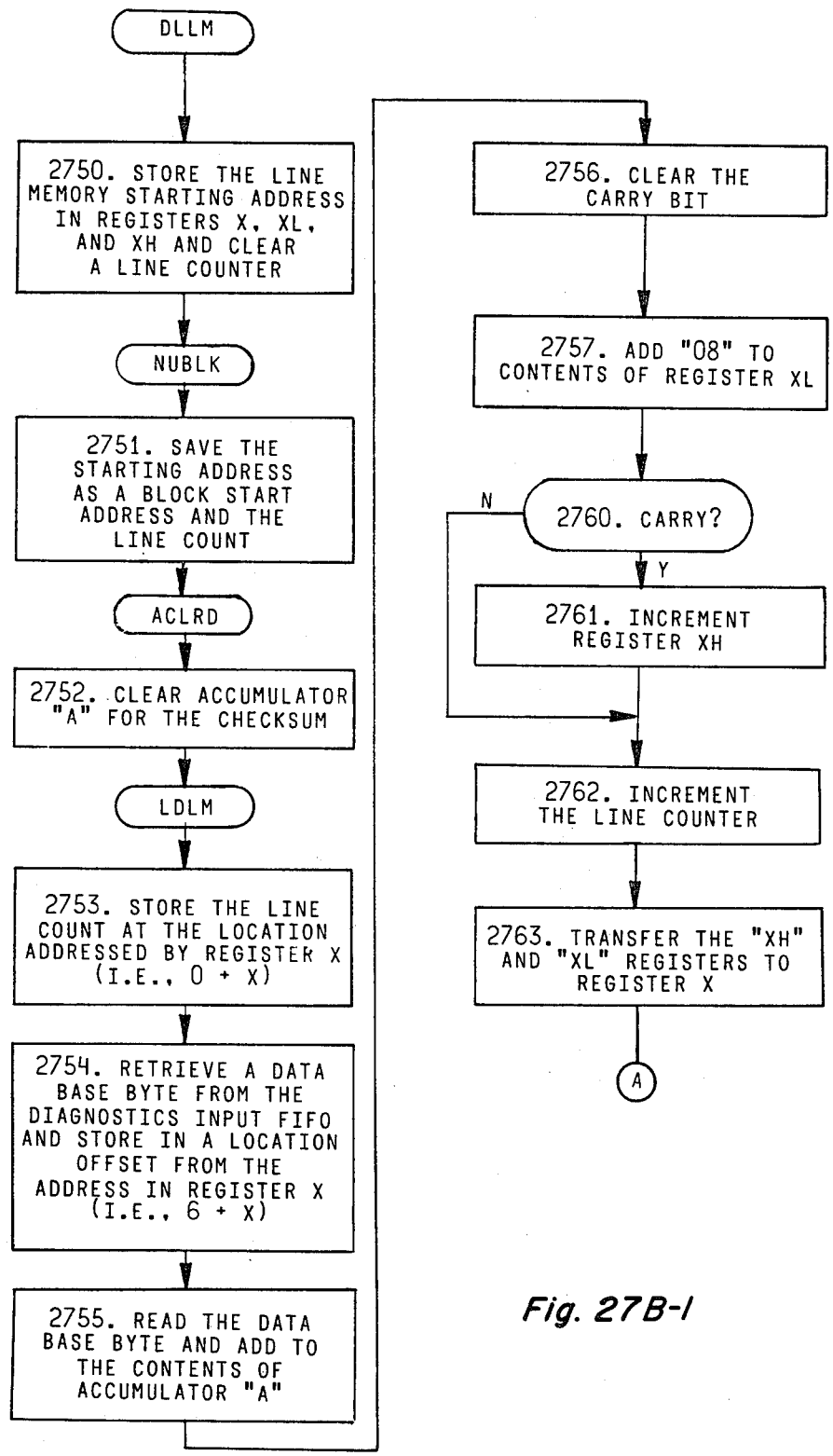
Figures 2, 27B:
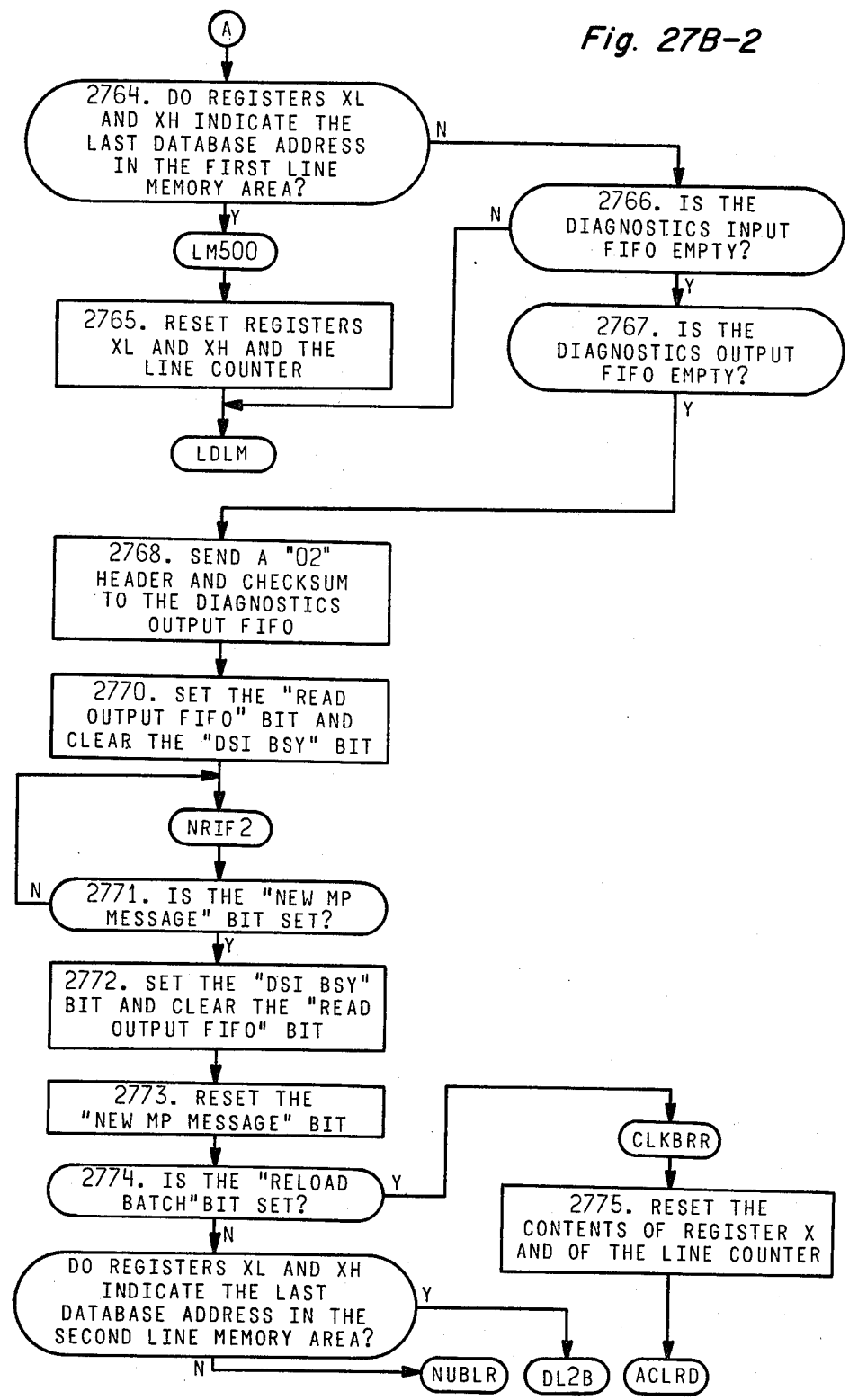
Figures 1, 27C:
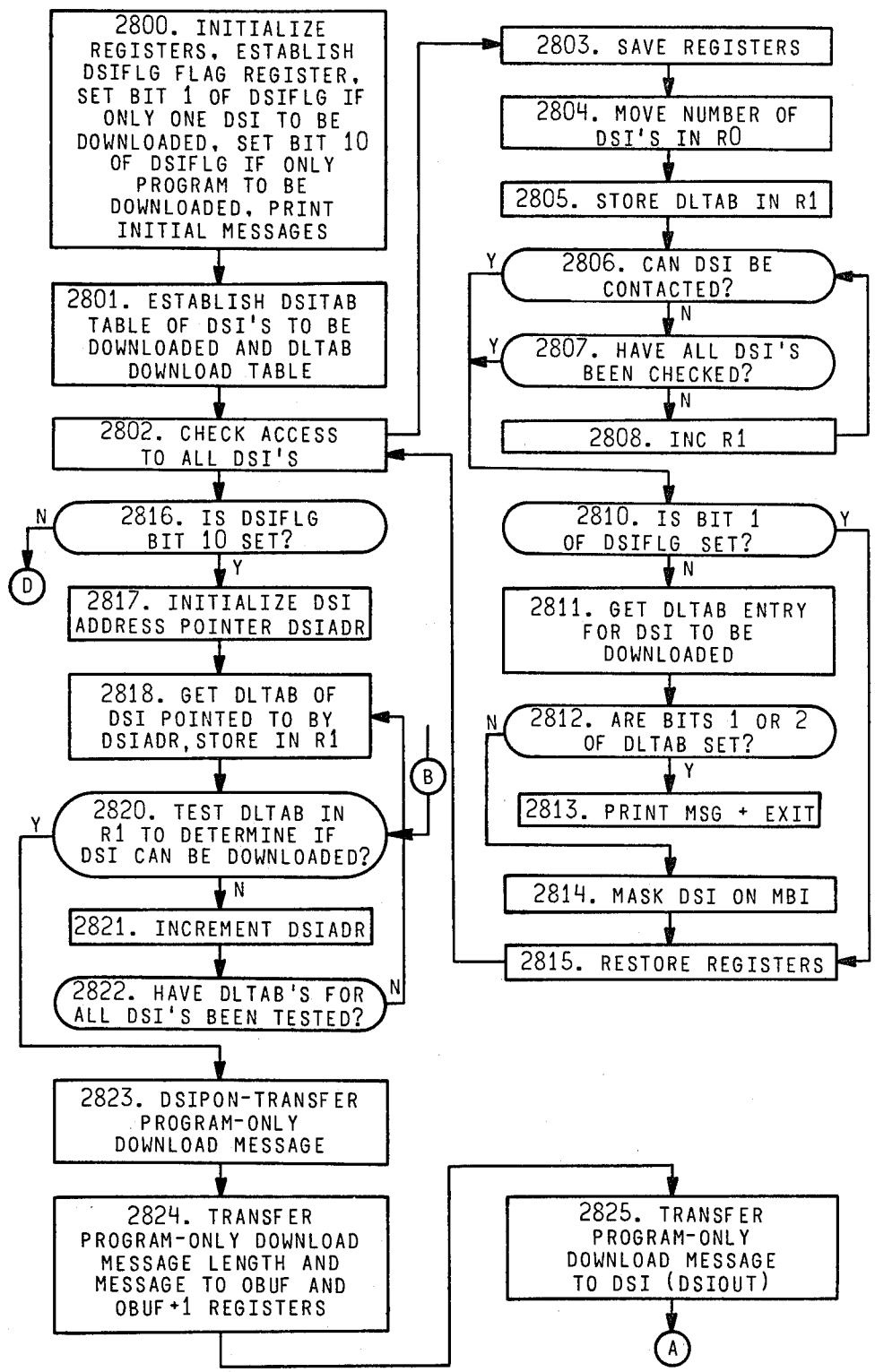
Figures 2, 27C:
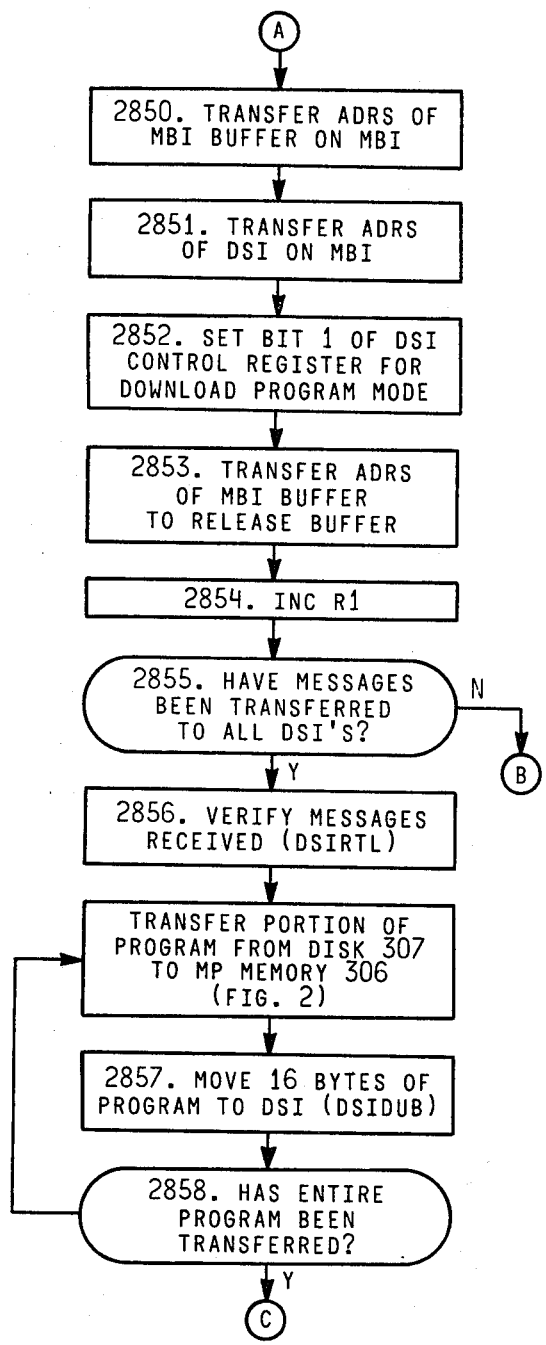
Figures 3, 27C:
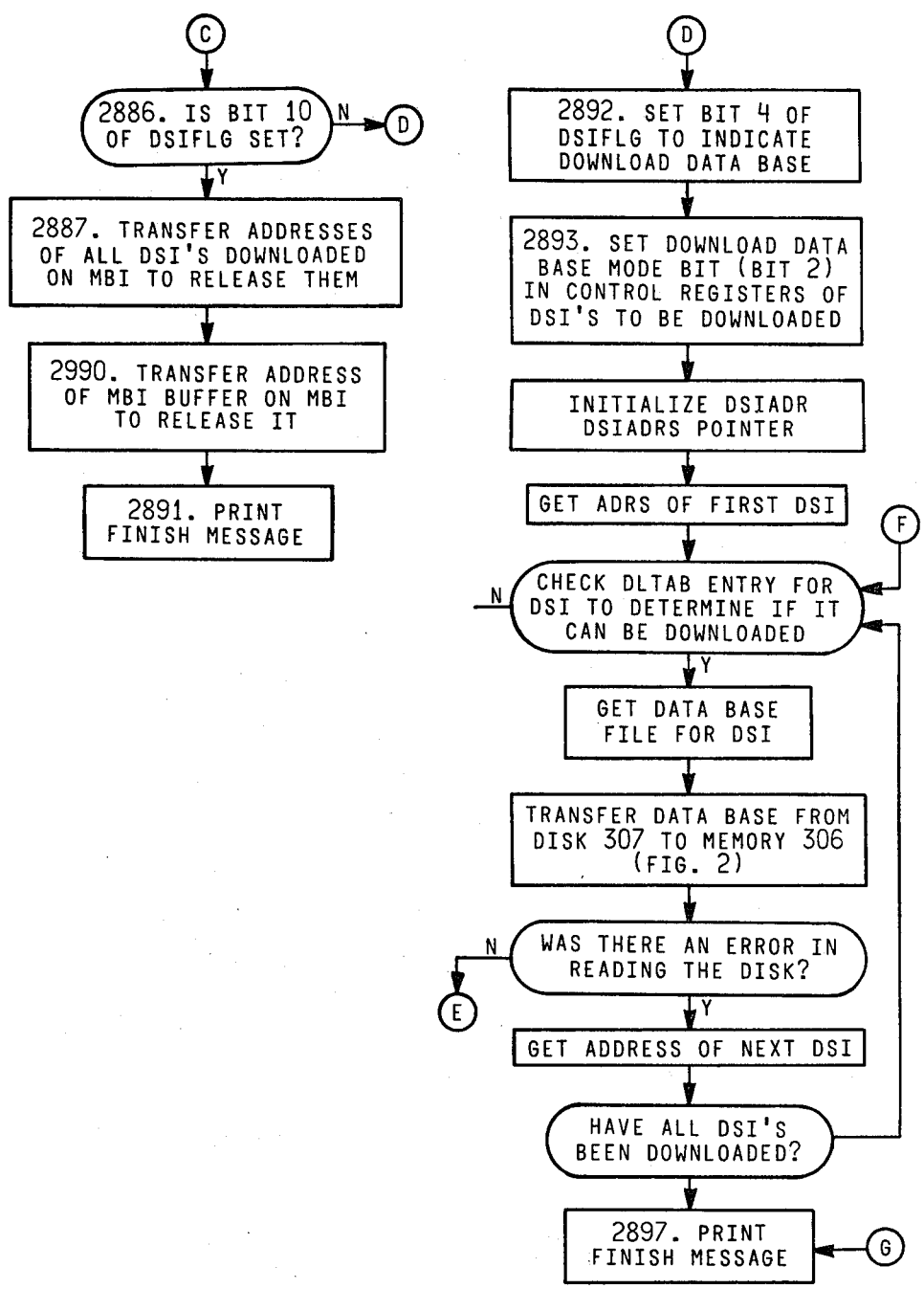
Figures 4, 27C:
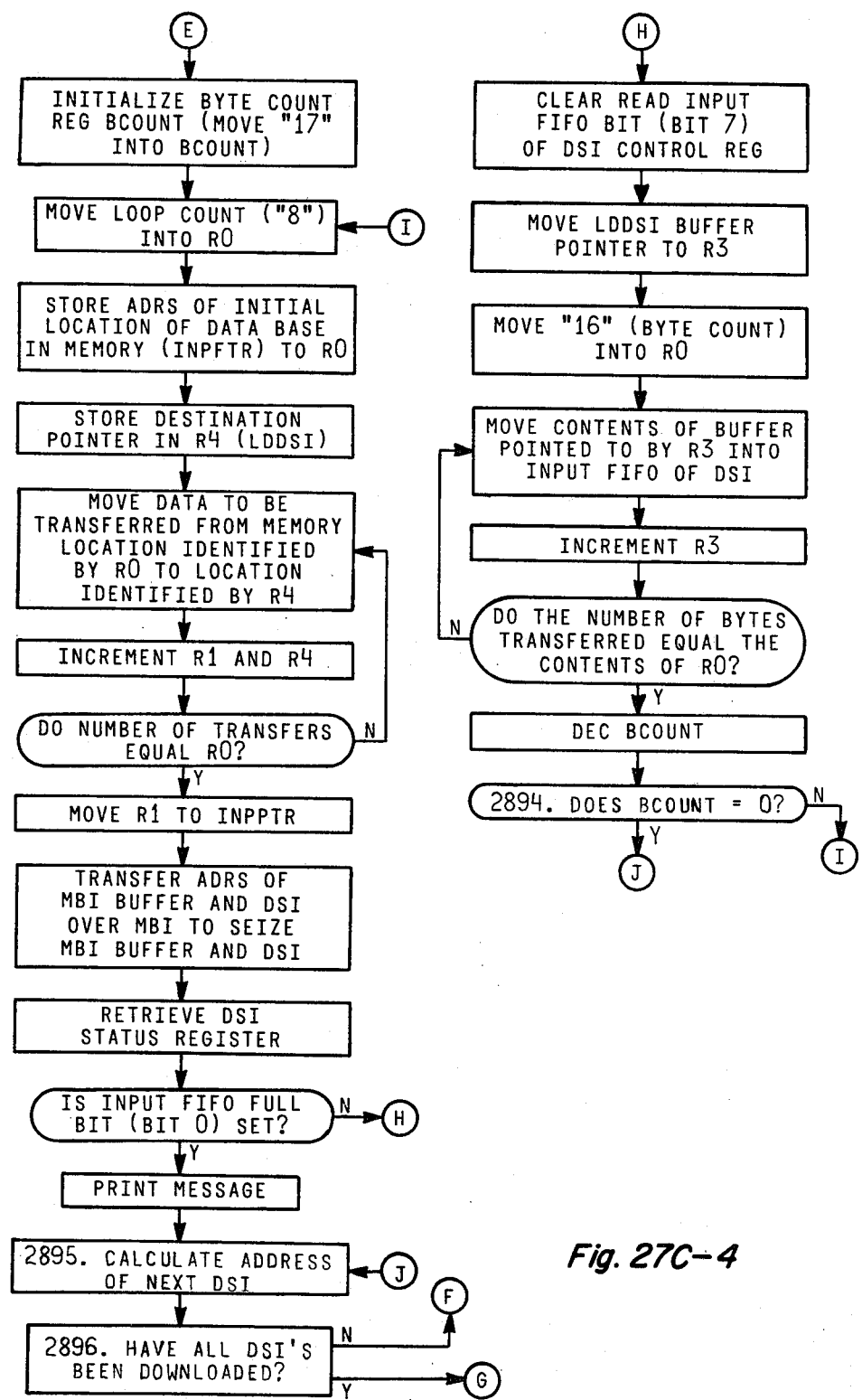
Figures 5, 27C:
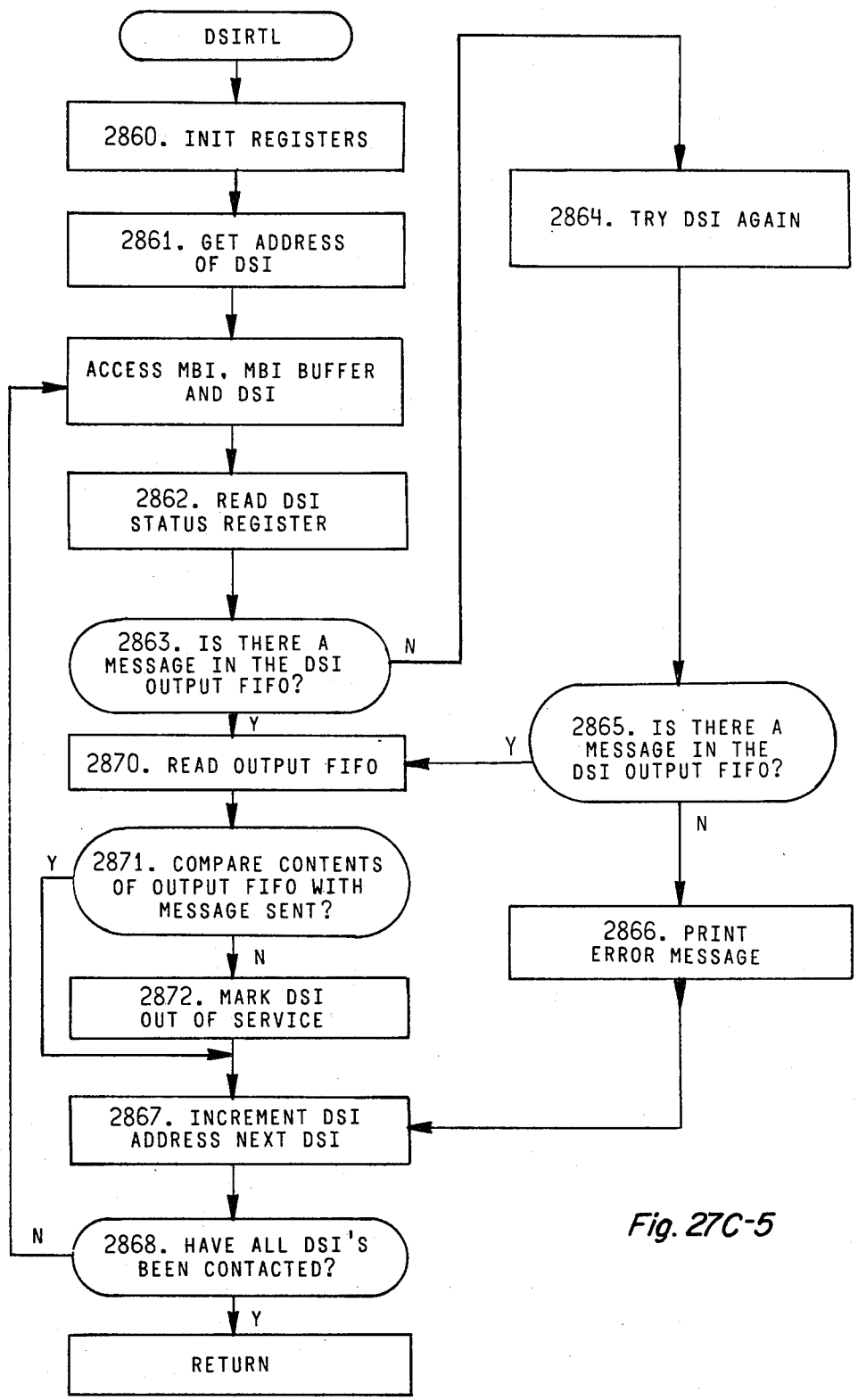
FIG. 5 is a detailed block diagram of the data paths in a call processor bus interface shown in FIG. 4.
Figures 6, 27C:
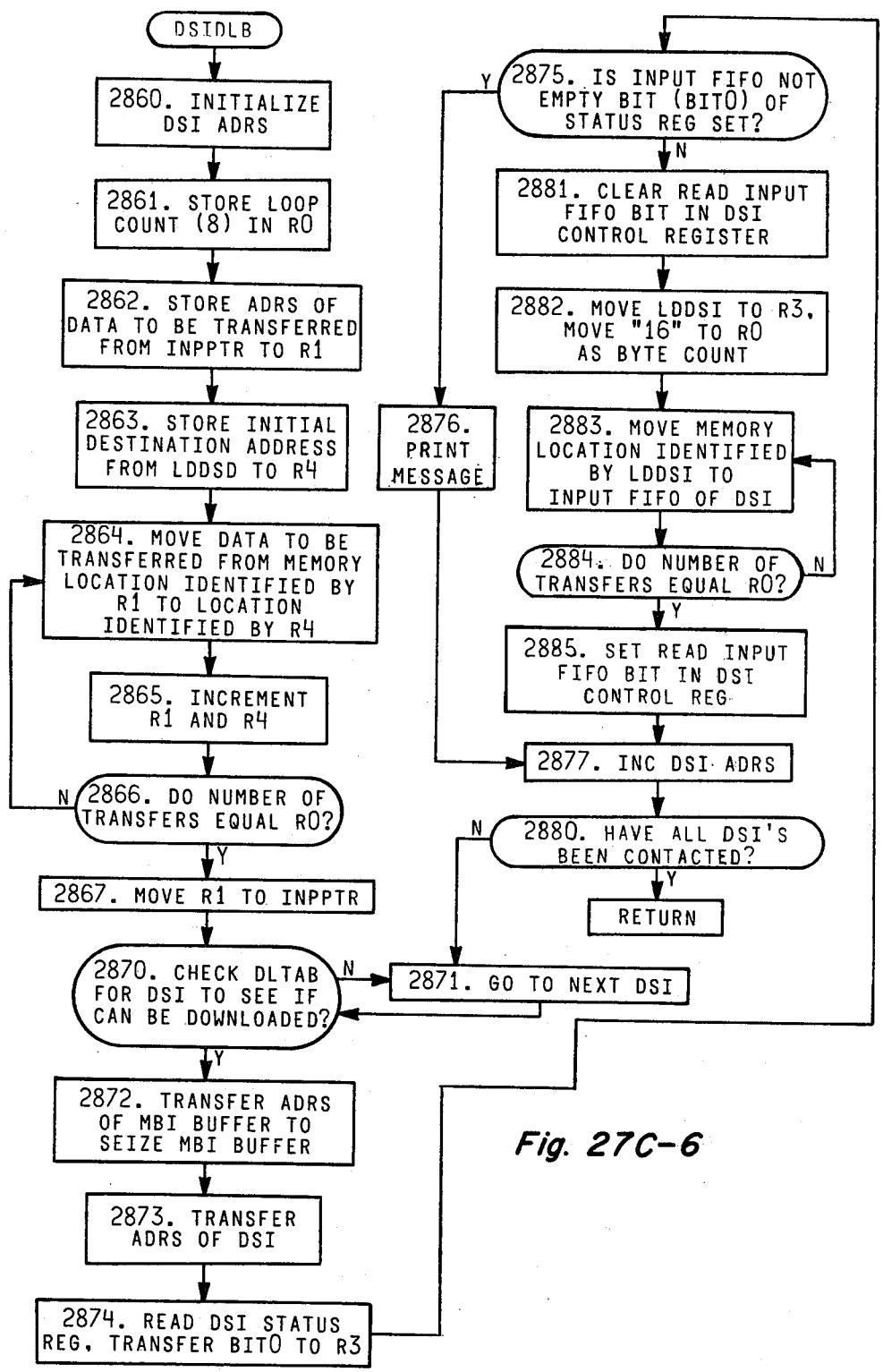

FIG. 5 depicts one call processor bus interface (CBI) 17. It includes receivers-drivers 1710 that connect to the bus from a corresponding one of the call processors 408A and 408B and bus receivers 1711 and bus drivers 1712 that connect to a corresponding one of the formatters 25A or 25B. Each call processor bus interface 17 extends the corresponding call processor bus to the corresponding formatter. Address signals are coupled to an address latch 1713 and selectively coupled to the drivers 1712 through a multiplexer 1714 if the address corresponds to a location associated with the specific digital satellite interface 14. Moreover, data from a call processor 408 is routed from the receiver-drivers 1710 through the multiplexer 1714 to the bus drivers 1712. Other circuitry establishes various delays and controls to enable the communications. If data is to be retrieved, the data is received at the receivers 1711 and routed to the receivers-drivers 1710. A parity circuit 1715 monitors parity errors.

In addition to the foregoing, each CBI 17 contains a counter 1716 that provides polling of the various plural interfaces 14 that may connect to the CBI 17 through drivers 1717. Polling occurs when a call processor 408 is not communicating with that CBI 17. If a digital satellite interface requests service, the information is routed from receivers 1711 to a status latch 1718 that is periodically interrogated by the respective call processor 408.

It also is possible to "mask out" a specific interface 14. A mask random access memory (RAM) 1720 can be loaded with an appropriate mask bit through the receiver-drivers 1710 and a multiplexer 1721. Each time the counter 1716 identifies an interface during polling, the number is sent through the multiplexer 1721 and the mask RAM 1720 generates a MASK signal if the corresponding interface has been masked out. This masking, however, does not inhibit communications between the interface 14 and each call processor 408.

Figure 6:
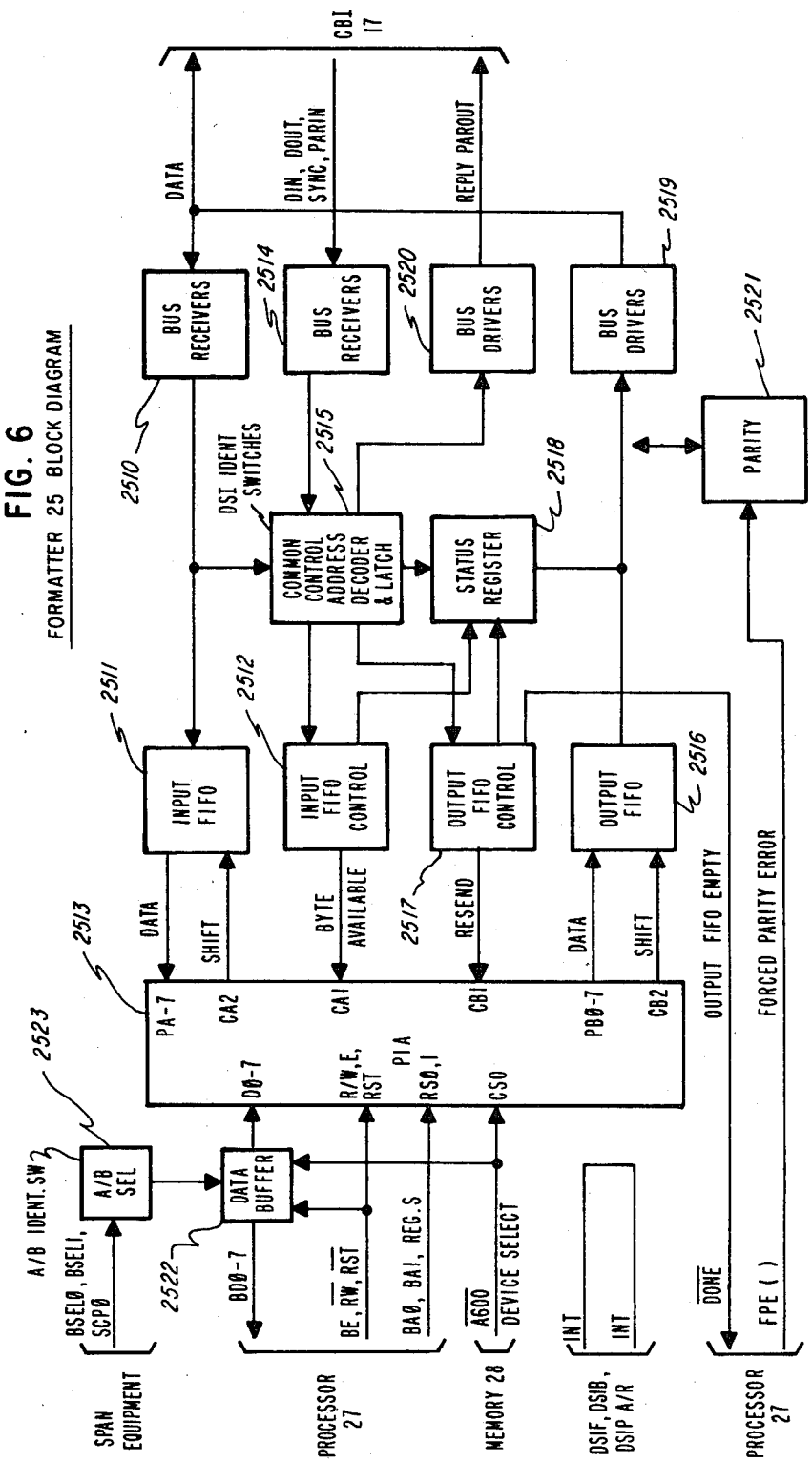
FIG. 6 is a detailed block diagram of the data paths in a formatter shown in FIG. 4.

As previously indicated, a formatter 25, as shown in FIGS. 4 and 6, receives data from a call processor and transfers it to the processor 27 in FIG. 4 and transfers data from the processor 27 to the call processor. Communications through a formatter 25 are in the form of messages. Incoming messages are received from the bus drivers 1712 in FIG. 5 by bus receivers 2510 in FIG. 6. These messages are transmitted serially by 8-bit byte and are transferred into a first-in/first-out memory (FIFO) 2511. An input FIFO control 2512 controls transfers into the input FIFO 2511 from bus receivers 2510 and out to a standard programmable interface adapter 2513. Whenever a call processor 408 sends a message to the interface 14, it addresses the corresponding input FIFO 2511 and sends the data to be loaded in the input FIFO 2511 with corresponding control signals that are received in bus receivers 2514 and coupled to common control, address decoder and latch circuitry 2515. The input FIFO control 2512 responds by shifting data into the input FIFO 2511. As is known, data being input to such a FIFO automatically shifts to the output. When a data byte is at the output of the input FIFO, the input FIFO control 2512 generates a BYTE AVAILABLE signal to an input of the programmable interface adapter 2513 and thereafter the information is shifted from the input FIFO 2511 into data inputs of the programmable input adapter 2513 by means of SHIFT signals.

When a message is to be transferred to a call processor 408, it passes through an output FIFO 2516 under the control of an output FIFO control circuit 2517. When the output FIFO 2516 is empty, the control 2517 transmits a RESEND signal to the programmable interface adapter 2513. As a message is sent to the output FIFO 2516 over data lines, SHIFT signals are also sent. After the message is sent, the output FIFO control 2517 terminates the RESEND signal. In addition, the output FIFO control 2517 sets a SERVICE REQUEST bit in a status register 2518.

Each call processor 408 periodically addresses a status register 2518 in each formatter 25 and reads the status register through bus drivers 2519 along with control signals that are passed through bus drivers 2520. When the call processor 408 determines that the output FIFO 2516 contains a message, it addresses the output FIFO 2516 and reads successive message bytes as they are presented under the control of the output FIFO control 2517. When the message has been completed, the output FIFO control 2517 asserts the RESEND signal, thereby to enable another message to be sent.

As formatters 25 are included in each of several digital satellite interfaces that can connect to a call processor bus interface, a call processor 408 communicates with a specific formatter 25 by first identifying the digital satellite interface and then using common addresses to address the formatter. Thus, after the particular digital satellite interface has been selected, only the formatter in that interface will respond to subsequent signals even though the specific formatter address is common to all of the formatters. This condition exits until the call processor 408 transmits another message that unlatches and, thereby, "deselects" or releases the digital satellite unit.

A parity circuit 2521 checks all addresses and data to detect parity errors and set a parity error bit in the status register 2518.

A data buffer 2522 connects between the processor 27 and the programmable interface adapter 2513. It contains various connections to the processor 27 and the memory 28 that enable the programmable interface adapter 2513 to perform its control operations.

When the formatter is used in a network constructed in accordance with FIG. 2, one or the other of the call processing systems, identified as the "A" or "B" system, actually controls switching. An A/B selection circuit 2523 includes an A/B identification switch that is set in accordance with the connection of a formatter 25 to either the "A" or "B" call processor. The processor 27 will transfer data to the output FIFO's 2516 in both formatters 25A and 25B in FIG. 4. However, it will respond only to the formatter that is connected to the selected call processor 408A or 408B. Specifically, a SELECT A/B signal from the switchover control 301 in FIG. 2 and the span equipment appears as a BSEL0 signal in FIG. 6. This signal, when asserted, enables the data buffer 2523 in formatter 25A and disables the data buffer in formatter 25B so the "A" system controls call processing. When the BSEL0 signal is not asserted, the "B" system controls call processing. If span 0 span equipment 21 is removed, an SCP0 signal will be asserted and a BSEL1 signal, from span 1 equipment 23 which carries the same information, is utilized.

Figure 8:
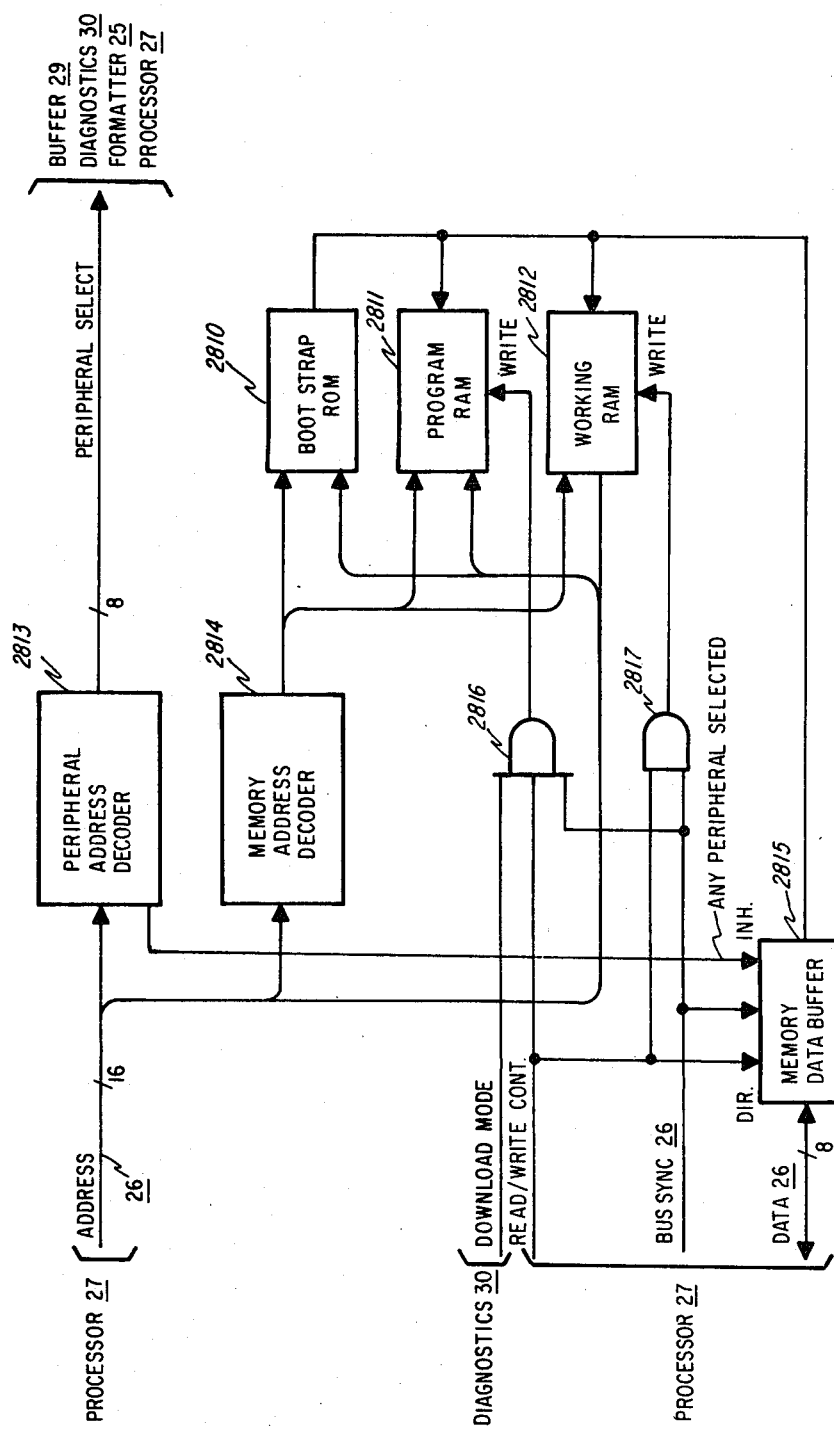
FIG. 8 is a detailed block diagram of the data paths in a memory shown in FIG. 4.
Figures 7, 27C:
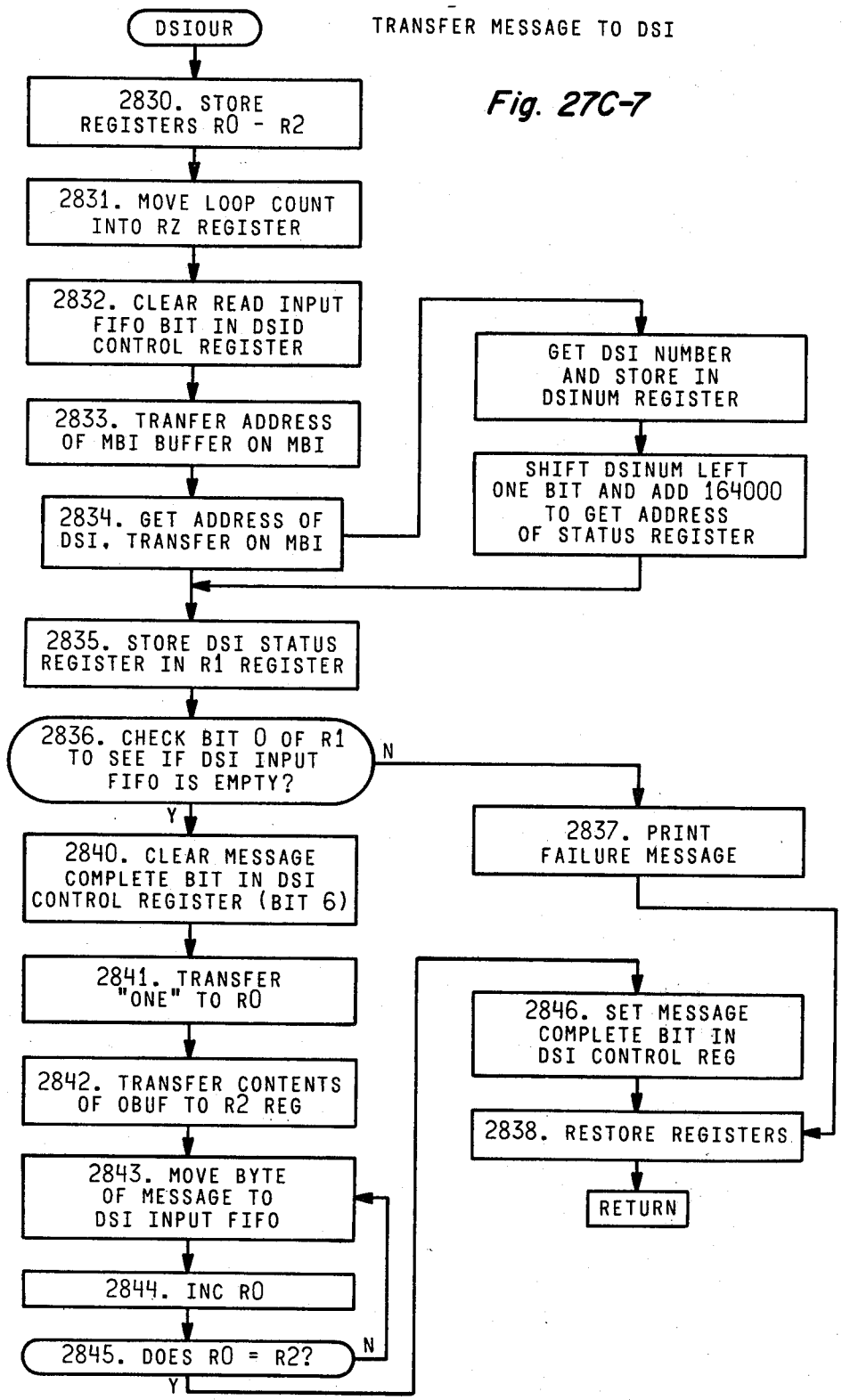
FIG. 7 is a detailed block diagram of the data paths in a processor shown in FIG. 4.

Communications between a call processor and the interface 14 shown in FIG. 4 also require interaction of the processor 27 and the memory 28. The processor 27 and memory 28 comprise a conventional, microprogrammed digital computer system. The processor 27 is shown in FIG. 7 and the memory 28 in FIG. 8. The processor 27, in this particular embodiment, is a Motorola 6800 microprogrammed digital data processing system. It includes a microprocessor unit 2710 that connects to various other units including a clock generator 2711, a halt/single step control 2712, a reset generator 2713, a programmable interface adapter 2714, and a watchdog timer 2715.

The clock generator 2711 supplies various clocking signals required to sequence the MPU 2710 through its various processing steps. Every six milliseconds, or some other predetermined time, the buffer 29 generates a 6 MS CLOCK signal that interrupts the MPU 2710 through the programmable interface adapter 2714, thereby to initiate routine call processing or maintenance and administration actions that constitute a DSI control program. One such maintenance function, or action, is examination of alarm inputs presented to the programmable interface adapter 2714 from the buffer 29, the span receiver, and the span transmitter.

The halt/single step control 2712 provides a troubleshooting aid and allows the normal cycling of the MPU 2710 to be inhibited. The watchdog timer 2715 is normally periodically reset as the MPU 2710 performs various functions. If, however, the MPU fails to execute its functions in a normal mode that would reset the watchdog timer 2715, the timer 1715 times out and interrupts the MPU 2710 to initiate a recovery sequence.

The BUS SYNC, ADDRESS, DATA, READ/WRITE CONTROL, and RESET signals are applied to the bus 26 to be conveyed to the formatters 25A and 25B, memory 28, buffer 29, and diagnostics circuit 30 in FIG. 4. In addition, DATA signals can be received from each of these elements under the control of the other signals.

The memory 28 comprises a bootstrap ROM 2810, a program RAM 2811, and a working RAM 2812. The bootstrap ROM 2810 contains a small portion of program that is automatically addressed when a POWER-UP signal is applied to the reset generator 2713 in FIG. 7. Such bootstrap programs are well known. Addresses are applied to a peripheral address decoder 2813 and a memory address decoder 2814. A memory data buffer 2815 interconnects the data paths between the processor 27 and each of the memories 2810, 2811, and 2812. The memory data buffer 2815 is inhibited, however, if the peripheral address decoder 2813 decodes a peripheral address.

During any reset operation of the call processing system, the maintenance processor 300 loads information into the program RAM 2811 and/or the working RAM 2812. Specifically, this is done when the diagnostics circuit 30 generates a DOWNLOAD signal and a WRITE signal. This will cause DATA signals, representing programs and a data base, to be loaded into both the program and working RAM's 2811 and 2812 as logical AND circuits 2816 and 2817 enable writing operations into these memories. Otherwise, only a reading operation can occur in response to ADDRESS signals from the processor 27.

The format of messages to be sent between the digital satellite interface 14 and the call processor 408 is depicted in FIGS. 9 and 10. Each message comprises at least one 8-bit byte. The first byte comprises a 4-bit group that identifies the message and a second, 4-bit group that identifies the number of bytes in the message. Thus, the ORIGINATE message in FIG. 10 contains the hexadecimal value "05", where the "0" indicates the ORIGINATE message and the "5" identifies that the message contains a total of 5 bytes. An ORIGINATE message indicates a remote subscriber has gone off-hook. The second byte in the ORIGINATE message contains the calling ('ING) satellite line number (SLN) of the remote subscriber. The third byte contains an assigned channel number, the fourth byte contains an "all channels busy" delay count, and the fifth byte contains party identification bits. The second, third, and fifth bits, then, completely identify the calling party and the channel number on the span equipment 15.

Figure 11:
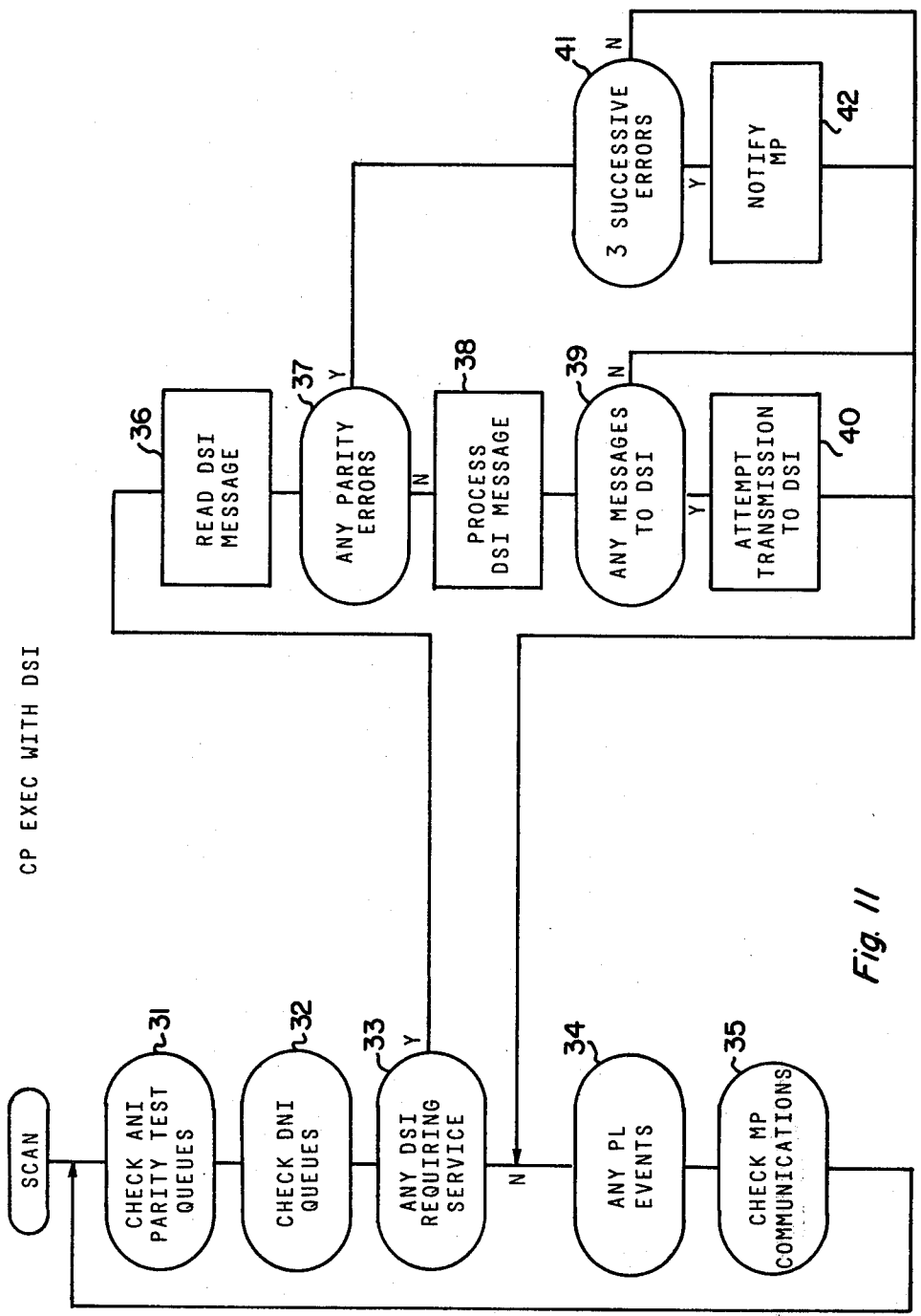
FIG. 11 is a generalized flow diagram of the control functions used by a call processor in receiving and transmitting the messages in FIGS. 9 and 10.

FIG. 11 is an overview of the call processor executive program performed by the call processing system in U.S. Patent Application Ser. No. 924,883, as modified by the addition of the digital satellite unit 13 and interface 14. In that original program, several sequences of tests were made. They are generally depicted without any decisions in FIG. 11 as sequence 31 in which the call processor checks ANI party test queues and sequence 32 in which the call processor checks DNI queues. Sequence 33 is new and it and other new sequences are described later. If no digital satellite interface 14 requires service, the call processor uses sequence 34 to detect PL events and sequence 35 to determine whether any maintenance processor communications are required. Operations then loop back to sequence 31.

Now referring to sequence 33, if a digital satellite interface 14 does require service, operations shift to a series of sequences during which the call processor can read the message, process the message, and then transfer a message back to the digital satellite interface 14. Sequence 36 reads the message and, in sequence 37, to determines if the parity circuit 1715 in FIG. 5 detected any parity errors. If no parity errors are detected, the message is processed in sequence 38. If a return message is to be transmitted to that interface 14, sequence 39 enables its transmission in sequence 40.

If a parity error is detected in sequence 37, sequence 41 determines whether three successive errors have been detected. If a fewer number of attempts have been made, sequence 41 completes by shifting operations back to sequence 34 and, as the request for service will not have been fully serviced, sequence 33 will again divert to sequence 36. If three successive parity errors are detected, however, the call processor 408 uses sequence 42 to notify the maintenance processor 300 of the error through its respective link circuits 106 or 206.

Figure 12A:
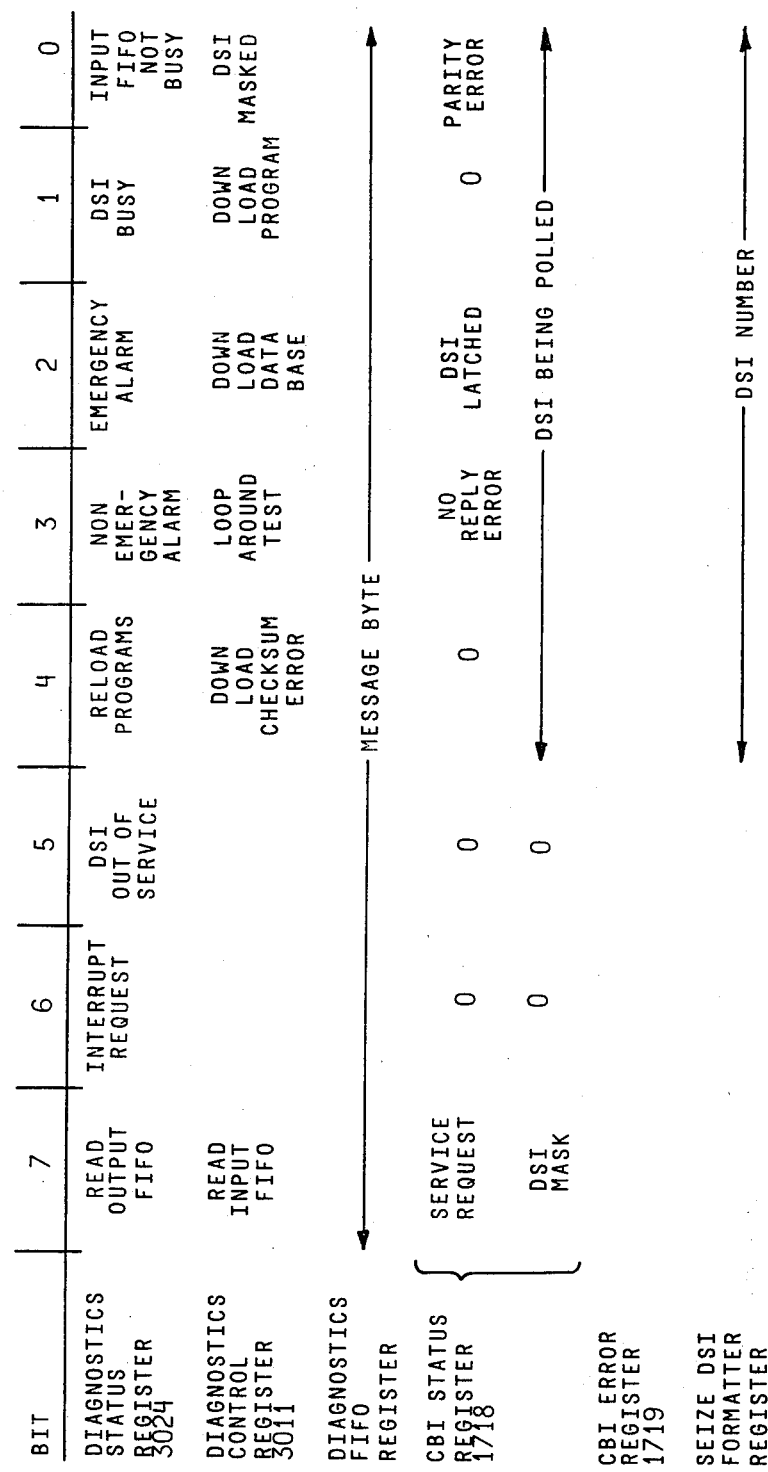
FIG. 12 comprises FIGS. 12A and 12B and is a memory map that depicts various memory locations and that is useful in understanding the flow diagram of FIG. 13.

FIG. 12 depicts various register that can be addressed by the call processor. Certain of these registers are used during the transmission and receipt of messages between the call processor and a digital satellite interface 14, as set forth in more detail in FIG. 13. If sequence 33 in FIG. 11 indicates that one of the digital satellite interfaces 14 requires service, the call processor processes sequence 36 shown in both FIGS. 11 and 13A. Specifically, at step 43 the call processor reads the CBI status register 1718 in FIGS. 5 and 12A. The CBI status register comprises two 8-bit bytes. The most significant bit is a "SERVICE REQUEST" bit which contains a "1" (i.e., is set) if the corresponding digital satellite unit is requesting service. This polling is accomplished under the control of the DSI counter 1716 in FIG. 5 so, in step 44, the satellite number is stored in a SEIZE DSI FORMATTER register 2524, in FIG. 12A, in the circuit 2515, in FIG. 6, that contains the DSI number in five least significant bits.

Then the call processor reads a data byte by performing a reading operation from the output FIFO 2516 (step 45). When this occurs, the data byte is transferred through data drivers 2519 onto the data path through the CBI 17 to the respective call processor 408. The call processor 408 reads the first byte and immediately determines the message length. If more message bytes are to be received, step 46 branches back to step 45 to read the successive data bytes from the output FIFO 2516. When the complete message is transferred, sequence 36 in FIG. 11 has been completed and sequence 37 tests for parity errors.

Figure 13A:
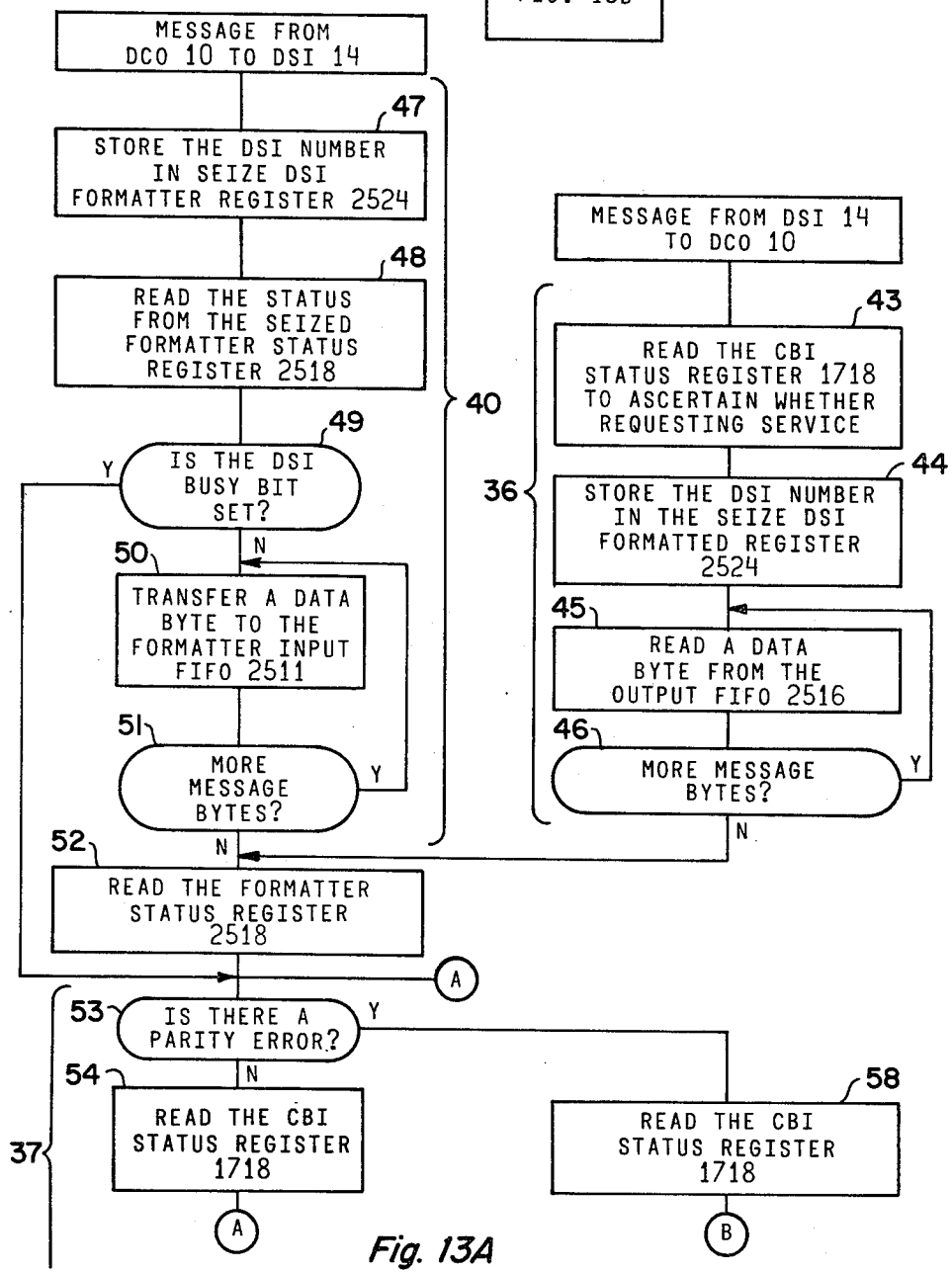
FIG. 13 comprises FIGS. 13A and 13B and is a flow diagram of the operations required to transfer messages between the call processor and the digital satellite interface shown in FIG. 4.
Figure 13B:
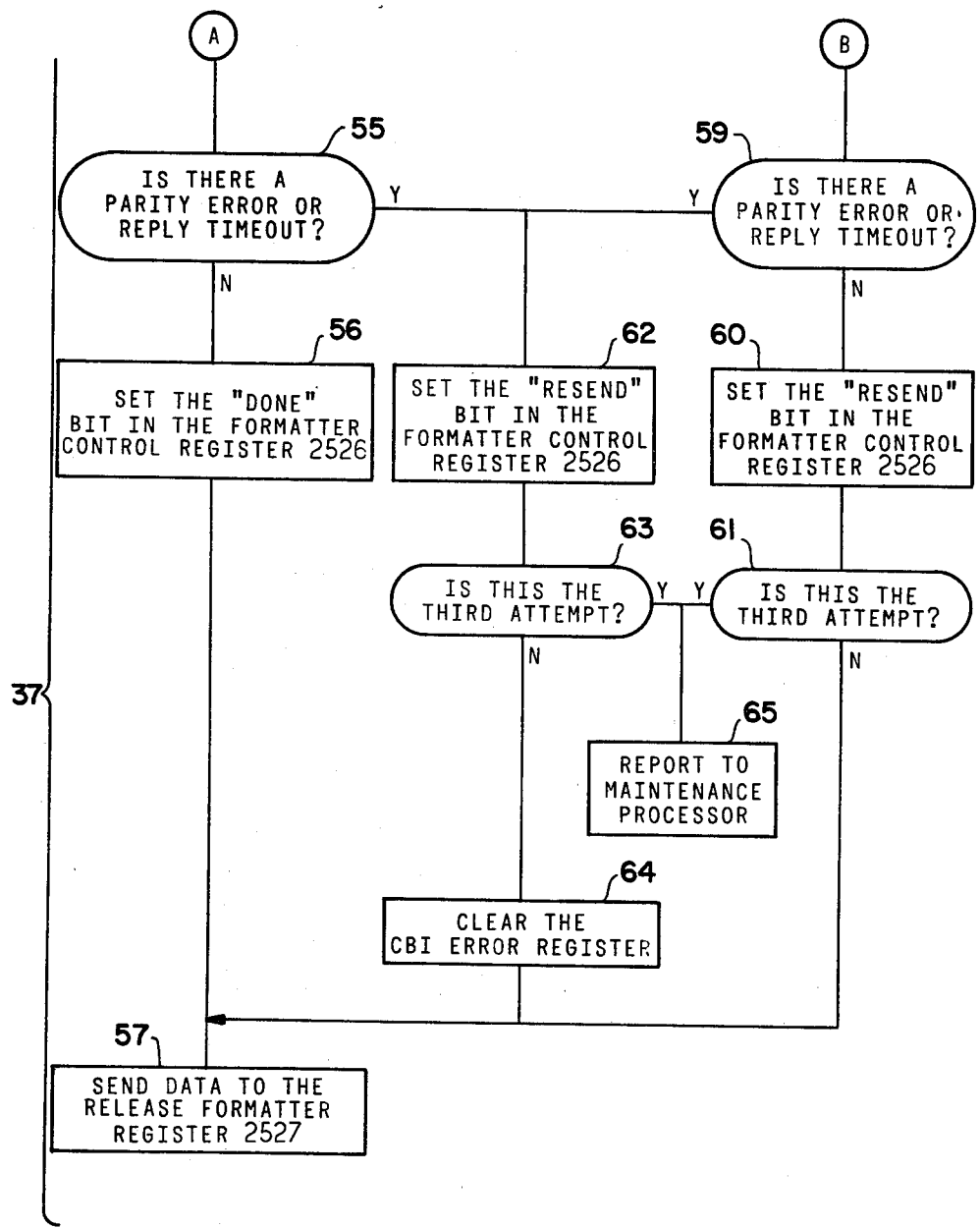

Sequence 40 in FIG. 11 is established by steps 47 through 51 in FIG. 13A. If the message is to be sent, the call processor 408 again stores the DSI number in the least significant bits of the SEIZE DSI FORMATTER register 2524 shown in FIG. 12A (step 47) and then reads the status register 2518 in the seized formatter (step 48). As shown in FIG. 12B, the least significant bit is a DSI BUSY bit. If that bit is set, no message can be sent and step 49 bypasses steps 50, 51, and 52. However, if the DSI BUSY bit is cleared, a data byte is transferred to the input FIFO 2511 in FIG. 6. Again, the first byte identifies the total number of bytes in the message, so the call processor "knows" if additional message bytes are to be sent. If they are, step 51 branches back to step 50 until all the message bytes are sent whereupon step 51 branches to step 52 so that formatter status register 2518 is read. The formatter status register 2518 is also read after a message is sent to the call processor based upon the branch of step 46.

The formatter status register 2518 contains a PARITY ERROR bit. If there is no parity error, step 53 branches to step 54 in which the call processor reads the CBI status register 1718 in FIGS. 5 and 12A to detect a parity error or a reply timeout. The CBI status register 1718 includes a PARITY ERROR bit and a DSI LATCHED bit. If neither of these bits is set, step 55 branches to step 56 whereupon the call processor sets a DONE bit in a formatter control register 2526 located in the circuit 2515 in FIG. 6 (bit 1 in FIG. 12B) and then sends data to a fictitious release formatter register 2527 in step 57. A writing operation to the release formatter register 2527 address produces the release operation.

Now assuming that there is a parity error indicated in the formatter status register 2518, step 53 branches to step 58 where the CBI status register 1718 is again read. If there is no parity error and no reply timeout signified by bits 8 or 10 in the CBI status register 1718, step 59 branches to step 60 whereupon the RESEND bit in the formatter control register 2526 in the circuit 2515 is set. If this not a third attempt, step 61 branches back to step 57. As a result, the DONE bit is not set in the formatter control register 2526. Thus, the next polling of the DSI status register 2518 will show the need for a transmission to the call processor.

If there is a parity error or reply timeout detected in either of steps 55 or 59, operations transfer to step 62 which again sets the RESEND bit in the formatter control register 2526 in circuit 2515. In step 63 a test is made to determine if this is the third attempt to read or write the register. If it is not, step 63 branches to step 64 whereupon the appropriate one of the PARITY ERROR or DSI LATCHED bits in the CBI error register 1719, which has the same form as the CBI status register 1718 in FIG. 12A, is cleared. Then step 64 transfers operations back to step 57. If three attempts are made to transmit a message to or receive a message from the digital satellite interface 14, steps 61 or 63 will branch to step 65 whereupon the error is reported to the maintenance processor 300 over the communications path between the maintenance processor and the digital satellite interface 14 as described later.

D. Digital Satellite Interface—Remote Digital Satellite Unit Path

Referring again to FIG. 4, the communications path between the digital satellite interface 14 and an associated digital satellite unit 13 includes, at the central location, the buffer 29, span equipments 21 through 23, and the office repeaters 24 that connect the span equipments to the span 15. The buffer 29 enables communications between the processor 27 and the remote units of the system, using the "B" signalling bits, and is shown in FIG. 14. It includes two span transmit sections 2910 and 2911, two span receive sections 2912 and 2913, a receive output control circuit 2914, and a processor interface 2915 constituted by a conventional programmable interface adapter that is compatible with the processor 27 in FIG. 4.

Each of the transmit sections 2910 and 2911 has the same construction, and each receives data from the processor 27 by way of the processor interface 2915. Each contains a FIFO with serial/parallel, input/output capabilities. The processor interface 2915 provides data signals in parallel and control signals for shifting in data and indicating the loading of data. Moreover, each of the transmit sections 2910 and 2911 receives an enabling input that controls whether the data is routed to span 0 transmit section 2910 or span 1 transmit section 2911. Each SHIFT IN STROBE signal causes data to be loaded in parallel into a FIFO input register and then to ripple through the FIFO to the output register. When the data has been loaded, the processor 27 asserts a DATA LOADED signal that sets a latch on both transmit sections to provide an input to a span output enable latch.

Timing signals from the transmitter in the corresponding span equipment include a synchronizing signal that will set the output enable latch on the first synchronizing signal following the assertion of the DATA LOADED signal. This enables the corresponding FIFO outputs in the sections 2910 and 2911 so that the data is shifted serially on a strobe provided by the transmitter section in the span equipment at a time corresponding to the "B" signalling bit times. Whenever the DATA LOADED signal is not asserted between two successive synchronizing signals from the span equipment, neither of the FIFO outputs will be enabled in the transmit sections 2910 and 2911 so that a sequence of "1"'s, representing an "IDLE" message (FIG. 16), will be transmitted onto the spans as the "B" signalling bits.

The span 0 receive section 2912 and span 1 receive section 2913 contain identical circuits, including FIFO's that receive incoming span data from the span equipment receivers in response to a STROBE signal provided by the receivers. Other timing signals include a SYNC pulse, that clears the FIFO and associated receive counters, and a message received indication prior to the reception of a SPAN message. More specifically, incoming data, in serial form, is shifted into the FIFO's by the strobe signal. Then the receive counter is incremented until it indicates that all the "B" signalling bits (24 bits in the specific example shown in FIG. 3) have been received. When this occurs, a SPAN MESSAGE RECEIVED signal is asserted.

After each SYNC pulse is received by the corresponding receive sections 2912 and 2913, the receive output control 2914 alternately enables the outputs of the receive sections 2912 and 2913, searching for a message other than an IDLE message. When this occurs, a SPAN RECEIVE MESSAGE READY signal is asserted to set a flag in the processor interface 2915. Each SYNC pulse from either span clears the SPAN RECEIVE MESSAGE READY signal. When the processor 27 reads the processor interface 15, it also clears the corresponding flag.

The processor interface 2915 provides the processor 27 with an indication of which span has the incoming message. This is accomplished by means of a FIFO ENABLE signal that indicates the span 1 receive section 2913 when it is asserted and the 0 receive section 2912 when it is not asserted. The processor 27 obtains the data by parallel extraction of the enabled FIFO's output register. Each reading operation is followed by a shifting of the information in the corresponding FIFO, under the control of SHIFT OUT pulses, so the successive groups of bits are received. Each SHIFT OUT pulse also sets an OUTPUT REGISTER EMPTY signal, causing an empty indication counter to be incremented. The empty indication disappears following the next SHIFT OUT pulse unless the entire message has been extracted from the receive section 2912 or 2913.

The office repeaters 24 in FIG. 4 are transparent to all BUS signals. They eliminate noise and ground potential differences caused by noncontiguous placement of interfaces. They comprise differential receivers and differential drivers for producing transfers over the span equipment 15. Therefore, there is no need for a further description of the repeaters 24.

Figure 15:
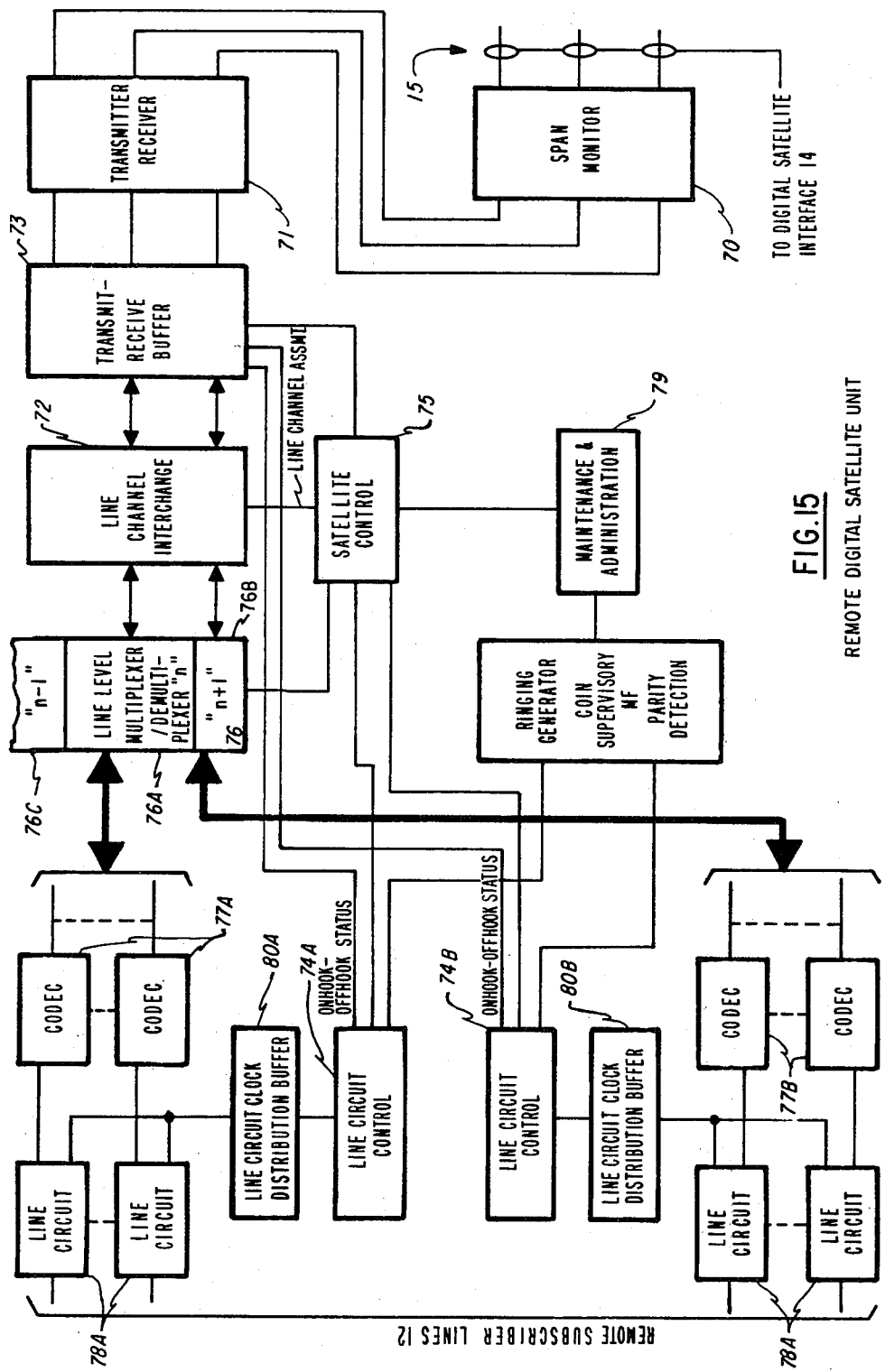
FIG. 15 is a block diagram of a remote digital satellite unit shown in FIGS. 1 and 2.

FIG. 15 is a basic block diagram of a typical, remote digital satellite unit. The individual paths in the span 15 connect to a span monitor 70. The span monitor 70 reports alarm conditions upon detection of a faulty waveform (specifically, bipolar violations), pulse voids, or sustained synchronization fault (so-called "carrier group alarm condition") during the pulse code modulation transmission. If one of the spans is operating as a backup span, the span monitor 70 provides circuitry for performing the necessary switching of the backup span in place of a faulty span under the control of messages from the digital satellite interface. It also responds to the incoming signals from generating the basic clock waveforms that are required for the operation of the unit.

The span monitor 70 also connects to a transmitter/receiver circuit 71. The transmitter portion receives digital voice data signals in pulse code modulated form from a line channel interchange 72 together with an identification of the span channel that is to carry that information and inserts the data signals into the bit stream being transmitted onto the span at the appropriate channel time. The transmitter also injects the proper framing for synchronizing signals such as shown in FIG. 3. Moreover, the transmitter derives functions necessary for data buffers 73, so that circuitry can insert the A and B signalling bits during frame numbers 6 and 12 of each superframe.

The receiver portion of each circuit 71 receives information from the span 15, converts it into a form that is compatible with the remainder of the circuit, and derives a clocking signal. Necessary timing functions are provided so that the A and B signalling bits can be extracted. The receiver utilizes the identification of the channel from the line channel interchange 72 to route each eight-bit word into an appropriate storage location. The receiver can also generate a frame alarm any time it does not detect the correct synchronizing pattern.

The transmit/receive buffer 73 monitors the hook status information from line circuit controls 74A and 74B and extracts information from incoming messages to be utilized by a satellite control 75. In addition, the buffer 73 responds to polling operations by inserting bits into a data stream at the correct time to indicate a need to communicate with the call processor, as described later.

The line channel interchange 72 controls the transfer of voice data signals between multiplexing and demultiplexing circuits 76 and the transmit/receive buffer 73 and transmitter/receiver 71. The line channel interchange 72 also provides the necessary timing to ensure that the correspondence between a channel and a line is maintained.

The the line level multiplexer/demultiplexer circuit 76 gathers data representing voice data received in digial form from several CODEC circuits 77 associated with a group of line circuits 78. In a particular embodiment, this circuit contains one or more circuits that connect to 48 line circuits 78. The circuits arrange this data into an 8-bit wide format which may then be interrogated by the line channel interchange 72 through appropriate addressing techniques. Similarly, the demultiplexing circuitry in each line level multiplexer/demultiplexer circuit converts signals received from the line channel interchange 72 into a format appropriate for transfer into the corresponding CODEC circuit 77 where the formation is converted into analog form for transmission to a remote subscriber through an appropriate line circuit 78. The CODEC circuits 77 and line circuits 78 operate as discussed in U.S. Patent application Ser. No. 924,883.

Messages from the digital satellite interface 14 are routed from the buffer 73 to the satellite control 75. The satellite control 75 decodes these messages and sends appropriate signals that pertain to remote channel assignment messages to the line circuit controls 74A and 74B. It also sends remote line channel assignments and line disconnect messages to the line channel interchange 72 and decodes information to be sent to a maintenance and administration circuit 79. These messages are encoded in the B signalling bits.

The line circuit control circuits 74A and 74B perform a number of functions. They process all originating requests; that is, when a subscriber takes his telephone off-hook, a corresponding line circuit control circuit 74 responds. Each line circuit control 74 assigns channels on the span and disconnects lines as directed by the digital satellite interface 14. The circuits 74 also control party identification processing and encode ORIGINATE messages with the proper party information. They process all terminating traffic, control ring trip, supply hook status information to the digital satellite interface 14 by properly encoding the "A" signalling bits, and perform a number of other functions. In one specific embodiment, each line circuit control circuit 74 can accommodate up to 120 line circuits.

Each line circuit control circuit 74 is coupled to the line circuits 78 through a line circuit clock distribution buffer circuit 80. This circuit sequences and buffers data between the line circuit control 74 and the line circuits 78.

As will now be apparent, each of the call processors 408, the digital satellite interfaces 14, and the remote digital satellite units 13 have the capability of performing a number of functions independently and then communicating various items of information. This information is communicated by messages that are conveyed between the digital satellite interface 14 and the remote digital satellite unit 13 over the spans 15. It will now be helpful to discuss the content of these messages and the general sequence of operations in each of the units.

The digital satellite interface 14 operates by polling all the remote digital satellite units 13 connected to it by sending polling information during each of the B signalling times. As is apparent from the prior discussion and inspection of FIGS. 3, 16, and 17, each message comprises 24 bits. Referring to FIG. 16, a POLL message comprises 24 bits arranged in 4-bit groups that are represented in hexadecimal notation. The POLLING message has a code byte "1" followed by ten 1's and ten 0's, hence the hexadecimal sequence "FFC00". The entire POLL message (i.e., "1FFC00") is sent serially through each remote digital satellite unit 13 and is returned as a POLL RESPONSE message shown in FIG. 17 during the same frame. There is a positional corresondence between each of the ten bits and each of the units 13. If a particular digital satellite unit 13 wishes to communicate with the digital satellite interface 14, it reverses the bits in the corresponding positions in the POLL message. For example, if a third digital satellite unit 13 (e.g., at location C in FIG. 1) desires service, the poll response will be 1DFC80".

An analogous TEST POLL message and corresponding TEST POLL RESPONSE message are shown in FIGS. 16 and 17 and identified by a code "5". The sequence of bits following the code in the TEST POLL message is the same as in the POLL message; that is, the TEST POLL message is "5FFC00". During a test poll, however, each remote digital satellite unit 13 alters its corresponding bit, whether service is requested or not. If any remote unit is connected, then the TEST POLL RESPONSE message should be "5003FF". Other messages will be discussed as this invention is described.

Figures 18, 18A:
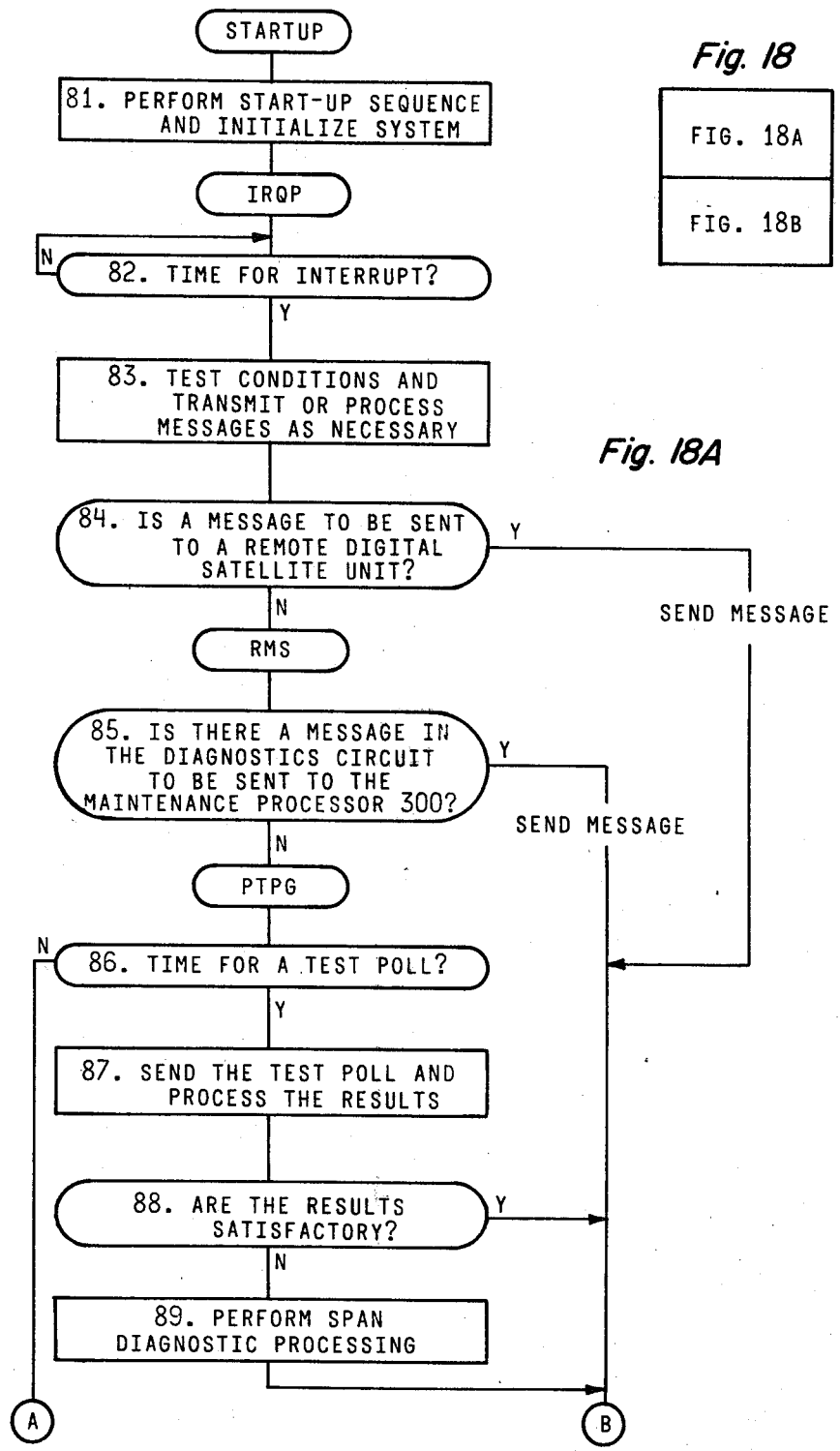
FIG. 18 comprises FIGS. 18A and 18B and is a flow chart that depicts a control program utilized in the digital satellite interface.

A further discussion of FIG. 18 will enable a better understanding of the operation of the digital satellite interface 14 during the transmission and reception of the POLL and POLL RESPONSE messages. When the system is energized, a start-up sequence is executed and the system is initialized (step 81). During a first step 82 in sequence "IRQP", the processor 27 awaits the completion of a predetermined interval that corresponds to an interruption rate. The use of "IRQP" and other mnemonics in ellipses throughout the figures is as identification points and will help in coordinating the flow of operations that are described in this particular figure and other more detailed figures.

Figure 18B:
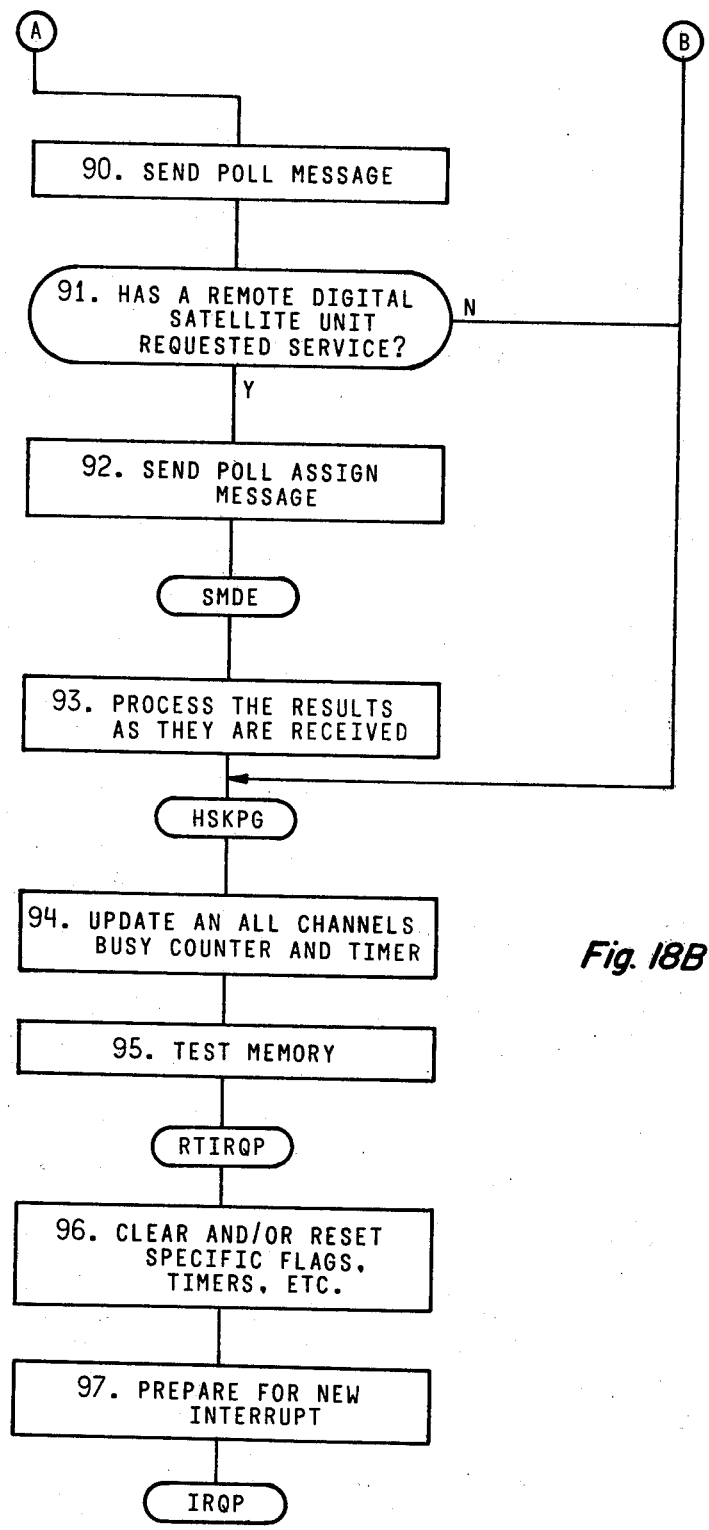

Each time an interruption occurs, step 82 branches to step 83, whereupon the processor 27 tests various conditions, described later, and, in response to those conditions, transmits or processes messages (step 84). If a message is to be sent, step 84 branches to an "HSKPG" sequence, shown in FIG. 18B. Otherwise, control transfers to step 85 in an "RMS" sequence, wherein the processor 27 determines whether a transfer is to occur to the maintenance processor 300. If such a transfer is to occur, step 54 branches to the "HSKPG" sequence in FIG. 18B.

When a test poll should occur, the polling sequence "PTPG" begins at step 86. The TEST POLL message "5FFC00" is sent in step 87 and the TEST POLL RESPONSE, which should be "5003FF", is tested in step 88. If satisfactory results are obtained, the polling sequence is complete and control passes to the "HSKPG" sequence. Otherwise, certain diagnostic processing is performed in step 89 before control passes to the "HSKPG" sequence.

If it is time for polling but not a test poll (step 86), control passes from step 86 in FIG. 18A to step 90, whereupon the digital satellite interface 14 transfers the POLL message ("1FFC00") shown in FIG. 16. The POLL RESPONSE message shown in FIG. 17 is then tested in step 91 and, if no digital satellite unit 13 has requested service, operations transfer to the "HSKPG" sequence.

It is possible that multiple requests for service may exist in a POLL RESPONSE message. The control programs in the digital satellite unit 13 arbitrate any such multiple, simultaneous contention and determine which of multiple remote digital satellite units 13 requesting service will be accepted. Each remote digital satellite unit 13 has a number assigned to it and this number is called a remote group number. Thus, when any contention has been resolved, the digital satellite interface 14 sends a POLL ASSIGNED message (FIG. 16) with a first byte of "7" in step 92. The next byte is the remote group number that identifies one of the possible remote digital satellite units 13; the remaining bytes are all zeroes. Only the designated remote digital satellite unit will respond to the POLL ASSIGNED message.

The digital satellite unit 13 processes a returned message and transfers the message to the digital satellite interface 14 during the next twelfth frame time of the next superframe. More specifically, if the POLL ASSIGN message in FIG. 16 is successfully processed, the remote digital satellite unit 13 transmits an OK message Ex0000, where "x" is "1" if the transmission will be over span 0 and "2" if the transmission will be over span 1, represented by the setting of S0 and S1 bits in a second byte in the OK message shown in FIG. 17. Then that message is processed in step 93.

After step 93 or in response to other branches depicted in FIG. 18A, the "HSKPG" sequence begins, whereupon an ALL CHANNELS BUSY counter and timer are updated in step 94 and the memory 28 is tested in step 95. Various flags and timers are cleared or set to specific values in step 96 and then the system prepares for a new interrupt in step 97. When this has been completed, control passes back to step 82 and the "IRQP" sequence shown in FIG. 18A.

E. Basic Call Processing

It now will be helpful to indicate a typical operation of a telephone switching system in response to telephone calls that originate on one of the remote subscriber lines 12 and also that terminate at one of the remote subscriber lines 12. First, assume that one subscriber, a calling subscriber, in the telephone network is calling another subscriber, a called subscriber. The calling subscriber's line 11 is the "CALLING" or "'ING" line, while the called subscriber's line is the "CALLED" or "'ED" line.

The digital central switch includes in its memory information that identifies every telephone number and whether that number corresponds to a local line 11 or one of the remote lines 12. For a remote line 12, the memory contains a satellite line number (SLN) the uniquely identifies each remote line 12.

When a remote line 12 is the "ED" line, the call processor sends a 5-byte TERMINATE message, shown in FIG. 9. This message identifies the satellite line number for the "'ED" line, and the post number of the CALLING line. It also contains other information that is useful in completing the call. If the message is properly received, the digital satellite interface tests a GST signal in the TERMINATE message that indicates a ground start. If the bit is set, the digital satellite interface 14 sends a ground start message, specifically a unique DSI STATUS message "90" to the call processor 408.

Otherwise the interface 14 processes the TERMINATE message and sends a CONNECT message that is shown in FIG. 10. This message has a command value "2" and includes six bytes. The second byte contains the 'ED SLN and the third byte contains an assigned channel number which identifies the time slot on the span 0 or span 1 equipment that will be used. This assignment is made by the digital satellite interface 14. The fourth and fifth bytes contain the DCO's 'ING port number that was sent to the DSI in the TERMINATE message. If the digital central office 10 in FIGS. 1 and 2 establishes a path, a RING LINE message, shown in FIG. 9, is sent. The RING LINE message identifies the 'ED SLN and includes ringing control and ringing type bytes. The ringing control byte identifies the calling and called frequencies and the ringing type bytes identify whether normal, emergency, rering, revertive, or cease ring operations are to occur.

When this sequence is complete, the digital satellite interface 14 sends a TERMINATE message to the remote digital satellite unit 13. This message is shown in FIG. 16, with a code of "8". It includes the ring code received from the RING LINE message in FIG. 9, the satellite line number (SLN), the assigned channel number, and the span number. When this message has been sent, a MESSAGE COMPLETE message "71" in FIG. 10 is transmitted by the digitial satellite interface 14 back to the call processor 408.

At this point, the 'ED line, or called line 12, rings. When the subscriber answers the phone, the remote digital satellite unit 13 senses the OFF-HOOK signal and stops the ringing. Moreover, at this time the "A" signalling bits shift to an off-hook value, so the digital central office can connect the calling line to the assigned channel on the T1 span through a corresponding tims slot in the port group highway, whereupon the call proceeds.

When a calling subscriber takes a line off-hook, the corresponding remote digital satellite unit 14 requests service. When a POLL ASSIGNED message for that digital satellite unit is received, the response is not the OK message shown in FIG. 17. Rather, an ORIGINATE message, having a code "2", is sent that also identifies the satellite line number. It also includes a disconnect (DS) bit, a send try fail (SF), a party update (PU), and party identification (PI) bits. In response, the digital satellite interface 14 determines whether the line load controls are properly operating. If not, the digital satellite interface 14 sends a LINE CONTROL message shown in FIG. 16 with a disconnect (DS) bit set. If the line load control is operating properly, the digital satellite interface 14 then determines whether all available channels on the span are busy. If they are, the satellite line number (SLN) is loaded into an all channels busy queue and will be eventually transferred out of the queue as the channels become free.

Once a channel is available and selected by the digital satellite interface 14, it sends an ORIGINATE RESPONSE message with a code "8" shown in FIG. 16 back to the remote digital satellite unit 13. This message includes the satellite line number, the span number, and the channel number. The digital satellite unit interface 14 also sends an ORIGINATE message (FIG. 10) having a first byte "05" to the call processor 408. This message includes the 'ING SLN, the assigned channel number, an all channels busy delay count, and the PARTY ID. If an automatic test is being performed, then operations divert to an autotest sequence described later. Otherwise, the digital central office will attempt to establish a path for a dial tone.

When the remote subscriber recieves the dial tone, the subscriber will begin to dial and transmit dial digits. These digits are encoded in the "A" signalling bits that are transferred over the port group highway in the "A" bit of the corresponding channel. Then the digital central office will complete the call processing by transferring the call to the 'ED line. If the satellite line number requires some answer supervision, the digital central office will send a LINE CONTROL message shown in FIG. 9, having a first byte value "23" with the satellite line number and other information. Otherwise, the process completes and the call proceeds.

When a remote subscriber line 12 is either the originating or the terminating line, the completion of a telephone call requires that the remote subscriber line be disconnected from the call processor. Under normal call processing, the call processor ascertains whether a given telephone line has become idle. When that decision is made and the line involved is a remote subscriber line 12, the digital central office sends a DISCONNECT message, shown in FIG. 9 with a first byte "12" and the satellite line number to the digital satellite interface 14. Although the DISCONNECT message shown in FIG. 9 is sent in this particular instance, lines can also be disconnected by the CHANNEL DISCONNECT and LINE CONTROL messages. However, with a normal DISCONNECT message the digital satellite interface receives that message and determines whether the channel assignment has been sent to the remote digital satellite unit 13. If it has not, the digital satellite interface 14 transmits a LINE CONTROL message (code equal "9") with the disconnect (DS) bit set. If the channel assignment has been sent, then the digital satellite interface 14 sends a LINE CONTROL message with a remote line control disconnect (RD) set and a single party line (SP) bit set or cleared. If the channel assignment has been sent to the remote digital satellite unit 13, the LINE CONTROL message is sent with the disconnect (DS) bit set and the single party line bit either set or cleared.

Assuming that the remote digital satellite unit receives the DISCONNECT message, as indicated by the receipt of an OK message, the digital satellite interface 14 then sends a CHANNEL DISCONNECT signal to the call processor. This message, shown in FIG. 10, identifies the satellite line number and the assigned channel number. In addition, the digital satellite interface makes the channel available for subsequent calls. If the satellite line number is on-hook, subsequent processing by the digital satellite interface 14 terminates. However, if the remote subscriber is still off-hook the remote digital satellite unit 13 sends a special ORIGINATE message with the disconnect (DS) bit set to operate as a DISCONNECT message. Then the digital satellite interface 14 sends a RELEASE message, shown in FIG. 10, to the call processor and the call processor updates its control information by indicating that that satellite line number is now idle. This completes the disconnection procedure.

F. Maintenance Processor—Digital Satellite Interface Path

The communications path between the digital central office 10 and digital satellite interface 14 shown in FIG. 4 for maintenance purposes includes the MBI buffer 18 that connects to the maintenance processor (MP) 300, the diagnostic circuit 30 that interconnects the MBI buffer 18 and the busing structure 26. The MBI buffer 18 is shown in block diagram in FIG. 18. Like the call processor bus interface (CPI) 17, the MBI buffer 18 provides a buffered interface between the maintenance processor 300 and the digital satellite interface 14. This path transfers diagnostic information between the digital satellite interface 14 and the maintenance processor 300 and also loads programs into the memory 28 in FIG. 4 from the maintenance processor 300. Each MBI buffer 18 can connect to 30 digital satellite interfaces 14. However, like the call processor bus interface buffer 17, the circuitry is essentially transparent in operation.

Figure 19:
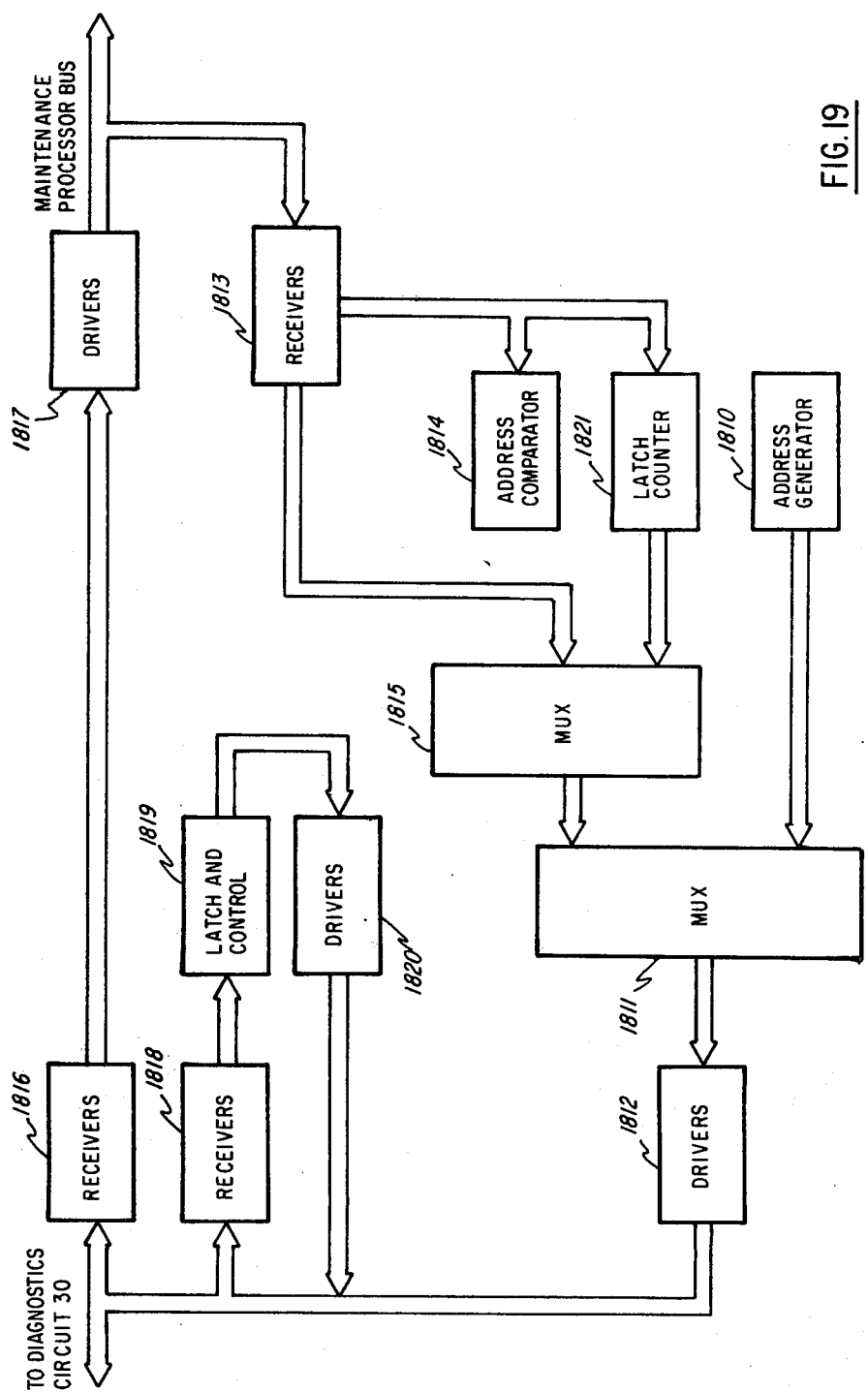
FIG. 19 is a block diagram of a maintenance interface buffer shown in FIG. 4.

The MBI buffer 18 has two modes of operation. When the MBI buffer 18 is not in use, polling occurs. In FIG. 19, an address generator 1810 produces addresses corresponding to a diagnostic circuit 30 in each digital satellite interface in succession. A multiplexer 1811 is enabled in this polling mode to couple the signals from the address generator 18 through drivers 1812 to the diagnostics circuit 30. If the corresponding digital satellite interface desires to transmit a message to the maintenance processor 300, it will respond with a flag signal that is detected to disable the address generator 1810 until the interruption has been serviced.

When the maintenance processor 300 wishes to send information to the diagnostic circuit 30, it transmits signals that first are passed through receivers 1813, multiplexer 1814, multiplexer 1811, and drivers 1812 to the diagnostics circuit 30.

If the digital satellite interface 14 wishes to transmit a message to the maintenance processor, it energizes receivers 1816 and drivers 1817, so the message normally passes directly through to the maintenance processor 300. However, if the MBI buffer 18 is conducting a polling operation when the digital satellite interface 14 attempts to access the maintenance processor 300, receivers 1818 couple the information into a latch and control circuit 1819 that retains the information until the poll has been completed, whereupon polling will be terminated and drivers 1820 will transfer the information back through the receivers 1816 and the drivers 1817.

Now referring to FIG. 20, messages to the digital satellite interface 14 from the maintenance processor 300 pass through receivers 3010 in the diagnostics circuit 30 to a control register 3011, an address decoder 3012, and an input FIFO 3013. The address decoder 3012 decodes the address; if it corresponds to its digital satellite interface (DSI) address, subsequent messages transfer into the input FIFO 3013 for transfer through a programmable interface adapter 3014 to the memory 28 in FIG. 4. When the processor 27 wishes to transmit a message to the maintenance processor 300, it passes the data through a data buffer 3015 and the programmable interface adapter 3014 into an output FIFO 3017. The output message can then be transferred through bus drivers 3018 to the maintenance buffer interface 18.

The input and output FIFO's 3013 and 3017 operate in response to signals from FIFO control units 3019 and 3020, respectively. Diagnostics circuit 30 initiates the operation through an interrupt control circuit 3021 that produces control signals through bus drivers 3022. Various control signals from the maintenance bus interface buffer 18 are received by receivers 2023. A programmable interface adapter 3016 interfaces the control portion of the diagnostics circuit 30 and the processor 27.

The diagnostics circuit 30 performs several functions and operates under several modes. It can transfer messages from the processor 27 through the maintenance processor 30 and transfer messages from the maintenance processor 30 back to the processor 27. It indicates to the processor 27 or the processor 300 when an incoming message is available for the respective processor or when an output message can be sent from the respective processor. Moreover, the diagnostics circuit 30 signals the maintenance processor 300 if any emergency or nonemergency alarm conditions exist, if there is a request to transfer programs to the memory 28, specifically the program RAM 2811 and working RAM 2812 in FIG. 8, or when either the processor 27 or the memory 28 has been unplugged. When the maintenance processor begins to transfer information to the memory 28, the diagnostics circuit 30 signals the processor 27. It also signals the processor 27 to perform loopback testing and check some error testing. Finally, the diagnostics circuit 30 interrupts the maintenance processor 30 and provides an interrupt mask.

The message transfer function is important to this invention and can best be understood by referring to FIG. 21 taken in conjunction with FIGS. 19 and 20. Referring first to FIG. 21A, a message is sent from the maintenance processor 300 to the digital satellite interface 14 by seizing the MBI buffer 18 and then seizing an appropriate diagnostics circuit 30 in one of the digital satellite interface units connected to the MBI buffer 18. This is accomplished in step 21A by addressing the MBI buffer 18 in step 501 thereby to seize the MBI buffer 18. This is accomplished when the address comparator 1814 in FIG. 19 decodes an address in the receivers 1813 corresponding to the MBI buffer 18. Buffer 18 then enables the receivers to couple subsequent signals through the multiplexer 1815, the multiplexer 1811, and the drivers 1812 to the diagnostics circuit 30. Next, in step 502, the maintenance processor 300 addresses a fictitious location in the MBI buffer 18 that corresponds to the receivers 1813. This allows subsequent data to be transferred to the diagnostics circuit 30. Next, the maintenance processor 300 addresses one digital satellite interface in order to seize it (step 503).

Once a particular digital satellite interface 14 is seized, the maintenance processor 300 reads the diagnostics status register 3024 that is shown in FIGS. 20 and 12A. If a DSI OUT OF SERVICE bit is set, step 505 diverts to step 506 and the maintenance processor types a maintenance message. As the message cannot be sent at this time, the flow diverts to step 507, whereupon the maintenance processor 300 again addresses the MBI buffer 18 to release it. Now the polling operation can continue.

Assuming that the seized digital satellite interface 14 is in service, step 505 diverts to step 508 to tests bit 0 of the status register 3024, i.e., an INPUT FIFO NOT BUSY bit. If it is not busy, step 508 branches to step 509, whereupon the maintenance processor clears a READ INPUT FIFO bit in the diagnostics control register 3011 and then sends a multiple byte message to the digital satellite interface 14 in steps 510 and 511. When all the bytes have been sent, step 511 branches to step 512 so the maintenance processor 300 can set the READ INPUT FIFO bit in the control register 3011 and then release the MBI buffer 18 in step 507.

Figure 21B:
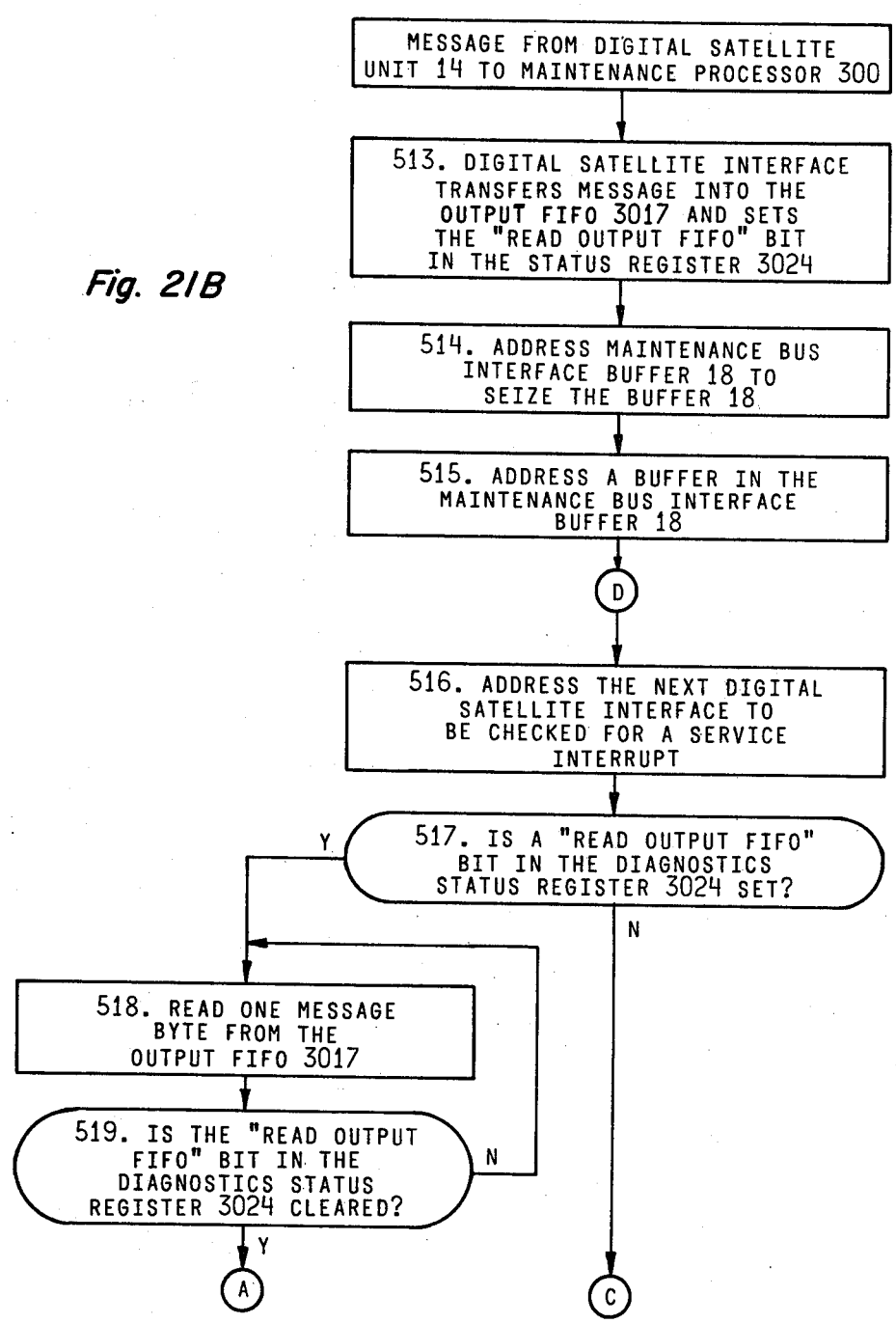
FIG. 21, comprising
FIGS. 21A, through 21C, is a flow diagram that depicts the operations in a maintenance processor and digital satellite interface during an interchange of messages therebetween.

The process for transferring a message from a digital satellite interface 14 to the maintenance processor 300 begins in step 513 in FIG. 21B when a digital satellite interface transfers a message into its output FIFO 3017 in FIG. 20 and sets the READ OUTPUT FIFO bit in the status register 3024 also shown in FIG. 12A. This change in state will cause an interruption of the maintenance of processor 300.

In order to service this interruption, the maintenance processor addresses the MBI buffer 18 to seize it in step 514 and then addresses the fictitious location in the step 515 to enable communications with diagnostics circuit 30. These steps correspond to steps 502 and 503. Next, the processor addresses the next digital satellite interface to be checked for a service interrupt in step 516. If a READ OUT FIFO bit in the corresponding diagnostics status register 3024 is set (step 517), one message byte is retrieved from the output FIFO 3017 in step 518. Additional bytes will continue to be retrieved until the maintenance processor 300, in step 509, "sees" that the READ OUTPUT FIFO bit in the diagnostics status register 3024 has been closed. When this occurs, step 509 branches back to step 507 to release the MBI buffer 18.

Figure 21C:
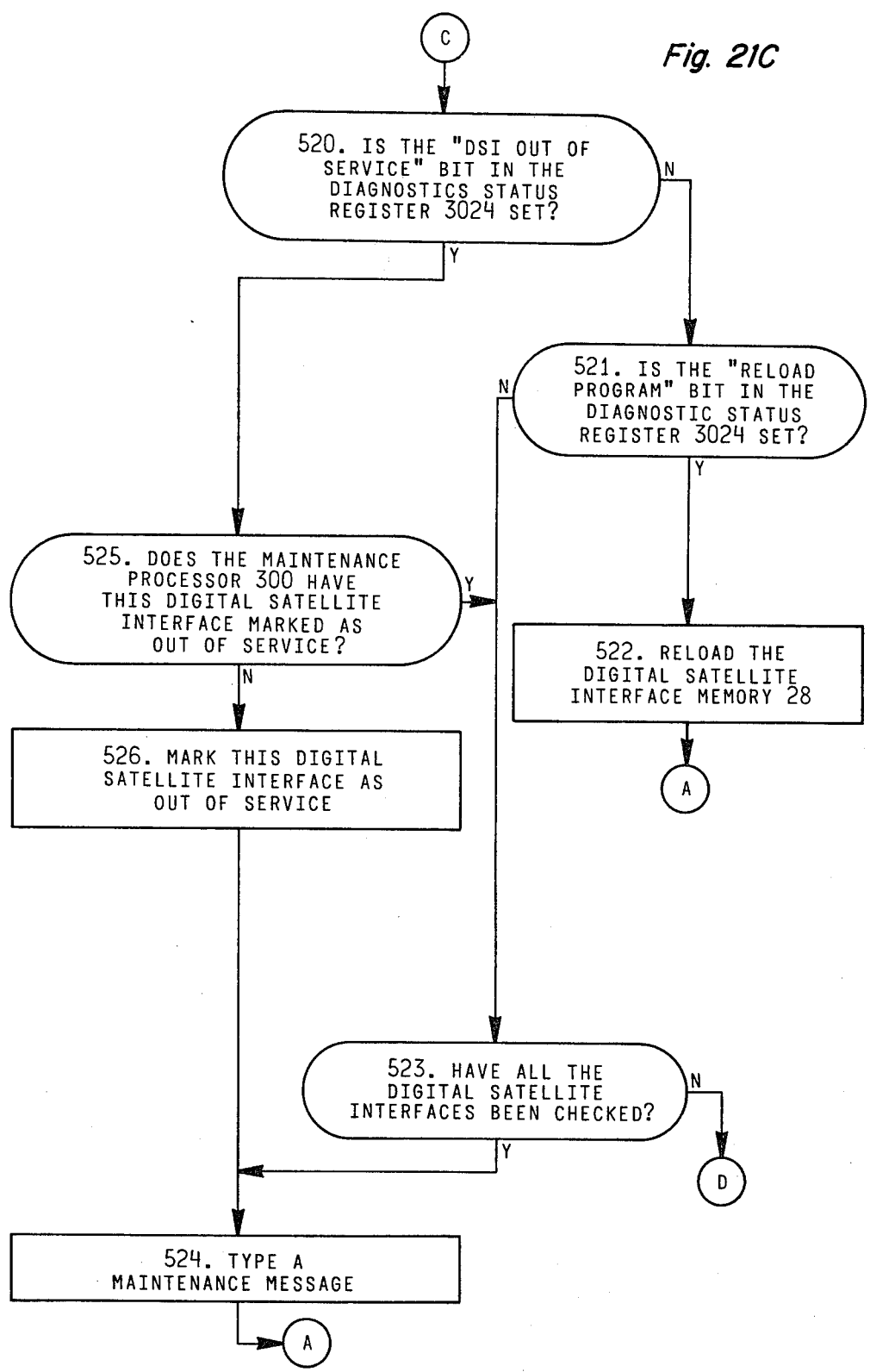

If the READ OUTPUT FIFO bit is not set in step 517, control passes to step 520 in FIG. 21C. The maintenance processor 300 tests a DSI OUT OF SERVICE bit in the diagnostics status register 3024 shown in FIGS. 12A and 20. Assuming that the digital satellite interface is plugged in and in service, step 520 branches to step 521 to reload the program memory 2811 in step 52 if a RELOAD PROGRAMS bit is set and return to step 507 in FIG. 21A. If the RELOAD PROGRAMS bit is not set, the maintenance processor 300 determines whether all the digital satellite interfaces 14 have been checked (step 523). If they have, a maintenance message is typed (step 524) on the teletypewriter 305 in FIG. 2. If they have not, control passes back to step 516 in FIG. 21B.

If the identified digital satellite interface is out of service, then control passes from step 520 to step 525 to enable the maintenance processor 300 to mark the interface 14 out of service in step 526 and type a message in step 524. It marking has already occurred, control passes to step 523.

G. Maintenance Bus Interface Buffer

The maintenance bus interface buffer 18 (shown in block diagram form in FIG. 19) interfaces between the maintenance processor 300 and the DSI diagnostics 30 (FIG. 4). Maintenance bus interface buffer 18 operates in two modes of operation. In a first mode, when the MBI buffer is not being used by the maintenance processor 300 to transfer information between it and the diagnostics 30, the MBI buffer 18 sequentially polls each of the diagnostics 30 in the DSI 14's. If any of the polled diagnostics desires to transmit a message, it transmits a flag signal to the MBI buffer 18. The flag signal stops the polling until the message has been serviced by the maintenance processor 13.

When the maintenance processor 300 is to send a message to one of the diagnostics 30, it transmits a message to the MBI buffer causing polling to cease and the MBI buffer to go into the second (transfer) mode of operation.

Alternatively, the diagnostics 30 can transmit a message through the MBI buffer 18 to the maintenance processor 300.

Figure 22A:
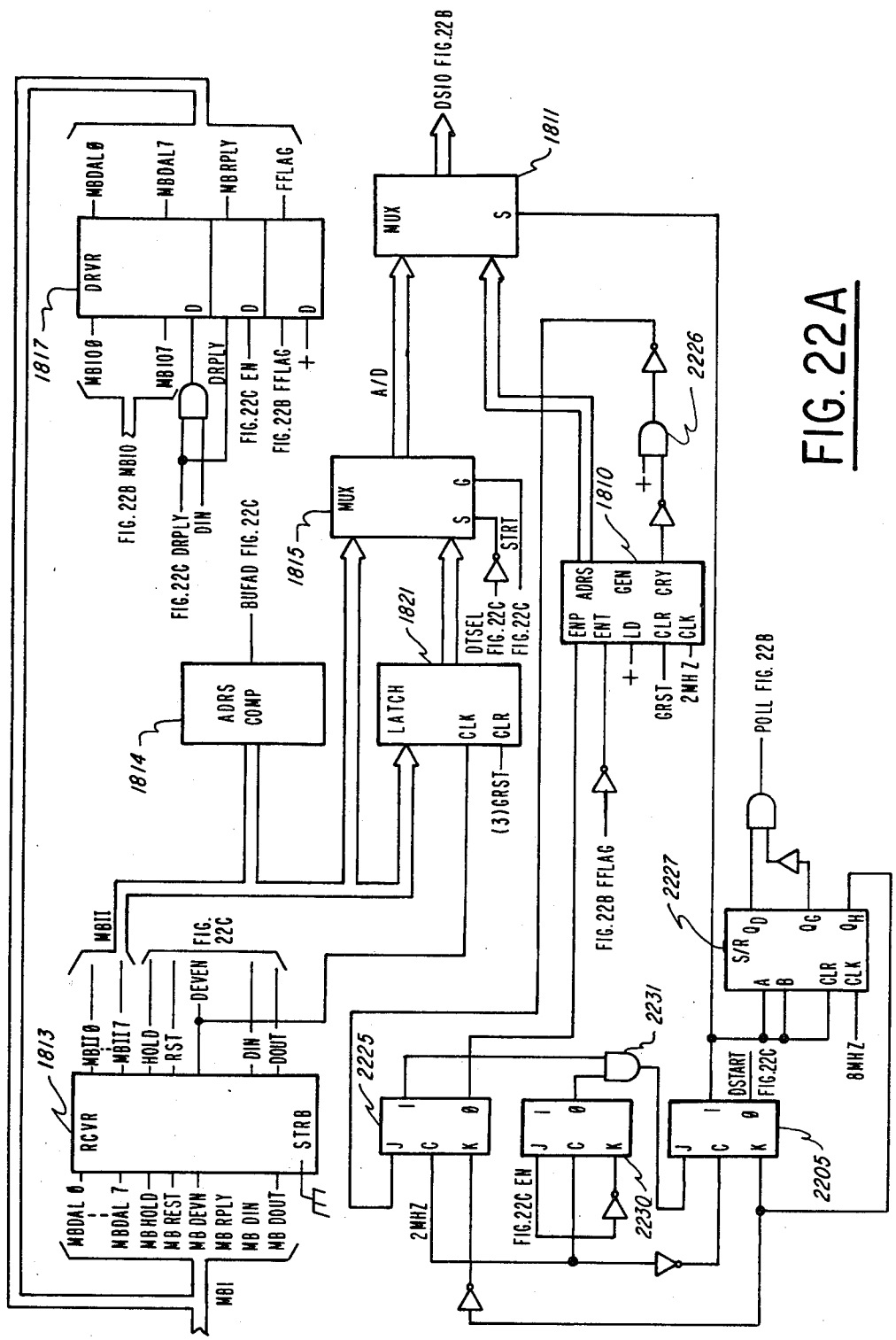
FIGS. 22A through 22C, is a detailed logic diagram of the maintenance interface buffer shown in FIG. 19.
Figure 22B:
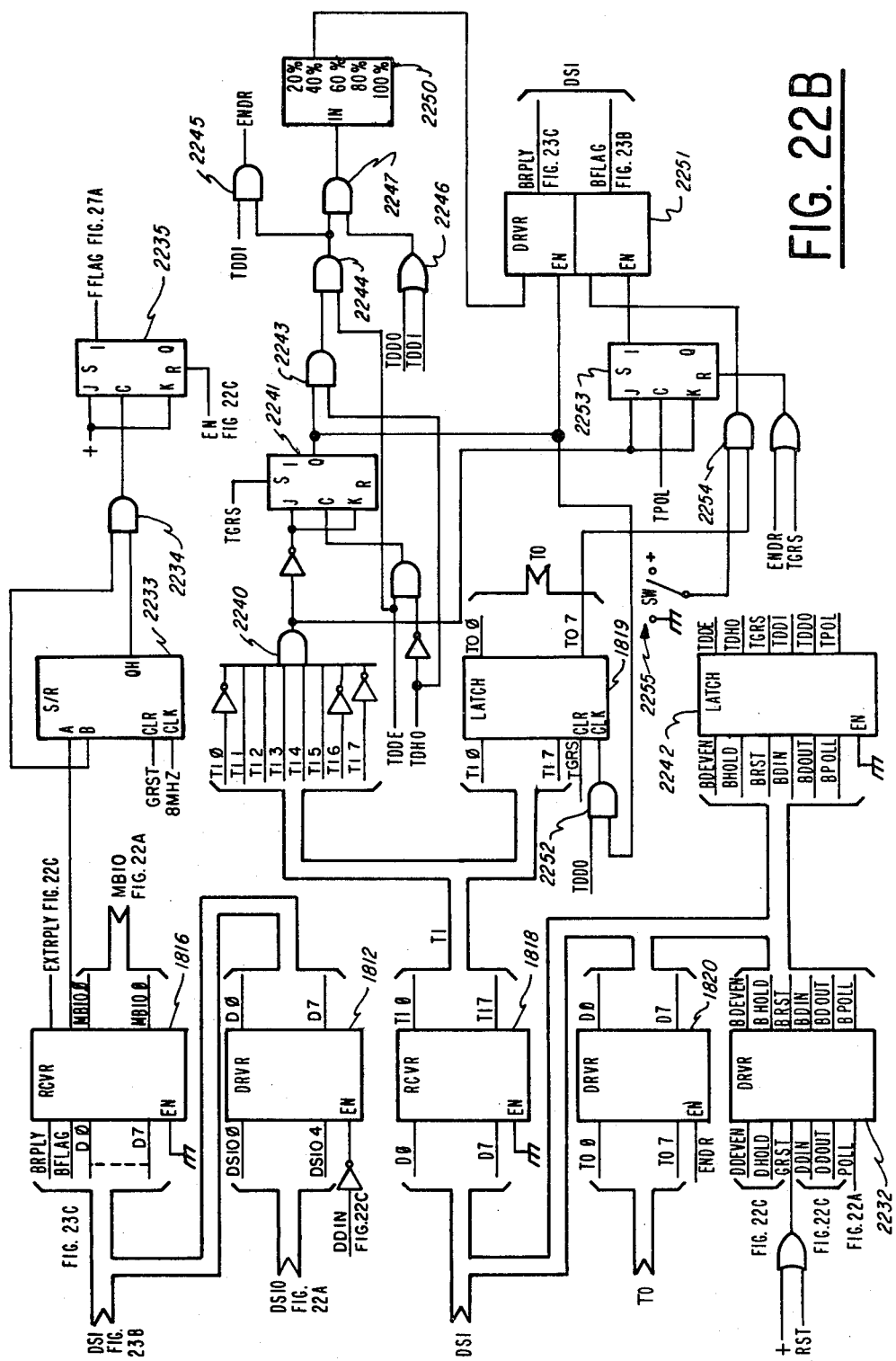
Figure 22C:
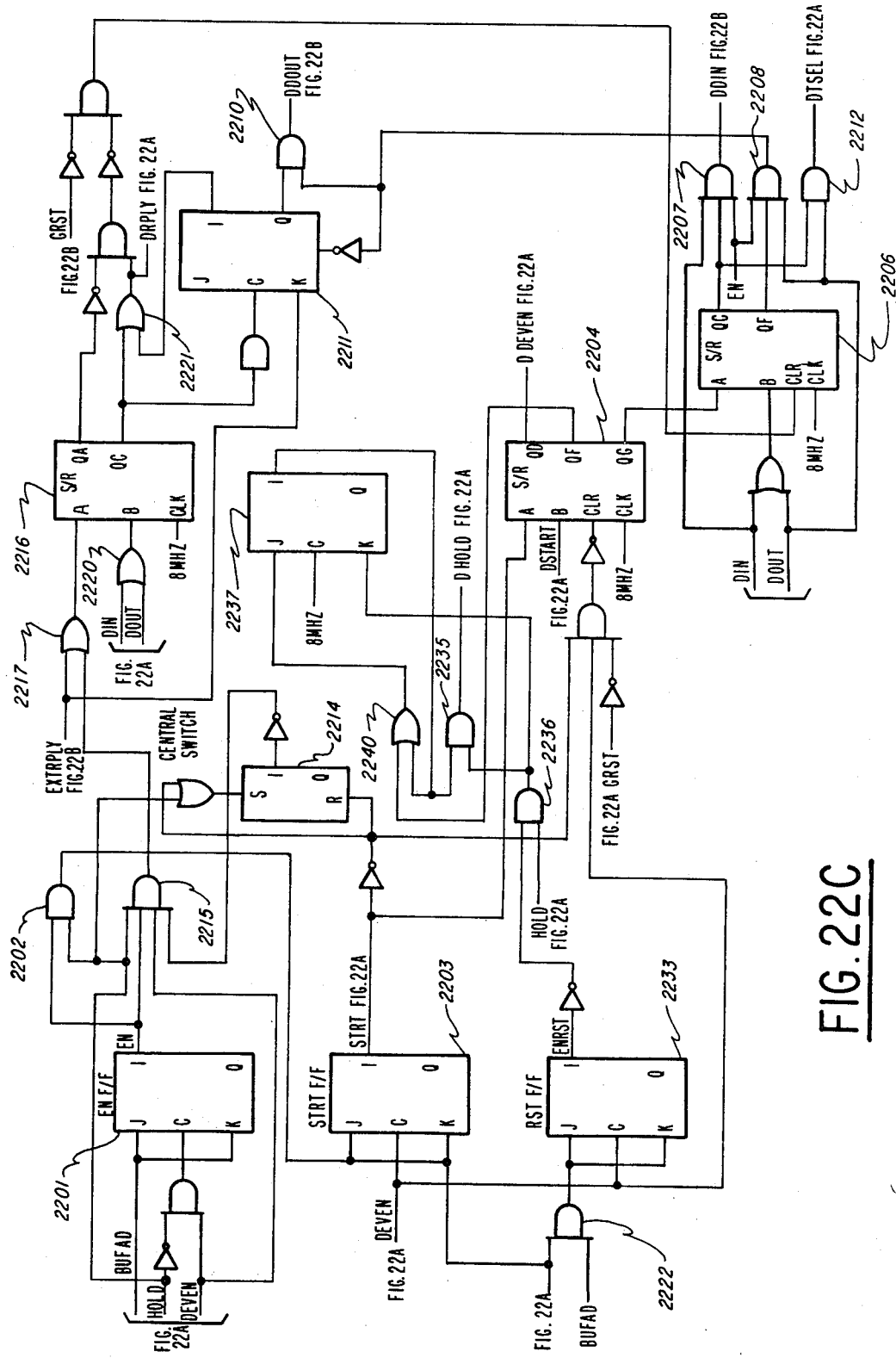

FIGS. 22A-22C contain detailed circuit diagrams of MBI buffer 19. Signals from the maintenance processor 300 are received in a receiver 1813 (FIG. 22A). The signals are compared with the address of the maintenance bus interface buffers in an address comparator 1814. If the signals correspond with the address of the maintenance bus interface buffer, a BUFAD (buffer address) signal is asserted by comparator 1814.

The MBI operates as an asynchronous bus in which address and data are alternatingly transmitted over bus lines MBDAL0-7. An MBHOLD Line, when energized, holds the device whose address is asserted on the MBDAL0-7 lines when the MB HOLD line is first energized. The maintenance processor thus does not have to be repeatedly transfer the maintenance bus interface buffer address to transfer signals thereto. An MBREST line in the MBI carries a reset signal. A MBDEVN (device enable) signal is asserted at the beginning of an address signal, and deasserted at the end of the associated data signal. The MBDEVN signal is asserted before the MBHOLD signal. The MBDIN (data in) signal and MBDOUT (data out) signal is asserted as the first signal of the asynchronous handshake. The MBDIN signal indicates that the MBDAL0-7 lines carry data that can be strobed by the maintenance bus interface buffer 18. Similarly, the MBDOUT signal indicates that the maintenance processor 300 (FIG. 4) is ready to accept data on the MBDAL0-7 lines. The MBRPLY signal line carries the reply signal for the handshake. That signal is generated by the maintenance bus interface buffer 18 when it has strobed data from the maintenance processor, or when it has placed data on the maintenance bus interface. The MBDIN (or MBDOUT) signal is deasserted in response to the assertion of the MBRPLY signal, and the MBRPLY signal is deasserted in response to the deassertion of the MBDIN (or MBDOUT) signal. The maintenance processor 300, after it has completed transfers through the maintenance buse interface buffer 18, transfers the address of the maintenance bus interface buffer a second time. This releases the buffer 18 to resume the polling mode.

When the address comparator 1814 asserts the BUFAD signal, a flip-flop 2201 (FIG. 22C), if previously cleared, is set when the DEVEN signal is asserted if the HOLD signal (which corresponds to the MBHOLD signal from the MBI) is not asserted. Flip-flop 2201 asserts an EN (enabling) signal that is asserted as long as the HOLD signal is thereafter asserted. The EN enabling signal causes the maintenance bus interface buffer to go into and remain in the transfer mode as long as the HOLD signal is asserted.

The coincidence of the HOLD signal and the EN enabling signal energizes an AND gate 2202 that toggles a start flip-flop 2203 at the next DEVEN signal (which corresponds to the MBDEVEN signal on the MBI). This occurs during the second address and data cycle, in which the address portion identifies the particular DSI to which the associated data is to be transferred. The setting of the start flip-flop 2203 (FIG. 22C) enables a shift register 2204 clocked by an 8 MHz clocking signal from the maintenance processor, if a DSTART signal from a flip-flop 2205 on FIG. 22A is asserted. The assertion of the DSTART signal indicates that the MBI buffer 18 is out of the poll mode.

When the signal in shift register 2204 ripples through the shift register to the QG output, a second shift register 2206 is enabled if either the DIN or DOUT signal (corresponding to the MBDIN and MBDOUT signals respectively) from receiver 1813 is asserted. If the DIN signal is asserted, an AND gate 2207 is energized when the shift register 2206 QC output is energized, to assert a DDIN (data in) signal. Alternatively, if the DOUT signal is asserted, an AND gate 2208 is energized when the QF output of shift register 2206 is energized, which in turn energizes an AND gate 2210 if a flip-flop 2211 has been previously cleared. AND gate 2210 asserts the DDOUT signal. Similarly, if the DDOUT signal is asserted, an AND gate 2212 is energized which asserts a DTSEL (data transfer select) signal.

The MBII0-7 data and address signals from MBI receiver 1813 are received in the latch 1821 (FIG. 22A) clocked by the DEVEN signal from receiver 1813 (FIG. 22A). Since the BMDEVN signal, and therefore the DEVEN signal, is asserted when the MBII0-MBII7 lines carry address signals; the latch 1820 stores the address signals. A multiplexer 1815 couples the signals either directly from the MBII0-7 lines or from latch 1821, selected by the complement of the DTSEL signal from FIG. 22C. Thus, when the DTSEL (data select) signal is not asserted, the address signals contained in latch 1821 are transferred, and when the DTSEL signal is asserted, the signals directly from the MBII0-7 lines are transferred. A STRT (start) signal from FIG. 22C gates the output signals from multiplexer 1815 onto an A/D bus to multiplexer 1811. The STRT (start) signal is asserted during the second and subsequent address-data transfer cycles from MBII0-7 lines. Multiplexer 1811 couples signals either from the A/D address data bus or from address generator 1810, which generates address signals when the maintenance bus interface buffer 18 is in the polling mode. Thus, when the maintenance bus interface buffer is not in the polling mode, the multiplexer couples the signals from the A/D bus and places them on a DSIO (DSI output) bus which transfers them through a driver 1812 if a DDIN signal from AND gate 2207 (FIG. 22C) is not asserted. If the DDIN signal is not asserted, the signals from the DSIO bus are placed on the DSI bus to the diagnostics circuits 30 in the DSI 14 (FIG. 4).

When the HOLD signal as asserted, a flip-flop 2214 (FIG. 22C) is reset, which, with the HOLD signal, DEVEN signal and EN enabling signal energizes an AND gate 2215 when in turn provides an input signal to a shift register 2216 through an AND gate 2217. Shift register 2216 is clocked by the 8 MHz signal from the maintenance processor, and shifts if an OR gate 2220 is energized by either the DIN or DOUT signals from FIG. 22A. The output of shift register 2216 energizes an OR gate 2221, which asserts a DRPLY (reply) signal. The DRPLY signal is transmitted onto the MBI through one stage of driver 1817 as the MBRPLY (handshake) signal if the EN enabling signal is asserted. The MBRPLY signal completes the asynchronous handshake.

The maintenance bus interface buffer 18 is taken out of the transfer mode and returned to the poll mode if the maintenance processor transmits the address to the maintenance bus interface buffer a second time. The address comparator 1814 asserts the BUFAD signal a second time. The coincidence of the BUFAD signal and the energized AND gate 2202 (FIG. 22C) energizes an AND gate 2222 which sets a reset flip-flop 2223 when the DEVEN signal is asserted, which in turn asserts an ENRST (enable reset) signal. The HOLD signal is later deasserted, which causes the flip-flop 2201 to toggle to deassert the EN signal.

When the maintenance bus interface buffer 18 is in the poll mode, multiplexer 1811 (FIG. 22A) couples address signals from the address generator 1812 onto the DSIO output bus. The address generator 1810 generates address signals if an FFLAG signal from diagnostics 30 (FIG. 23A) is not asserted and if a flip-flop 2225 (FIG. 22A) is reset. Flip-flop 2225 is set at the end of each sequences of addresses by the energization of an AND gate 2226, which is energized by the CRY (carry) signal from the address generator 1810, when the 2 MHZ clocking signal is asserted by the processor 27, and if the output of a shift register 2227 is not asserted. If the flip-flop 2225 is set, and flip-flop 2230 is reset, an AND gate 2231 is energized. Flip-flop 2230 is reset if the EN enabling signal from flip-flop 2201 (FIG. 22C) is not asserted, when a 2 MHZ clocking signal is asserted. If the EN enabling signal is asserted, flip-flop 2230 deenergizes AND gate 2231 which causes the multiplexer 1811 to select the A/D signals. The energization of AND gate 2231 sets flip-flop 2205 at the next 2 MHZ timing signal, which causes multiplexer 1811 (FIG. 22A) to select the address signals from address generator 1810. Flip-flop 2205 deasserts a DSTART signal on the trailing edge of the 2 MHZ signal to cause multiplexer 1811 to couple the address signals from address generator 1810.

Shift register 2227 generates a POLL signal a short time after the flip-flop 2205 is set, when its QD output is asserted and its QG output is not asserted. The POLL signal is thus transmitted a short time after the address is coupled by multiplexer 1811. A short time later, when the QH output is asserted, the flip-flop 2205 is reset and flip-flop 2225 is set, at the subsequent two MHz clocking signal. The POLL signal and the address signals are transmitted over the DSI interface to the respective DSI's. The POLL signal is transmitted through a driver 2232 (FIG. 22B) as a BPOL signal, while the address signals are transmitted through the driver 1812 onto the D0-D7 lines of the DSI interface.

If the DSI requires service in response to the POLL polling signal, it transmits a BFLAG signal over the DSI interface, which is coupled through receiver 1816. The BFLAG signal enables a shift register 2233 which is clocked in response to the 8 MHZ clocking signal. The coincidence of BFLAG signal and the QH output of shift register 2233 energizes an AND gate 2234 which toggles a flip-flop 2235. Flop-flop 2235 is reset in response to the EN enabling signal from flip-flop 2201 (FIG. 22C). Thus, after a transfer from the maintenance bus interface, the flip-flop 2235 will be set in response to the energization of AND gate 2234 to assert the FFLAG signal. The FFLAG signal is transmitted through driver 1817 (FIG. 22A) onto the MBI to the maintenance processor 300 (FIG. 4).

If the DSI diagnostics circuit 30 is transmitting data to the maintenance processor through the maintenance bus interface buffer in response to a request from the maintenance processor, the data is transmitted over the DSI and received in receiver 1816. Simultaneously, a BRPLY signal is received. These signals are received as MBI0-7 and EXTRPLY (external reply) signals, respectively. The MBIO0-MBIO7 signals transferred to driver 1817 (FIG. 22A). The EXTRPLY (external reply) signal energizes OR gate 2217 (FIG. 22C) which in turn enables shift register 2216 (FIG. 22C) if either the DIN or DOUT (data in or data out) signal from receiver 1813 is asserted. The QC output of shift register 2216 in turn energizes OR gate 2221 to assert the DRPLY signal which in turn is transmitted through to the MBI through driver 1817.

The maintenance bus interface buffer transfers signals to the DSI interface and diagnostic circuit 30 through drivers 1812 and 2232 (FIG. 22B). Driver 2232 transfers the control signals for the DSI. The driver 1812 (FIG. 22B) is enabled if the DDIN signal from AND gate 2207 (FIG. 22C) is not asserted. The DDEVEN control signal, which is transmitted over the DSI bus as a BDEVEN signal, by driver 2232 (FIG. 22B) is generated by the QD output of shift register 2204, enabled by the STRT start signal from flip-flop 2203 and the DSTART signal from flip-flop 2205 on FIG. 22A. The shift register 2204 is cleared by the coincidence of the assertion of the DEVEN signal and the non-assertion of the ENRST (enable reset) signal. The DDEVEN signal is thus delayed from the DEVEN signal by the time it takes a shift register to shift to the QD output.

The DHOLD signal, which is transferred over the DSI interface as a BHOLD signal, is asserted by an AND gate 2235 (FIG. 22C). One input of AND gate 2235 is energized by an AND gate 2236 if the ENRST reset signal is not asserted and the HOLD signal is asserted. The second input of AND gate 2235 is energized by the output of a flip-flop 2237, which is set by the 8 MHZ clocking signal when the QI output of shift register 2204. The DHOLD signal is thus slightly delayed from the DDEVEN signal.

If the diagnostic circuit 30 desires to transfer information to the maintenance processor, not in response to a request from the maintenance processor, the information is transferred over the DSI interface lines as D0-D7 signals and received in receiver 1818 (FIG. 22B). The data is stored in latch 1819 (FIG. 22B), and transferred to a TO bus as TO0-TO7 signals. The information stored in latch 1819 is then transmitted back onto the DSI through driver 1820 in response to an ENDR (enable driver) signal and coupled through receiver 1816 (FIG. 22B), to the MBIO bus as MBIO0-MBIO7 signals. The MBIO0-MBIO7 signals are coupled through driver 1817 (FIG. 22A) onto the MBI bus as MBDAL0-7 signals and thence to the maintenance processor.

The diagnostic circuit 30 first transmits an address that is decoded by an AND gate 2240 (FIG. 22B). If AND gate 2240 is asserted, a flip-flop 2241 is asserted when a TDDE signal is asserted and a TDHO signal is not asserted. The TDDE signal performs a function similar to the MBDEVN signal on the MBI, and corresponds to a BDEVEN (device enable) signal received in latch 2242 (FIG. 22B). The TDHO signal performs a function similar to the HOLD signal on MBI, and corresponds to a BHOLD signal from the DSI. The TDHO signal is thus asserted during the entire time that the diagnostic circuit 30 desires to transmit information to maintenance bus interface buffer 18.

When flip-flop 2241 is reset, and the TDHO hold signal is asserted, an AND gate 2243 is energized, which with the assertion of the TDDE signal from latch 2242 energizes AND gate 2244. The energizing of AND gate 2244, with the assertion of a TDDI signal (which performs a function similar to the MBDIN signal on the MBI interface) from latch 2242 energizes an AND gate 2245 which asserts the ENDR (enable driver) signal that enables driver 1820 (FIG. 22B). The assertion of either signal TDDO or TDDI from latch 2242 energizes OR gate 2246, which with the energization of AND gate 2244 energizes an AND gate 2247 which enables a delay line 2250. After a 40 nanosecond delay, the delay line 2250 asserts a signal that is placed on the DSI by a driver 2251 as the BRPLY reply signal to complete the handshake on the DSI interface.

Resetting a flip-flop 2241 also energizes an AND gate 2252 if a TDDO signal from latch 2242 is asserted. This clocks the latch 1819 to store the subsequent TI0-TI7 data signals.

The assertion of AND gate 2240 also causes a flip-flop 2253 to be set by the next TPOL signal from latch 2242, if flip-flop 2253 has been previously reset by the ENDR (enable driver) signal from AND gate 2245. This enables driver 2251 to place a signal from AND gate 2254 on the DSI as a BFLAG signal. This signal is asserted if the T07 signal from the latch 1819 is asserted and if a user settable switch 2255 is set to the +V condition. This permits the T07 signal to be coupled through receiver 1816 (FIG. 22B) as a flag signal.

Diagnostics 30

Figure 23A:
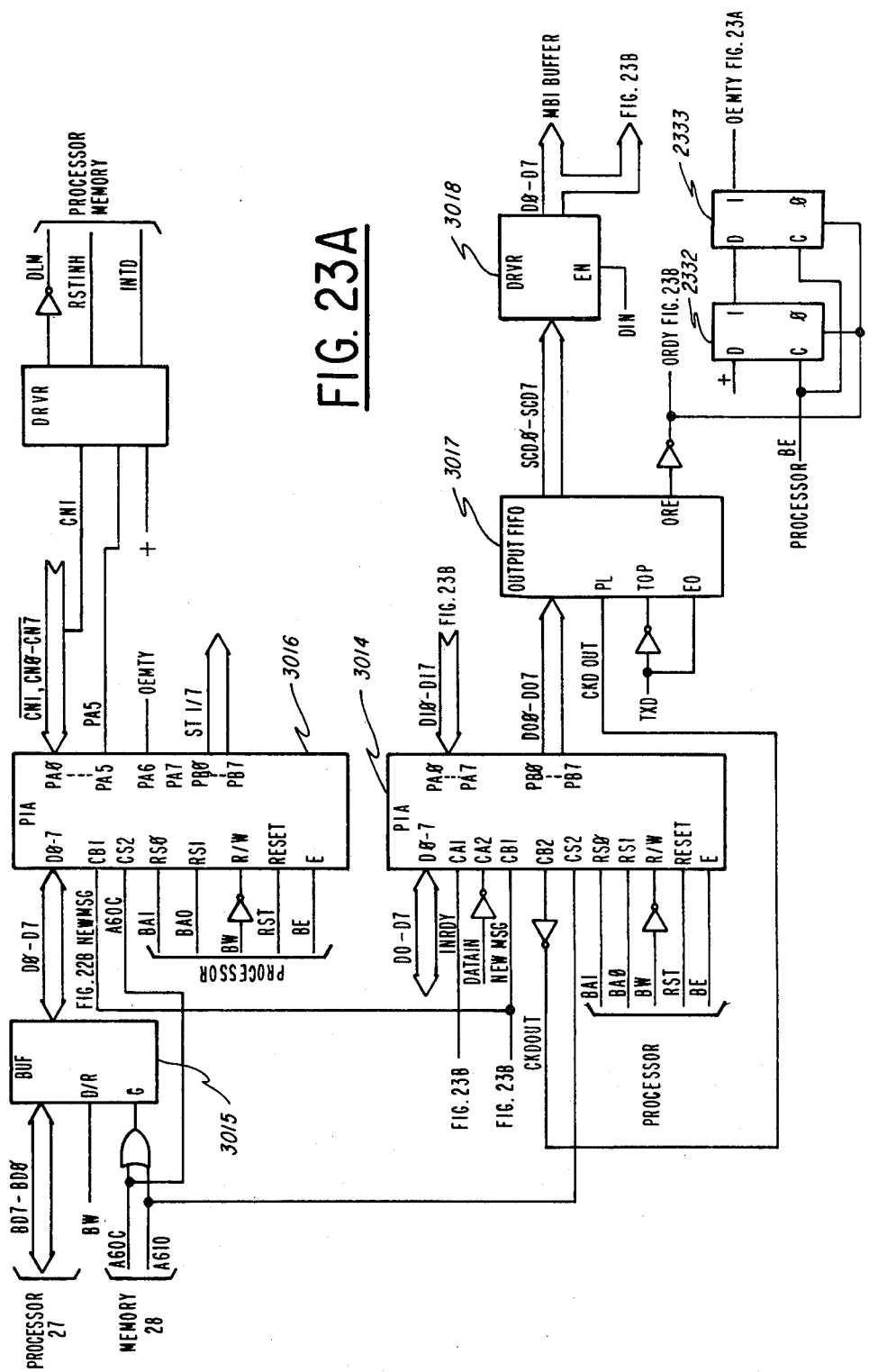
Figure 23B:
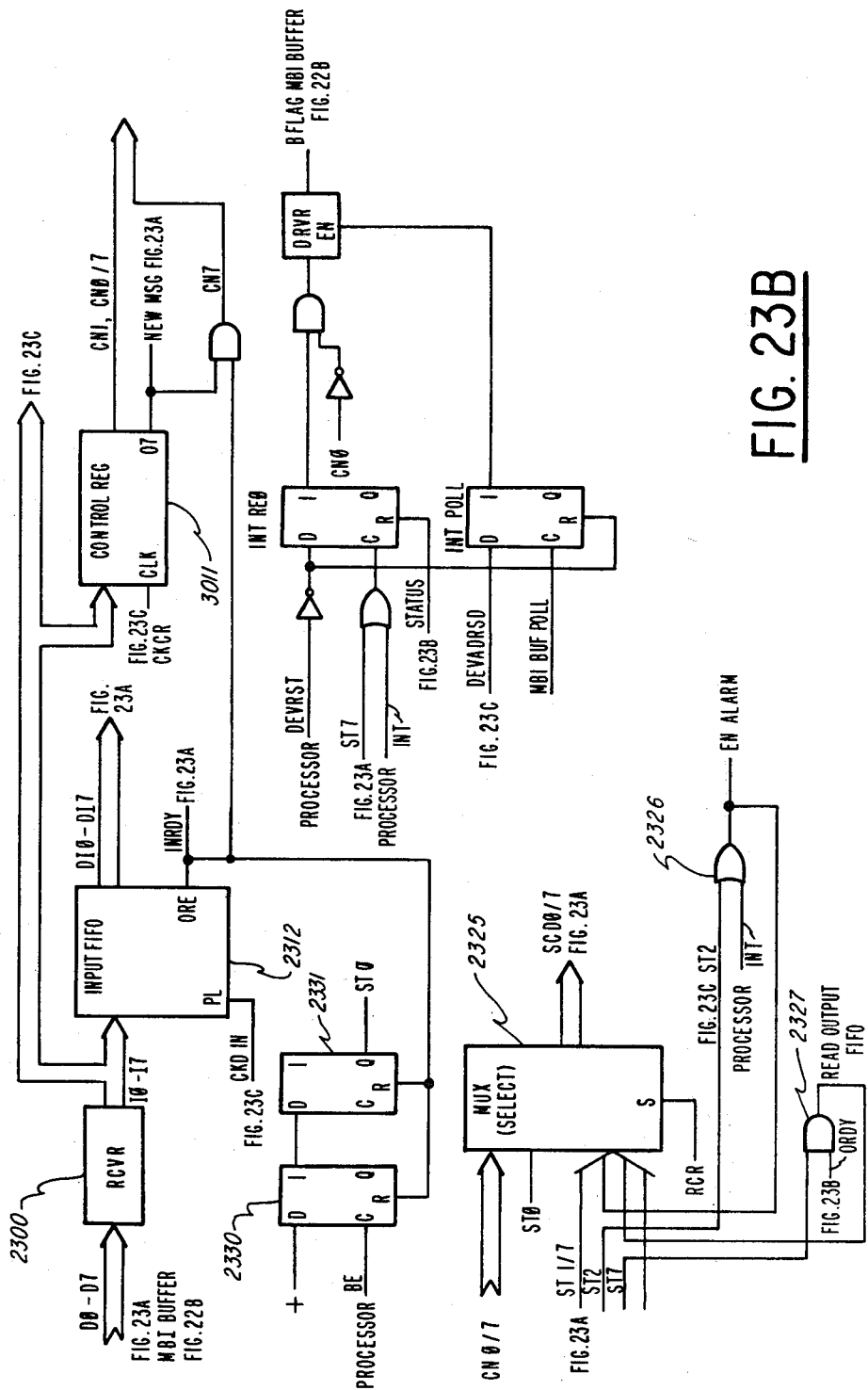
Figure 24A:
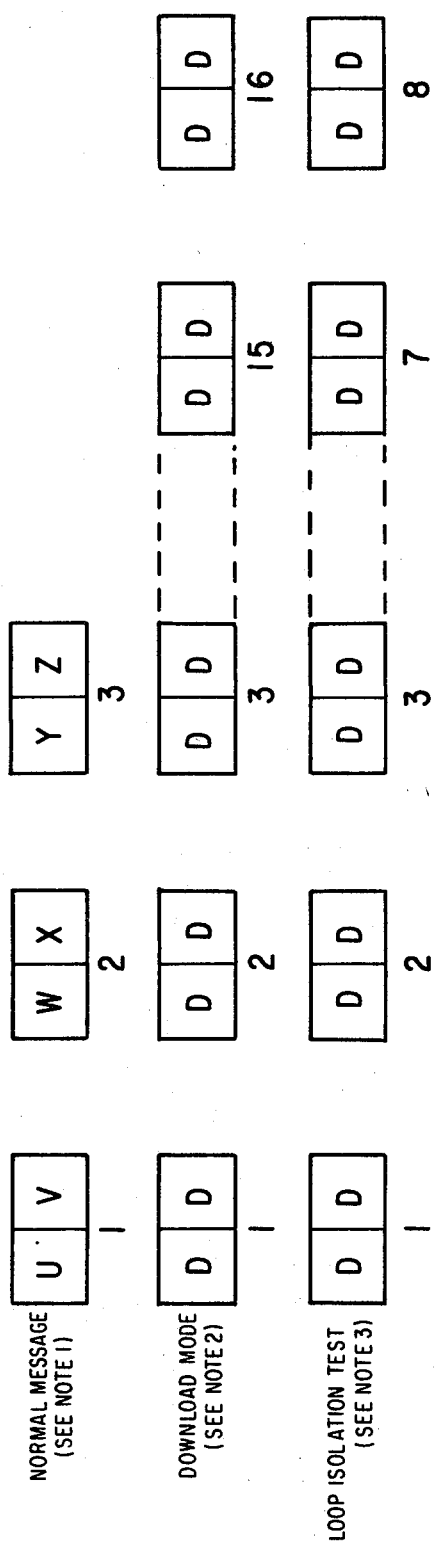
Figure 24B:
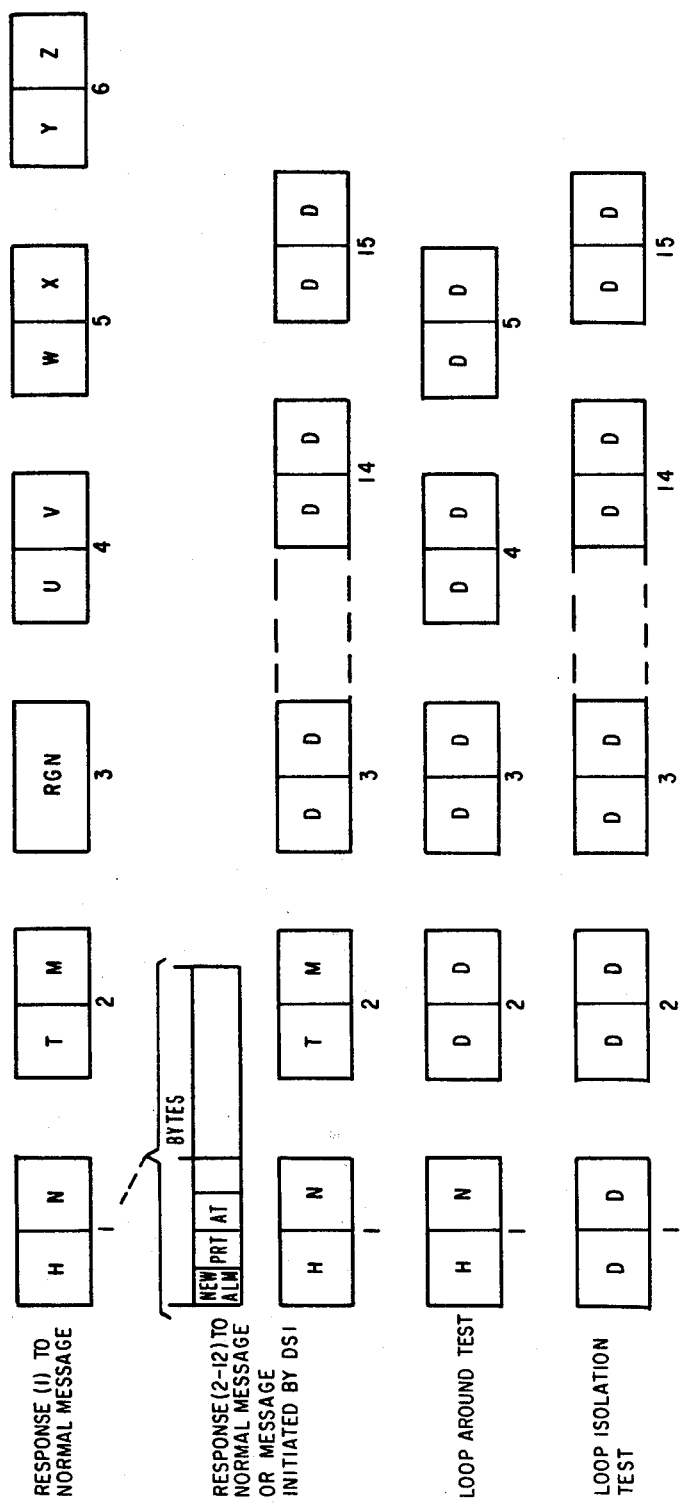
Figure 25B:
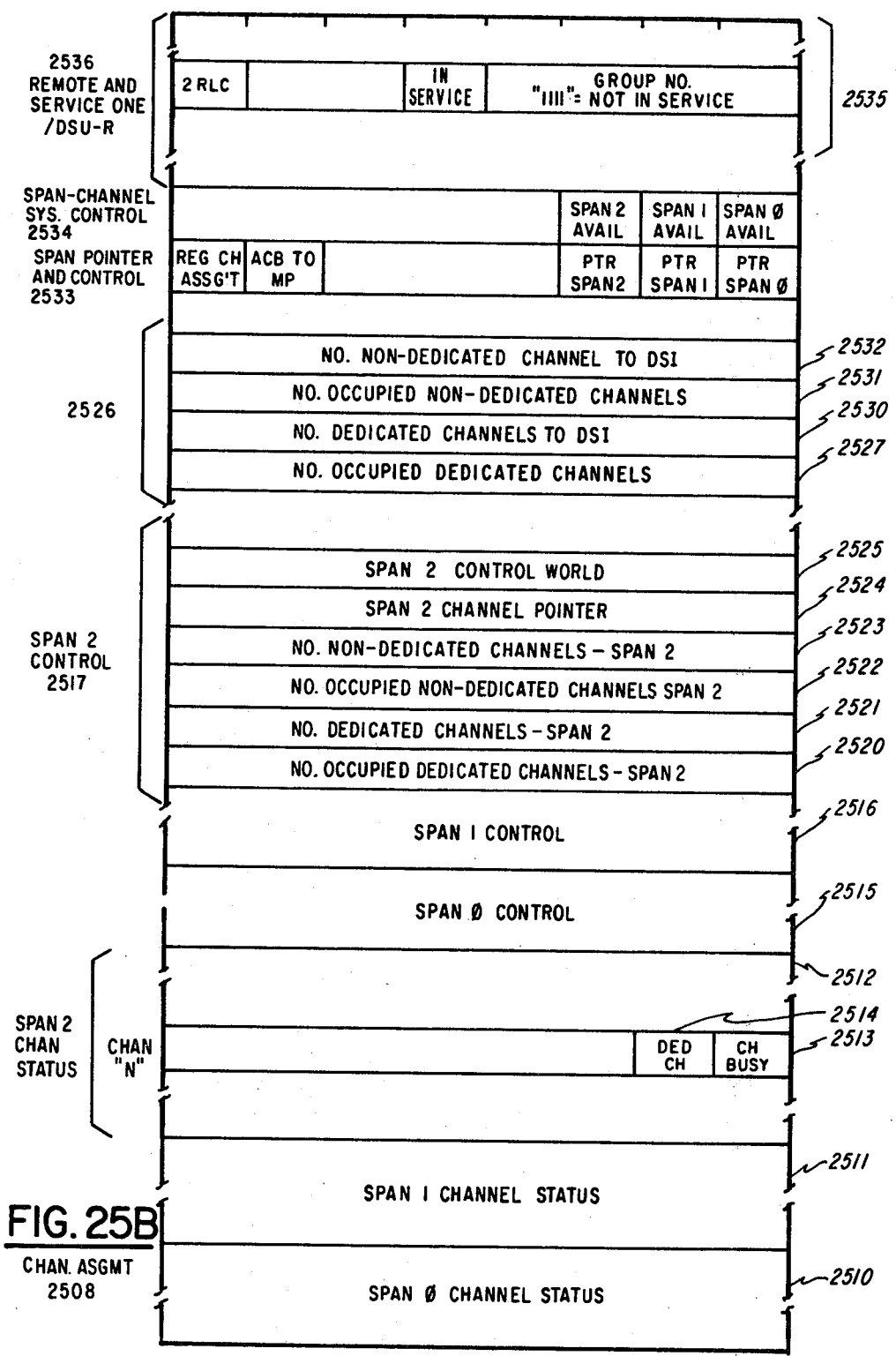
FIG. 25, together with FIGS. 25A through 25C, constitute a memory map for the memory in the digital satellite interface.

With reference to FIGS. 23A-23C, the diagnostics circuit 30 interfaces between the MBI maintenance bus interface buffer 18 and processor 27 and memory 28 in the DSI 14 (FIG. 4). Diagnostics circuit 30 is shown in block diagram in FIG. 20, and a detailed circuit diagram is shown in FIGS. 23A-23C. With reference to FIG. 23B, the signals from MBI buffer on MBI bus lines D0-D7 are received in a receiver 2300 (FIG. 23B) and coupled as I0-I7 signals. The I1-I6 signals are compared in an address comparator 2301 (FIG. 23C) with an address assigned by address switches 2302. If the address signals match the signals in switches 2302, address comparator 2301 asserts a DEVARSD (device addressed) signal, which sets a flip-flop 2303 if the BHOLD signal from the MBI buffer (FIG. 22B) is not asserted at the leading edge of the BDEVEN signal from the MBI buffer 18 (FIG. 22B).

The I1 and I2 signals are received in a latch 2304 clocked by the BDEVEN signal (FIG. 22B) from the MBI buffer. The signals stored in latch 2304 are decoded in a function decoder 2305, which has an output signals a STATUS signal, an RCR (read control register) signal and an enabling signal. The output signals from function decoder 2303 are gated by the setting of flip-flop 2303. An AND gate 2306 (FIG. 23C) is energized to assert a CKDIN (clock data in) signal by the enabling signal from function decoder 2305 if the BDOUT signal from the MBI buffer (FIG. 22B) is asserted. The CKDIN (clock data in) signal is asserted as a clocking signal when data is being trasferred from the MBI buffer 18 to diagnostics 30. Similarly, an AND gate 2307 is energized to assert a TXD (transmit data) signal by the EN enabling signal from function decoder 2305 if the BDIN signal from the MBI buffer (FIG. 22B) is asserted. The TXD (transmit data) signal is asserted as a clocking signal when data is being transferred from diagnostics 30 to MBI buffer 18. The RCR (read control register) signal from function decoder 2305 enables an AND gate 2308, which is energized by the BDOUT (buffer data out) signal in the MBI buffer (FIG. 22B). The energization of 3AND gate 2308 asserts a CKCR (clock control register) signal. An AND gate 2310 is energized by the RCR (read control register) if the BDIN (buffer data in) signal from the MBI buffer (FIG. 22B) is asserted. The energization of AND gate 2310 asserts the DIN (data in) signal.

The setting of flip-flop 2303 also enables a driver 2311 to assert the BRPLY signal to the MBI buffer (FIG. 22B) if either the BDOUT or BDIN (buffer data out and buffer data in, respectively) signals are asserted.

With reference to FIG. 23B, when the CKDIN (clock data in) signal is asserted, an INPUT FIFO 2312 stores the I0-I7 signals. The contents of the INPUT FIFO ripples to the top of the FIFO in response to the CKDIN clock data in signal and are coupled to form DI0-DI7 signals.

Alternatively, the signals on the I0-I7 lines are store in the control register 3011 in response to the CKCR (clock control register) signal from AND gate 2308 (FIG. 23C).

Referring again to INPUT FIFO 2312 (FIG. 23B), when the output register contains a data byte, the output FIFO asserts an INRDY (input FIFO ready) signal, and couples the data as DI0-DI7 signals. The DI0-DI7 signals are received in the PA1-PA7 outputs of a programmable interface array 3014, along with the INRDY (input FIFO ready) signal. The signals are then couped to a bi-directional buffer 3015 (FIG. 23A), and when the processor 27 desires to receive the signals, it controls the transfer of the signals by means of the BW signal. The signals are placed on the BD7-BD0 lines to the processor, enabled by either the A60C and A61O (hex) peripheral address control signals from the DSI memory 28.

Signals from control register 3011 are transmitted similarly to the processor 27 through programmable interface array 3016.

The enabling of programmable interface adapter 3016 or 3014 is controlled by the A60C and A61O address signals. The A60C signal enables the adapter 3016, while the A61O signal enables the adapter 3014.

Signals from the processor 27 are received in the bi-directional buffer 3015 and coupled through programmable interface arrays 3016 and 3014. The particular programmable interface array which transmits the signals is governed by the A60C and A61O (hex) address signals from memory 28. The programmable interface array 3016 receives the ST 1/7 (status) signals for the status register 3024 (FIG. 20). The bit 0 of the status register is controlled by the INPUT FIFO 2312 as explained hereinbelow.

Data signals from the processor 27 are coupled through programmable interface array 3014 and placed on the DO0-DO7 lines and received in the OUTPUT FIFO 3017 in response to a CKDOUT (clock data out) signal from the programmable interface array 3014. When the data signals reach the top of the OUTPUT FIFO 3017, they are transmitted in response to the TXD (transmit data) signal from AND gate 2307 (FIG. 23C) and placed on the SCD0-SCD7 lines. These signals are transmitted through a driver 3018 in response to the DIN (data in) signals from AND gate 2310 (FIG. 23C) and coupled onto the MBI as D0-D7 signals.

The SCD0-SCD7 lines also receive one of the signals from either the control register or status register when the registers are being read. A multiplexer 2325 (FIG. 23B) receives the CN0/7 signals from control register 3011, the ST0 status signal and the ST1/7 status signals from programmable interface array 3016. The ST2 signal, before going to the multiplexer 2325, is first diverted to an OR gate 2326, which is energized either by the ST2 line from programmable interface array 3016 or an INT (interrupt) signal from processor 27. Either the ST2 or the INT signals will energize OR gate 2326 to produce an ENALM (enable alarm) signal which is coupled to multiplexer 2325. Similarly, the ST7 signal from programmable interface array 3016 is diverted to an AND gate 2327, which is energized if an ORDY (output fifo ready) signal from OUTPUT FIFO 3017 is asserted. The signal from AND gate 2327 is a READ OUTPUT FIFO signal which is then coupled to multiplexer 2325.

The multiplexer 2325 (FIG. 23B) couples the control register signals or the status register signal in response to the state of the RCR (read control register) signal from function decoder 2325 (FIG. 23C).

The ST0 status signal is generated by flip-flops 2330 and 2331 (FIG. 23B) in response to a BE clocking signal from the processor 27 and an overriding reset signal in response to the INDRY INPUT FIFO READY signal from INPUT FIFO 2312.

Similarly, the OUTPUT FIFO provides a status signal by means of flip-flops 2332 and 2333 (FIG. 23A) in response to the ORDY (output ready) signal. The flip-flops are set by a BE clocking signal from processor 27. The ORDY output ready signal from OUTPUT FIFO 3017 provides an overriding reset signal to the flip-flops 2332 and 2333, which deasserts an OEMTY (output FIFO empty) signal. The OEMTY output FIFO empty signal is directed to programmable interface array 3016 as a status and control signal.

Figure 26:
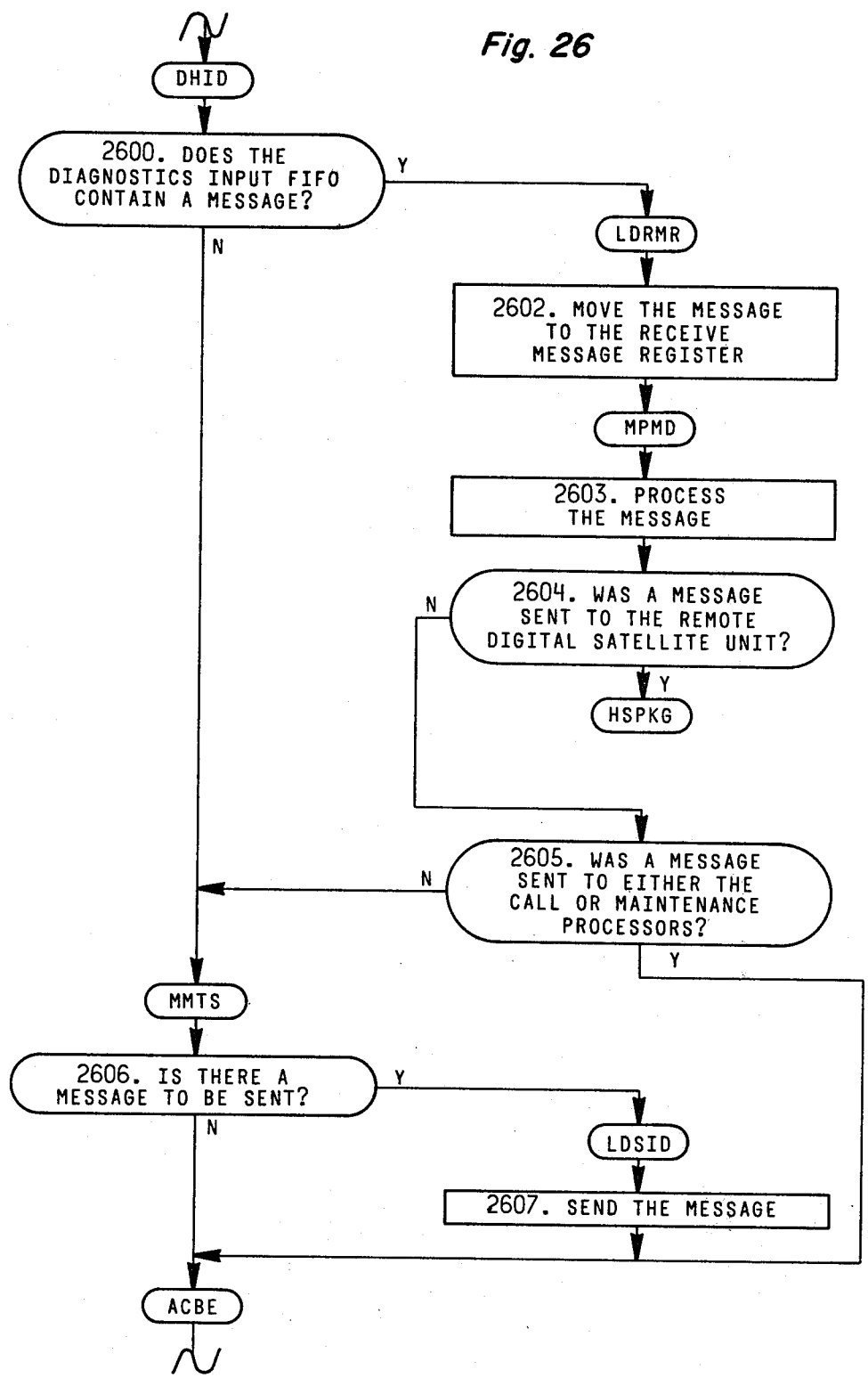
FIG. 26, together with FIGS. 26A and 26B, depict various control programs used in transferring the messages shown in FIG. 24.

FIG. 26 depicts a portion of the operation shown in FIG. 18 and illustrates the interaction of the digital satellite interface and the maintenance processor.

Figure 26A:
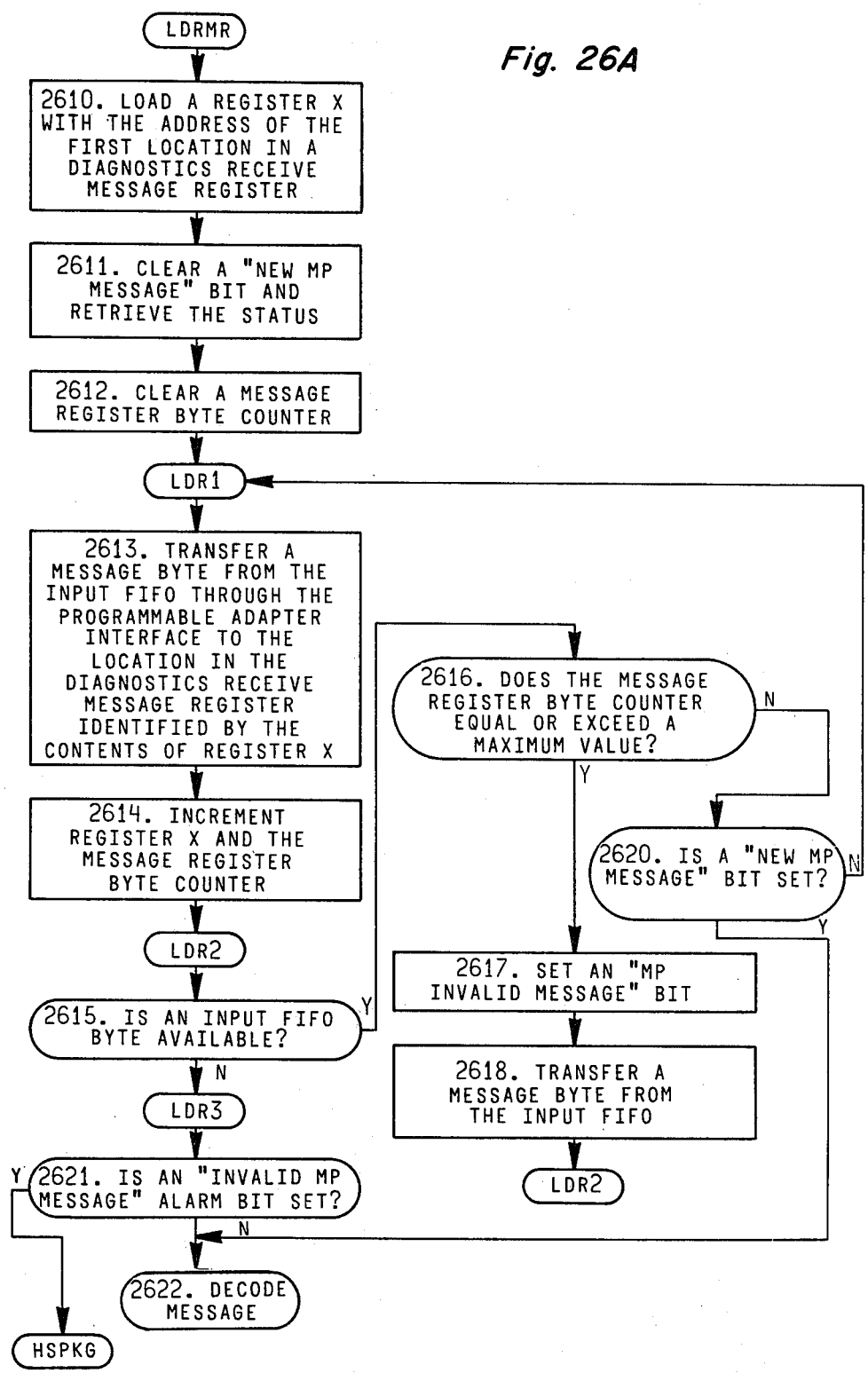

With reference to FIG. 26, the digital satellite interface determines if the diagnostics input FIFO contains a message to be transferred (step 2600). If it does, the message is retrieved using the LDRMR module shown in FIG. 26A to move the message to a RECEIVE MESSAGE register (step 2602). The digital satellite interface processes the message in step 2603 and then determines if a message was sent to the remote digital satellite unit (step 2604) or to either the call processor or the maintenance processor (step 2605). If the message was sent to either processor control passes to an ACBE module. If a message was not sent to either the maintenance processor or the call processor (step 2605), or if the diagnostics input FIFO does not contain a message (step 2600), the digital satellite interface determines if there is a message to be sent (step 2606). If there is, the message is transferred in step 2607.

Now referring to the LDRMR module shown in FIG. 26, a register X is first loaded with the address of the first location in a diagnostics receive message register (step 2610). A new maintenance processor message bit in the diagnostics control register is cleared and the status register is retrieved in step 2611, and a message register byte counter is cleared in step 2612. A message byte is transferred from the diagnostics input FIFO through the programmable interface adaptor to the location in the diagnostics receive message register identified by the contents of register X in step 2613. The contents of register X is incremented to point to a new location in the diagnostics receive message register, and the message register byte counter is also incremented (step 2614). Step 2615 determine whether another byte is available from the input FIFO. If one is, the message register byte counter is tested in step 2616. If the message register byte counter equals or exceeds the predetermined value, an "MP Invalid" message bit in the status register is set and a message byte from the input FIFO is transferred from the input FIFO (steps 2617 and 2618). If the message register byte counter does not equal or exceed the predetermined value, a "New MP message" bit in the DSI control register is tested. If that bit is not set, control returns to step 2613 (step 2620).

If in step 2615 the input FIFO does not contain another byte, an "Invalid MP message" alarm bit in the DSI status register is tested (step 2621). If that bit is not set, the message is decoded (step 2622); however, if the bit is set, the processor returns to the HSKPG module in FIG. 18.

Figure 26B:
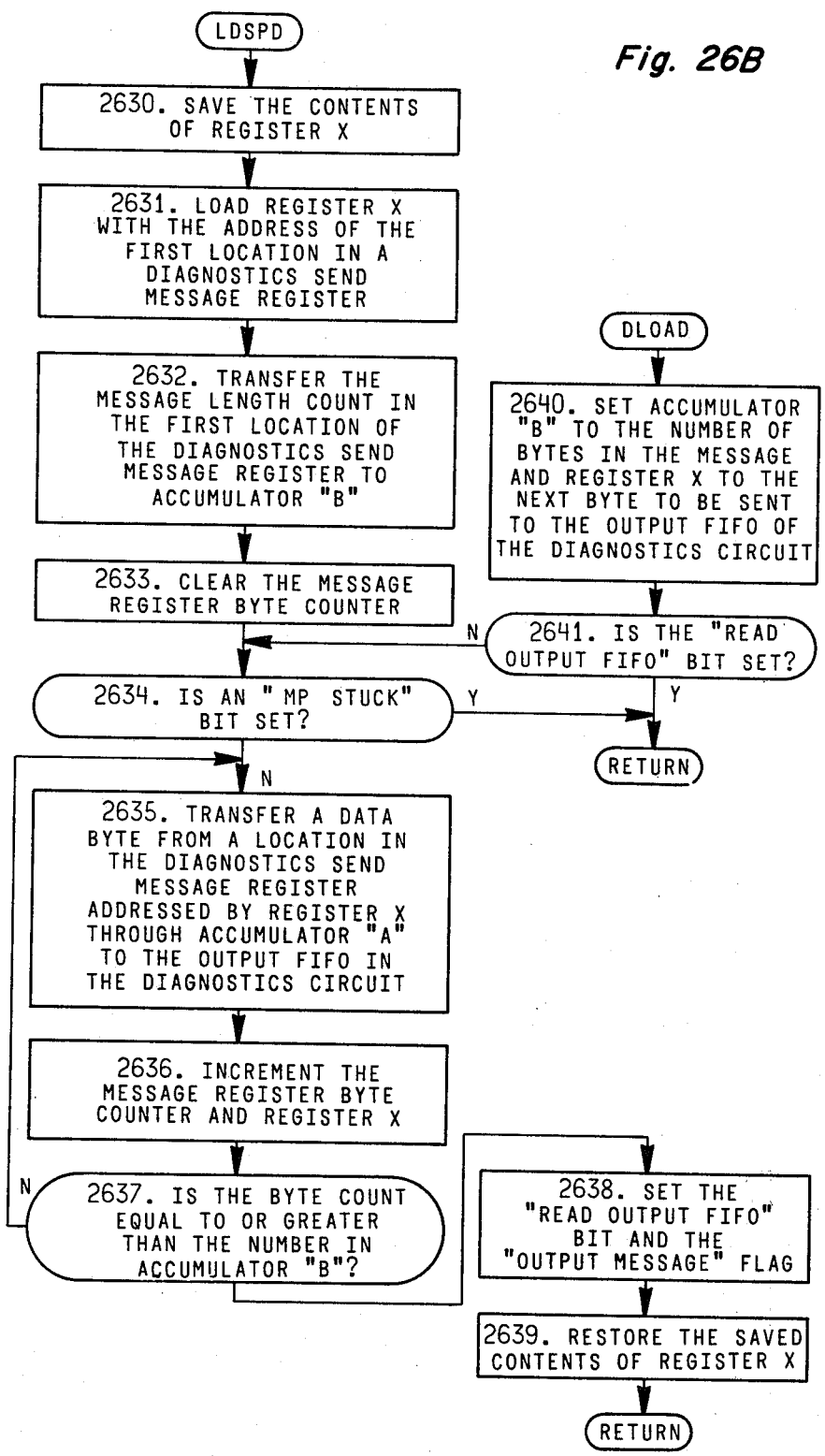

If in FIG. 26 a message is to be sent, the message is transferred using the LDSID module shown in FIG. 26B. The contents of register X is saved in step 2630. Register X is then loaded with the address of the first location in the diagnostics send message register (step 2631). The first location of the diagnostics send message register contains the message length, which is transferred to input B of the accumulator (step 2632). The message register byte counter is cleared (step 2633), and an "MP Stuck" bit is tested in step 2634. If that bit is set, the process is aborted and control returns to the calling routine; otherwise a data byte is transferred from a location in the diagnostics send message register address by register X, through the accumulator A input to the output FIFO in the DSI diagnostics circuit (step 2635). The message register byte counter the contents of register X are incremented (step 2636). If the contents of the message register byte counter does not equal or exceed the contents in the accumulator input B (step 2637) the process cycles to step 2635 to continue transferring. If the byte count does equal or exceed the contents of the accumulator input B, the READ OUTPUT FIFO bit in the DSI status register is set (step 2638) as is the OUTPUT MESSAGE flag. The saved contents of register X are restored (step 2639) and the process returns to the calling program.

For a download mode, during which programmed data base information is read, the accumulator B input is set to the number of bytes in the message and register X is set to the address of the byte to be sent in the output FIFO of the diagnostics circuit (step 2640). The READ OUTPUT FIFO bit in the DSI status register is tested (step 2641). If that bit is set, the process returns to the calling program. If that bit is not set, control passes to step 2634, and the data is transferred if the "MP Stuck" bit is not set.

FIGS. 27-1 through 27B-3 describe the interaction that occurs when the maintenance processor transfers programs and data base information to the digital satellite interface 14. If the digital satellite unit requests a downloading (step 2650), the DSI sets a RELOAD SOFTWARE REQUEST bit in the status register of the diagnostic circuit (step 2651). The maintenance processor then reads the status register and finds the RELOAD SOFTWARE REQUEST bit set and the DSI BUSY bit clear (step 2652). If the call processor initiates downloading (step 2653) steps 2651 and 2652 are skipped.

The maintenance processor then sets the DOWNLOAD MODE bits in the diagnostics control register (step 2654) depending on whether only the program is to be downloaded or if the data base is also to be downloaded. Tests are performed in step 2655 to ensure that the digital satellite interface is in condition to be downloaded. If the tests are not performed satisfactorily (step 2656), the DSI sets the "MAJOR ALARM", "READ OUTPUT FIFO" and RELOAD SOFTWARE REQUEST bits in the DSI status register, and sends a message to the maintenance processor (step 2657). The maintenance processor then prints a FAIL TO LOAD message (step 2660).

If the tests in step 2656 were performed satisfactorily, the DSI resets the RELOAD SOFTWARE REQUEST bit in the status register, transfers a 01 to the diagnostics output FIFO, and sets the READ OUTPUT FIFO bit in the status register (step 2661). If the maintenance processor reads the output FIFO, decodes the 01 and transfers a block of data to the digital satellite interface. The maintenance processor then sets the READ INPUT FIFO bit and DOWNLOAD MODE SOFTWARE bit of the control register (step 2662).

Referring to FIG. 27-2, after receiving the block of data, the DSI sets the DSI BUSY bit in the status register, clears the READ OUTPUT FIFO bit, loads the data block (step 2663). The DSI then performs an error checking operation in which it calculates a checksum and loads it into the output FIFO with a 02 header. The DSI sets the READ OUTPUT FIFO bit in the status register and clears the DSI BUSY bit. The maintenance processor then determines if the checksum is correct and clears the READ INPUT FIFO bit (step 2664). If the checksum is not correct (step 2665), and if enough reload attempts have not been made (step 2666), the maintenance processor reloads the last block of data into the diagnostics input FIFO and sets RELOAD BATCH and READ INPUT BUFFER bits in the control register (step 2667). The process then returns to step 2663.

If the checksum is correct in step 2665, and the entire program has not been loaded (step 2670), the maintenance processor loads the next block of program data with the 01 header and sets the READ INPUT FIFO bit of the control register (step 2671). The process then returns to step 2663. If all the program date is loaded (step 2670), the maintenance processor clears the DOWNLOAD MODE bit of the DSI control register (step 2672) AND the MICROCODE RELOAD bit in (steps 2673 and 2674).

If the MICROCODE RELOAD bit in step 2673 is not set, the process steps to FIG. 27-3, in which the maintenance processor loads a block of data base data into the diagnostics input FIFO (step 2680), clears the download mode bit and sets the read input FIFO bit in the DSI control register. The DSI sets the DSI BUSY bit in the status register, it retrieves the data and clears the read output FIFO bit of the status register (step 2681). The DSI then uses the steps 2681, 2682, 2683, 2684 and 2685 for the same error checking operations that were performed in steps 2663 through 2667.

If in step 2683 the checksum is correct and if the entire data base has not been transferred (step 2684), the maintenance processor loads the next block of the data base into the diagnostics input FIFO and sets the READ INPUT FIFO bit (step 2686). The process then cycles back to step 2681. When the data base has been completely transferred (step 2684), the DSI completes the initialization and sends a message to the maintenance processor to be printed (step 2687). After that, the DSI starts the normal call processing.

FIGS. 27A-1 through 27A-3 set forth the detailed sequence of operations in the digital satellite interface that cause the program to be downloaded. In step 2700, the stack pointer and programmable interface adapters are initialized. The input FIFOs are cleared and interrupts are disabled. Also the DSI BUSY bit is cleared and the RELOAD SOFTWARE REQUEST bit is set in the diagnostics status register. The DOWNLOAD MODE bit in the diagnostics control register is tested (step 2701). The memory is then tested and initialized (step 2702) and if the memory is operating satisfactorily (step 2703), the software can be loaded.

The RELOAD SOFTWARE REQUEST bit in the SI status register is cleared (step 2704) and a "01" message is sent to the maintenance processor. A total checksum register is cleared (step 2705) and an index register is loaded with the starting address in memory 28. The DOWNLOAD MODE bit in the control register is then tested (step 2706). If that bit is not cleared, the NEW MP MESSAGE bit in the control register is tested (step 2707). If that bit is not set, the process cycles back to step 2706. If the bit is set, it is cleared (step 2710). The DSI BUSY bit is set in step 2711 and the READ INPUT FIFO bit in the control register is cleared. If in step 2706, the DOWNLOAD MODE bit in the control register is cleared, the sequence steps directly to step 2711. If the DOWNLOAD MODE bit is not cleared (step 2712), the process steps to step 2713 (FIG. 27A-2) in which the RELOAD SOFTWARE BIT in the status register is tested. If that bit is not set (step 2714), the starting address for the block is saved and the block checksum is cleared (step 2715). If the RELOAD SOFTWARE BIT in the status register is set (step 2713), the previous checksum is retrieved (step 2716), the starting address for the block reload is retrieved (step 2717), and CONTROL RETURNS to step 2715. After the block checksum is cleared in step 2715, the process steps to a load sequence shown in FIG. 27A-3.

With reference again to FIG. 27A-1, if the DOWNLOAD MODE bit was cleared in step 2712, the MICROCODE RELOAD bit in the status register is tested. If that bit is not set, the NEW MP MESSAGE bit in the control register is tested. If that bit is set (step 2721), it is cleared (step 2722), and the process steps to a download line memory sequence shown in FIGS. 27B-1 and 27B-2. If in step 2720 the microcode reload bit was set, reset inhibit and watchdog timer inhibit signals are removed (step 2723), the MICROCODE RELOAD bit is cleared (step 2724), and a temporary checksum location is cleared (step 2725). An address for a memory test is then cleared (step 2726), and control returns to the HSPKS module.

With reference to FIG. 27A-3, the software is loaded beginning with step 2730. A program byte is retrieved from the diagnostics input FIFO and stored in a location specified by the index register. The program byte is added to the checksum in accumulator A (step 2731) and the index register is incremented (step 2732). An INPUT FIFO NOT EMPTY bit in the DSI status register is tested (step 2733), and if that FIFO is not empty, the sequence cycles to step 2730. If the diagnostics input FIFO is empty, the diagnostics output FIFO is tested. If the diagnostics output FIFO is not empty, the RELOAD SOFTWARE REQUEST bit in the status register is set, and the READ OUTPUT FIFO bit in the status register is toggled (step 2735).

If the diagnostics output FIFO is empty (step 2734), the block checksum is transferred from accumulator A to accumulator B (step 2636) and the contents of accumulator B are added to the previous checksum (step 2737). If the index register is at the last address (step 2740), the index register is decremented and saved (step 2741). The last program byte is subtracted from the checksum (step 2742) and the two's complement value is calculated (step 2743) and stored at the location identified by the index register. An "02" header is loaded with the checksum into the diagnostics output FIFO (step 2744) and the READ OUTPUT FIFO and DSI BUSY bits of the diagnostics status register are set.

If in step 2740 the index register is not at the last address, the process steps directly to step 2744.

With reference again to FIG. 27A-2, after the NEW MP MESSAGE bit is cleared in step 2722, the control register, the data base is downloaded by a DLLM module shown in FIGS. 27B-1 and 27B-2. The line memory starting address is stored stored in registers X, XL and XH, and a line counter is cleared (step 2750). The line count and starting address are saved as a block starting address 2751. Accumulator A is cleared in step 2752. The line count is then stored at the location addressed by register X (step 2753). A data base byte is retrieved from the diagnostics input FIFO and stored in a location offset from the by the address in register X (step 2754).

The data base byte is then read and added to the contents of accumulator "A" (step 2755). The carry bit of accumulator A is cleared in step 2756 and "8" is added to the contents of the XL register. If there is no carry, the register XH is incremented (steps 2760 and 2761). The contents of the XH and XL registers then are transferred to register X (step 2763).

If registers XL and XH identify the last data base address in the first line memory area (step 2764 in FIG. 27B-2), they and the line counter are reset and control returns to step 2753 in FIG. 27B-1. Otherwise control passes to step 2766. If more data base bytes are available, control passes to step 2753 in FIG. 27B-1. If the diagnostics output FIFO is empty, control passes to step 2768. In this step, an "02" header and the checksum are transferred to the diagnostics output FIFO. The the READ OUTPUT FIFO bit is set and the DSI BSY bit is cleared. If the NEW MP MESSAGE bit is set (step 2771), the DSI BSY bit is set and the READ INPUT FIFO bit is cleared when the next message is received. In step 2773 the NEW MP MESSAGE bit is cleared. If the RELOAD BATCH bit is set, register X and the line counter are cleared (step 2775). If the RELOAD BATCH bit is not set, further processing depends on the contents of registers XL and XH.

FIGS. 27C-1 through 27C-7 describe the download procedure from the standpoint of the maintenance processor. With reference to FIG. 27C-1, the maintenance processor first initializes its registers and establishes a DSI FLG register, it sets bit 1 of the DSI FLG flag register if only one DSI is to be downloaded, and sets bit 10 of the DSI FLG flag register if only the program is to be downloaded. The maintenance processor then prints certain initial starting messages (step 2800). The maintenance processor establishes a DSITAB table of DSIs to be downloaded, and a DLTAB download table (step 2801). The maintenance processor checks to determine that it has access to all DSIs (step 2802). In this process, the MP first saves its registers (step 2803) and moves the number of DSIs to be contacted into register R0 (step 2804), retrieves the DLTAB of the initial DSI in step 2805 and decodes the DLTAB download table and determines whether the DSI can be contacted (step 2806). If the DSI cannot be contacted, the process steps to step 2807. If all of the download tables of all of the DSIs have not been checked, the download table of the next DSI is checked (step 2808), to determine if it can be contacted. If in step 2806 the DSI can be contacted, and if all of the DSIs have been checked (step 2807), the process steps to step 2810 in which bit 10 of the DSFFLG flag register is tested. If that bit is set, the download table entry for the DSI to be loaded is retrieved (step 2811), and decoded (step 2812). If bits one or two of the download table DLTAB are set, the DSI cannot be downloaded, and an exit message is printed (step 2813).

If it is determined that the DSI can be contacted (step 2815), its registers are restored and the process returns to step 2802.

After the DSI is checked in step 2802 the DSIFLG flag bit 10 is tested (step 2816). If the bit is set, indicating only the program is to be downloaded, the DSI address pointer DSIADR is initialized (step 2817). The download table DLTAB of the DSI pointed to by the DSIADR address pointer is retrieved (step 2818), and the download table is decoded to determine if the DSI can be downloaded (step 2820). If the DSI can be downloaded, the DSIADR address pointer is incremented (step 2821), and if the download tables for all DSI have not been tested, the download table of the next DSI is retrieved and tested (step 2822).

When a DLTAB download table indicates that the DSI can be downloaded, a program-only download message, which informs the DSI that only the program will be downloaded, is transferred beginning with step 2823. The message is transferred to the DSI (step 2825) using a DSIOUT sequence set forth in FIG. 27C-7.

With reference to FIG. 27C-7, the DSIOUT sequence begins by storing the registers (step 2830). A loop count is moved to the R2 register (step 2831). The read input bit in the diagnostics control register is cleared (step 2832). The address of the maintenance bus interface buffer and DSI are transferred over the MBI (steps 2833 and 2834). The DSI status register is read and stored in the R1 register (step 2835). Bit 0 of R1 is then checked to determine if the DSI input FIFO is empty. If the DSI input FIFO is not empty, a message is printed (step 2837), the registers are restored, and the sequence returns to step 2825 (FIG. 27C-1).

If the DSI input FIFO is empty the new message bit in the DSI control register is cleared (step 2840) a "1" is transferred into the R0 register (step 2841) and the contents of the OBUF output buffer register are transferred to the R2 register (step 2842). A byte of the message is moved to the DSI input FIFO (step 2843). The R0 register is incremented (step 2844). If the contents of the R0 register does not equal the contents of the R2 register, the sequence returns to step 2843 (step 2845). When R0 does equal R2, then the sequence cycles to step 2838 to restore the registers and return.

Following step 2825 (FIG. 27C-1) the address of the maintenance bus interface buffer and DSI are transferred over the MBI (steps 2850 and 2851), and bit 1 of the DSI control register is set for a download mode (step 2852). The DSI address is incremented to identify the next DSI (step 2854). If the program-only download message have not been transferred to all DSIs (step 2855), the sequence returns to step 2820 (FIG. 27C-1).

If messages have been transferred to all the DSI's (step 2855), the sequence then verifies that the message was received (step 2856) using a sequence shown in FIG. 27C-5.

With reference to FIG. 27C-5, the maintenance processor first initializes the registers (step 2860) and retrieves the address of the first DSI (step 2861). The processor then reads the DSI status register (step 2862) and tests the "Read Output FIFO" bit (step 2863). If that bit is not set, the maintenance processor reads the DSI status register again (step 2864) and if the read output FIFO buffer is again not set (step 2865), prints an error message (step 2866) and proceeds to the next DSI (step 2867).

When the "Read Output FIFO" bit of the DSI status register is set, the output FIFO is read (step 2870) and the contents are compared with the message that was just transferred (step 2871). If the contents of the output FIFO do not correspond to the message that was transferred, the DSI is marked out of service (step 2872) and the next DSI is contacted. If the contents of the output FIFO does correspondence to the message that was sent (step 2871), the next DSI is also contacted. After all of the DSIs have been contacted (step 2868), the processor returns to step 2856 (FIG. 27C-2).

After the message has been verified as having been received (step 2856), the first 16 bytes of the program are moved from the maintenance processor memory to the DSI using the DSIDLB sequence set forth in FIG. 27C-6 (step 2857).

With reference to FIG. 27C-6, the DSI address is first initialized (step 2860) and a loop count ("8" in one embodiment) is stored in register R0 (step 2861). The address of the program data to be downloaded is transferred from a location in memory to a buffer (steps 2862 to 2867). The maintenance processor then checks the DLTAB download table for the DSI to see if it can be downloaded (step 2870). If it cannot, the maintenance processor steps to the next DSI (step 2871). When the maintenance processor finds a DSI that can be downloaded, transfers the address of the maintenance bus interface buffer and the DSI over the maintenance bus interface (steps 2872 and 2873). The maintenance processor then reads the DSI status register (step 2874). If the "Input FIFO Not Empty" bit of the status register is set (step 2875), the maintenance processor prints a "Fail To Contact" message (step 2876), and increments the DSI address (step 2877). If all DSIs have been contacted (step 2880), it returns to step 2857 (FIG. 27C-2). If all DSIs have not been contacted (step 2880), the maintenance processor returns to step 2871.

If in step 2875, the "Input FIFO Not Empty" bit is not set, the "Read Input FIFO" bit in the DSI control register is cleared (step 2881) and 16 bytes of program are transferred over the DSI in steps 2881-2884. The "Read Input FIFO" bit in the DSI control register is then set (step 2885), and the sequence steps to step 2877 to download the 16 bytes of program data in the next DSI.

Returning to step 2857 (FIG. 27C-2), after 16 bytes of program have been moved to the DSI, the processor continues to transfer the program until the entire program has been transferred (step 2858).

After the entire program has been transferred, the maintenance processor again tests bit 10 of the DSI FLG flag register (step 2886) (FIG. 27C-3). If the bit 10 is set, the maintenance processor releases all the DSIs (step 2887), and the maintenance bus interface buffer (step 2890), and prints a "Finished" message (step 2891).

If the bit 10 of the DSI FLG flag register is not set, the maintenance processor proceeds to download the data base. Bit 4 of the DSI FLG flag register is set to indicate that the data base is being downloaded (step 2892). The download data base mode bit (bit 2 of the DSI control register) is set (step 2893). The data base is then transferred from the disk 307 into memory 306 (FIG. 2) in the same manner as the program, and transferred from the memory to an output buffer and from thence to the DSI input FIFO within the same manner as the program. These steps are shown in FIGS. 27C-3 and 27C-4 and will not be discussed in detail here. The data base is transferred in 16 byte batches in the same manner as the program. After the entire data base is loaded into one DSI, it is indicated when a BCOUNT batch count is decremented to zero (step 2894) (FIG. 27C-4), the next DSI is downloaded with its data base (as indicated by step 2895) (FIG. 27C-4). This process repeats until all the DSIs have been downloaded (step 2896). After all of the DSIs have been downloaded, a "Finished" message is printed (step 2897) (FIG. 27C-3). This invention has been disclosed by means of block diagrams, flow diagrams, and logic diagrams. We believe that this disclosure is sufficient to enable logic designers to build the circuitry and programmers to write programs for operation with a specific processor without undue experimentation. Moreover, this disclosure has been in terms of a specific embodiment, and it will be apparent that many different circuits and logical organizations can be utilized with the attainment of all or some of the objects of this invention. Therefore, it is the object of the appended claims to cover all such variations and modifications as come within the true spirit and scope of this invention.

What is claimed as new and desired to be secured by Letters Patent of the United States is:

1. In a telephony system for selectively interconnecting telephone calls among a plurality of telephone lines that includes, at a first location, a plurality of port group highway means for receiving and transmitting signals in a first format that represent voice data and supervisory data and call processing means, including a digital data call processor and a call processor input/output bus means, for selectively interconnecting the plurality of port group highway means in response to certain of a plurality of commands interpreted by the digital data processor, and maintenance processing means, including a digital data maintenance processor and a maintenance processor input/output bus means, for monitoring the operations of said telephony system, said telephony system including, at a second location that is physically remote from the first location, port means for transmitting onto and receiving from certain of the telephone lines first port signals representing voice data and for transmitting and receiving second port signals representing voice data and supervisory data and that includes communication linkage means connected to the port means for conveying the second port signals in a predetermined format, the improvement of interfacing means comprising:

A. encoding means connected to the call processor intput/output bus for encoding signals representing supervisory data in response to others of the commands processed by the call processing means, B. transfer means connected to a selected port group highway means, the communications linkage means and said encoding means for converting signals between the formats of the signals at the port group highway means and said encoding means and the format of the signals on the communications linkage means.

c. first message generating means connected to said transfer means and to the call processor input/output bus means for transmitting messages to the call processing means in response to certain signals representing supervisory data received in said transfer means from the communications linkage means, D. second message generating means connected to the maintenance processor input/output bus means for transmitting messages to and receiving messages from the maintenance processing means.

* * * * *